United States Patent
Erdener et al.

(10) Patent No.: US 10,190,757 B2
(45) Date of Patent: *Jan. 29, 2019

(54) LED LIGHTING METHODS AND APPARATUS

(71) Applicant: Wangs Alliance Corporation, Port Washington, NY (US)

(72) Inventors: Basar Erdener, Millbrook, NY (US); Voravit Puvanakijjakorn, Port Washington, NY (US)

(73) Assignee: WANGS ALLIANCE CORPORATION, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,466

(22) Filed: Oct. 10, 2017

(65) Prior Publication Data

US 2018/0031215 A1 Feb. 1, 2018

Related U.S. Application Data

(63) Continuation of application No. 15/001,230, filed on Jan. 19, 2016, now Pat. No. 9,784,440.

(Continued)

(51) Int. Cl.
*F21V 21/26* (2006.01)
*F21V 29/70* (2015.01)
(Continued)

(52) U.S. Cl.
CPC .............. *F21V 21/26* (2013.01); *F21S 8/081* (2013.01); *F21V 7/00* (2013.01); *F21V 9/00* (2013.01);
(Continued)

(58) Field of Classification Search
CPC .......... F21V 21/26; F21V 21/30; F21V 29/70; F21V 31/005; F21V 31/03; F21V 9/00;
(Continued)

(56) References Cited

U.S. PATENT DOCUMENTS 2,738,756 A 3/1956 Doane
3,104,064 A 9/1963 Bellek
(Continued)

OTHER PUBLICATIONS

International Search Report from International Application No. PCT/US 2016/066395, pp. 1-6, dated Apr. 13, 2017.
(Continued)

*Primary Examiner* — Thomas M Sember
(74) *Attorney, Agent, or Firm* — Straub & Straub; Stephen T. Straub; Michael P. Straub

(57) ABSTRACT

LED related lighting methods and apparatus are described. Various features relate to water tight light fixtures. Some of the fixtures are spotlights while other fixture are intended for in ground use. The light fixtures in at least some embodiments include power control features. In spotlight embodiments beam angle and power or light output can be controlled without opening the light assembly or compromising the water tight seals which also protect against dirt. In ground embodiments support tilt angle setting which allow a user to set the light fixture to one or more tilt angles. Beam angle can also be changed in some embodiments as well as power control. Beam angle, power control and tilt angle adjustments are supported in some embodiments but need not be supported in all embodiments with some embodiments using one or more of the described features but not all features.

22 Claims, 44 Drawing Sheets

Related U.S. Application Data

(60) Provisional application No. 62/280,114, filed on Jan. 18, 2016, provisional application No. 62/270,517, filed on Dec. 21, 2015, provisional application No. 62/269,751, filed on Dec. 18, 2015, provisional application No. 62/267,899, filed on Dec. 15, 2015.

(51) Int. Cl.

| | |
|---|---|
| *F21S 8/08* | (2006.01) |
| *F21V 31/00* | (2006.01) |
| *F21V 31/03* | (2006.01) |
| *F21V 9/00* | (2018.01) |
| *F21V 14/06* | (2006.01) |
| *F21V 17/10* | (2006.01) |
| *F21V 19/00* | (2006.01) |
| *F21V 17/12* | (2006.01) |
| *F21V 17/16* | (2006.01) |
| *F21V 21/30* | (2006.01) |
| *H05B 33/08* | (2006.01) |
| *F21V 7/00* | (2006.01) |
| *F21V 23/00* | (2015.01) |
| *F21V 19/02* | (2006.01) |
| *F21W 131/10* | (2006.01) |
| *F21Y 101/00* | (2016.01) |
| *F21Y 115/10* | (2016.01) |

(52) U.S. Cl.
CPC ............ *F21V 14/06* (2013.01); *F21V 17/101* (2013.01); *F21V 17/12* (2013.01); *F21V 17/168* (2013.01); *F21V 19/0015* (2013.01); *F21V 19/02* (2013.01); *F21V 21/30* (2013.01); *F21V 23/007* (2013.01); *F21V 29/70* (2015.01); *F21V 31/005* (2013.01); *F21V 31/03* (2013.01); *H05B 33/0809* (2013.01); *H05B 33/089* (2013.01); *H05B 33/0815* (2013.01); *H05B 33/0845* (2013.01); *H05B 33/0851* (2013.01); *F21W 2131/10* (2013.01); *F21Y 2101/00* (2013.01); *F21Y 2115/10* (2016.08); *Y02B 20/341* (2013.01); *Y02B 20/347* (2013.01)

(58) Field of Classification Search
CPC ...... F21V 17/101; F21V 17/168; F21V 17/12; F21V 14/06; F21V 19/0015; F21S 8/081; H05B 33/0815; H05B 33/0851; H05B 33/089; H05B 33/0809; H05B 33/0845
See application file for complete search history.

(56) References Cited

U.S. PATENT DOCUMENTS

| | | | |
|---|---|---|---|
| 4,495,463 A | 1/1985 | Milkovic | |
| 4,596,449 A | 6/1986 | Iwata et al. | |
| 4,739,457 A * | 4/1988 | Orr | F21L 15/02 362/190 |
| 5,513,085 A * | 4/1996 | Bourne | F21S 8/022 362/274 |
| 5,584,568 A | 12/1996 | Corbasson et al. | |
| 6,092,914 A | 7/2000 | Esakoff et al. | |
| 6,290,368 B1 | 9/2001 | Lehrer | |
| 7,192,162 B2 | 3/2007 | Tanaka et al. | |
| 7,326,179 B1 | 2/2008 | Cienfuegos | |
| 7,837,866 B2 | 11/2010 | Burrows | |
| 8,662,709 B2 | 3/2014 | Chang | |
| 8,708,535 B2 | 4/2014 | Dalsgaard | |
| 8,905,587 B1 | 12/2014 | Bouckaert | |
| 8,926,121 B2 | 1/2015 | Wu | |
| 9,140,431 B1 | 9/2015 | Lee | |
| 9,739,440 B1 | 8/2017 | Deyaf et al. | |
| 2005/0007777 A1 | 1/2005 | Klipstein et al. | |
| 2006/0262542 A1* | 11/2006 | Ibbitson | F21S 8/022 362/368 |
| 2007/0139913 A1 | 6/2007 | Savage | |
| 2010/0127626 A1 | 5/2010 | Altonen et al. | |
| 2011/0121752 A1 | 5/2011 | Newman, Jr. et al. | |
| 2012/0243213 A1 | 9/2012 | Chen | |
| 2013/0039055 A1 | 2/2013 | Wilson et al. | |
| 2013/0088152 A1 | 4/2013 | Hagen | |
| 2013/0249437 A1 | 9/2013 | Wang et al. | |
| 2014/0049967 A1 | 2/2014 | Zhou | |
| 2014/0119022 A1 | 5/2014 | Beausoleil | |
| 2014/0300285 A1 | 10/2014 | Medak | |
| 2014/0334157 A1 | 11/2014 | Ferguson | |
| 2015/0159852 A1 | 6/2015 | Dahlen et al. | |
| 2015/0260385 A1 | 9/2015 | Brynjolfsson | |
| 2015/0345733 A1 | 12/2015 | Bobbo et al. | |
| 2016/0123563 A1 | 5/2016 | Ferguson et al. | |
| 2017/0167695 A1 | 6/2017 | Erdener | |
| 2017/0167696 A1 | 6/2017 | Erdener | |
| 2017/0167718 A1 | 6/2017 | Erdener et al. | |
| 2017/0171929 A1 | 6/2017 | Erdener et al. | |
| 2017/0171932 A1 | 6/2017 | Puvanakijjakorn | |
| 2018/0156423 A1 | 6/2018 | Murby | |

OTHER PUBLICATIONS

Written Opinion of the International Searching Authority from International Application No. PCT/US 2016/066395, pp. 1-8, dated Apr. 13, 2017.

* cited by examiner

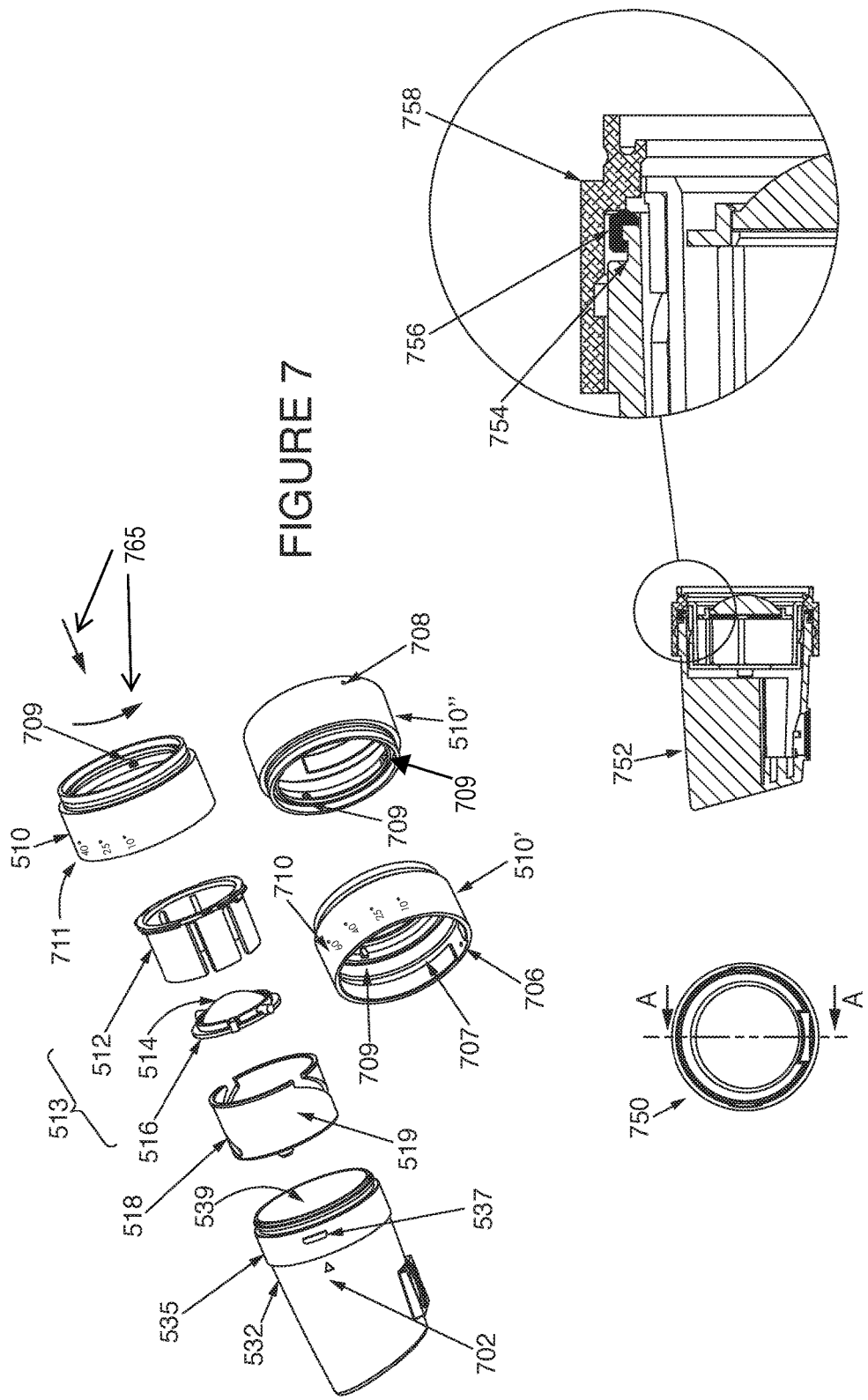

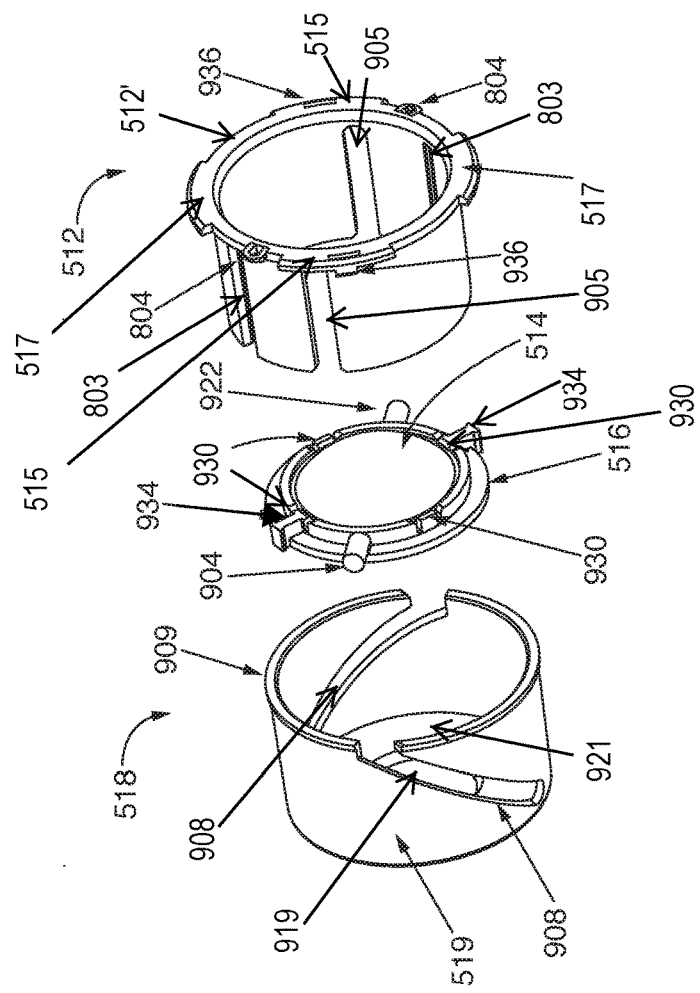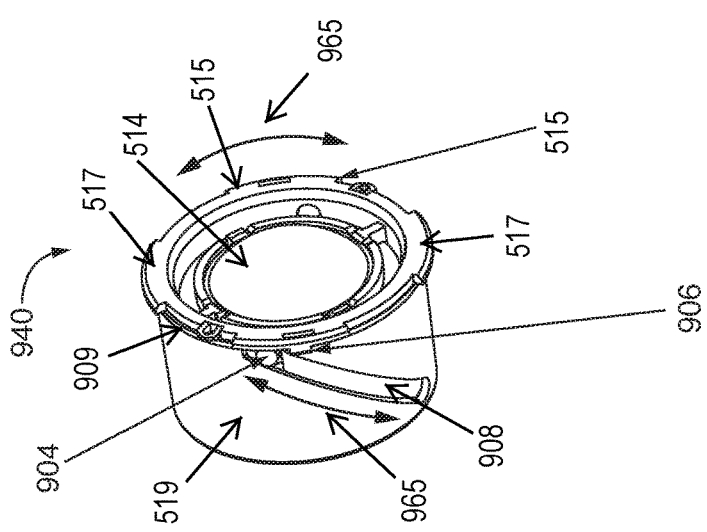
FIGURE 8

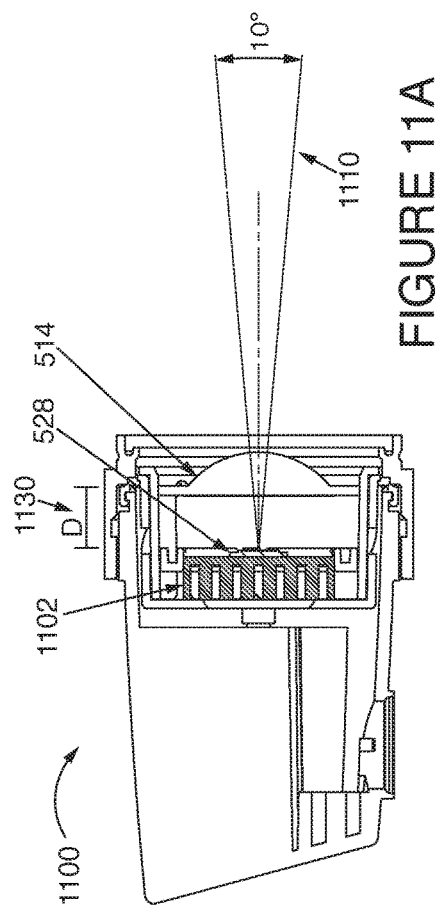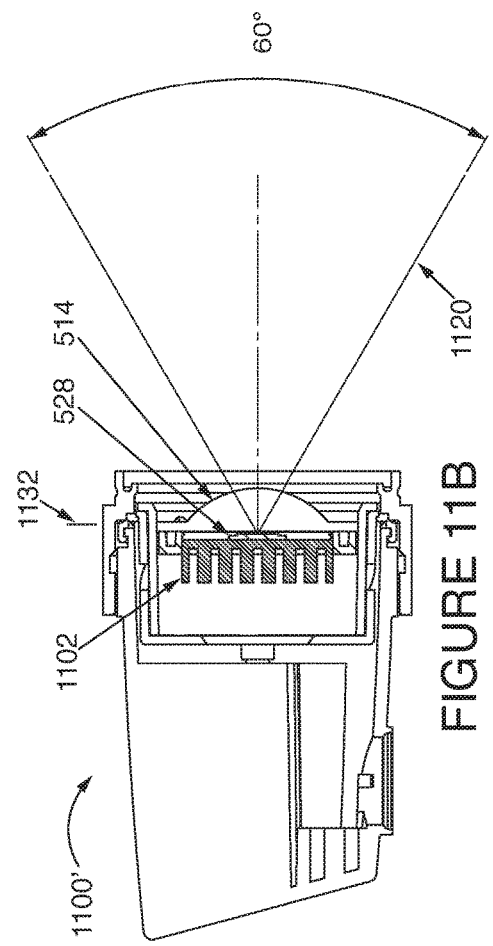

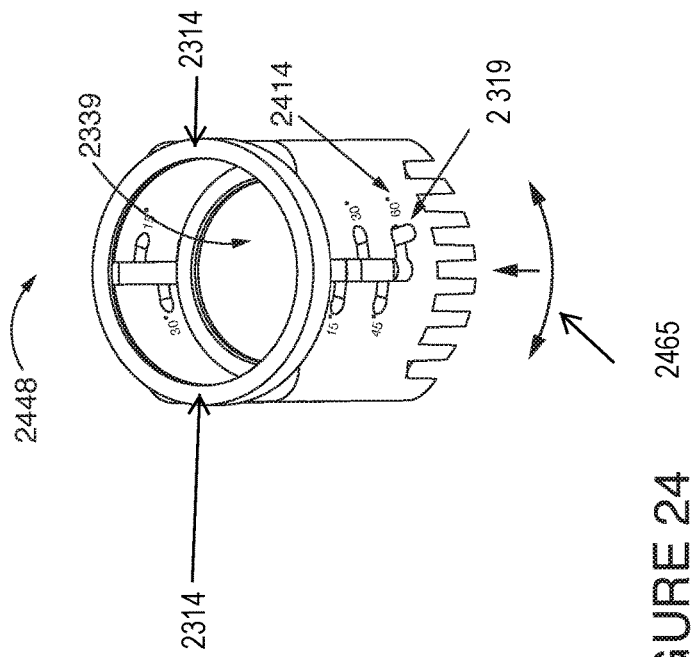
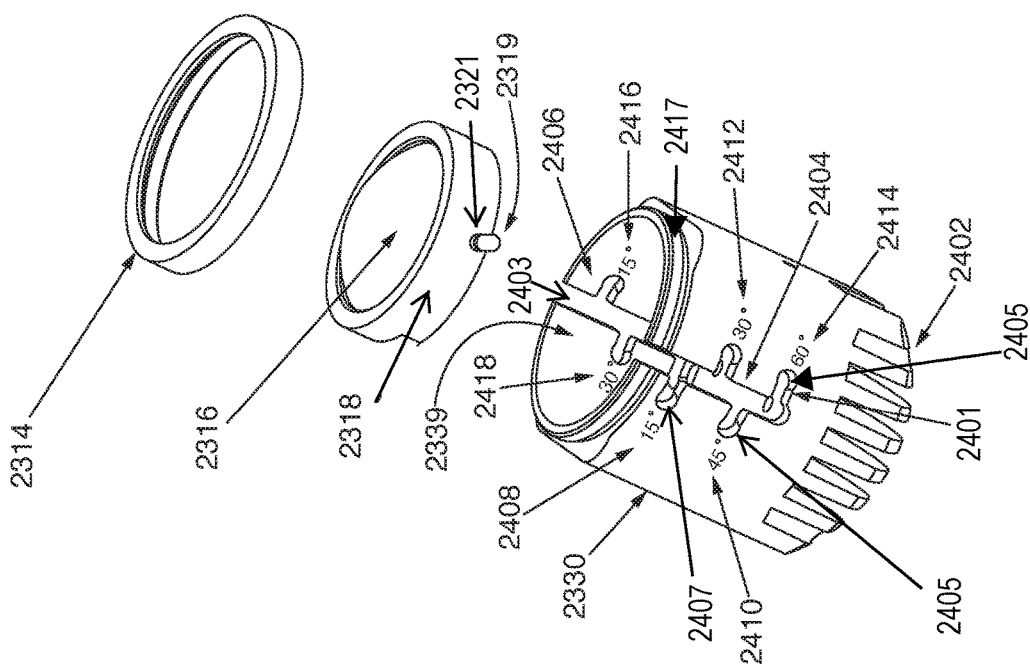
FIGURE 24

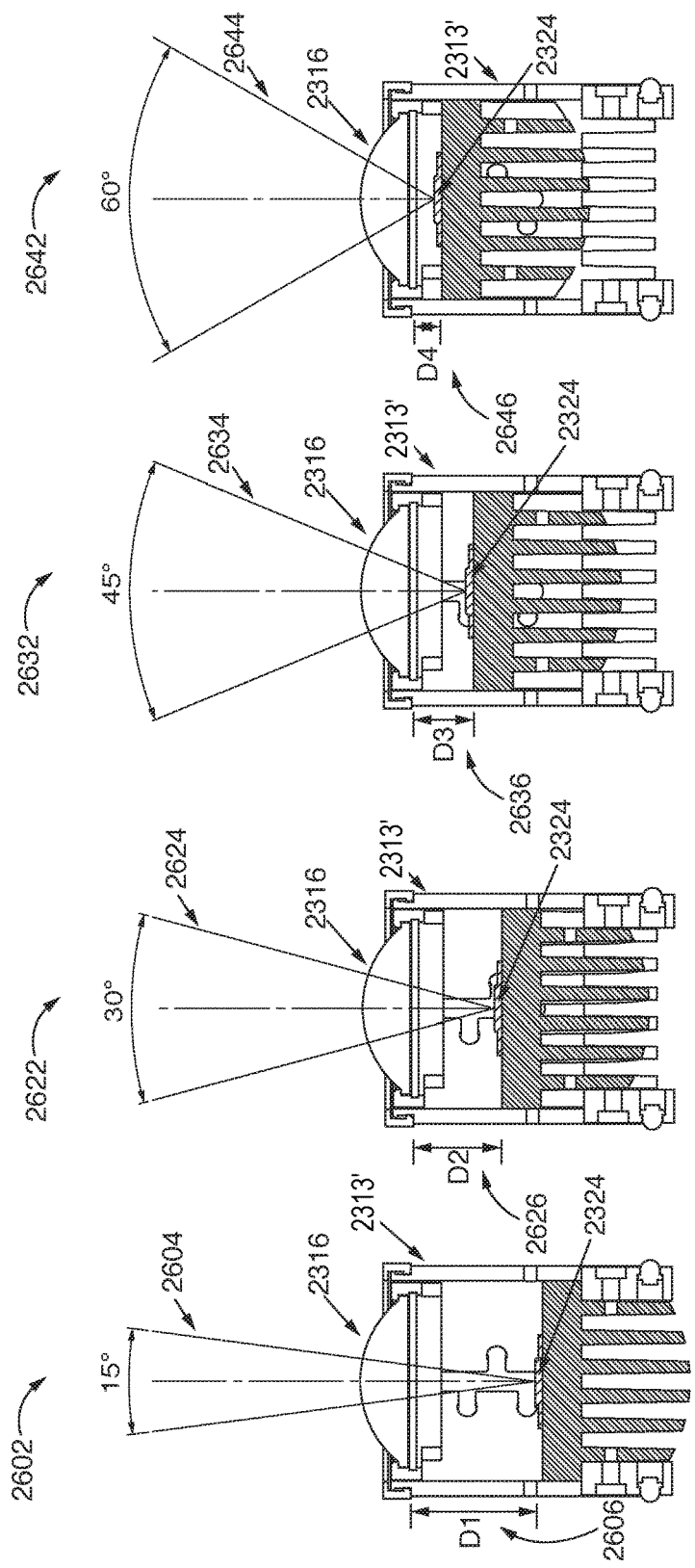

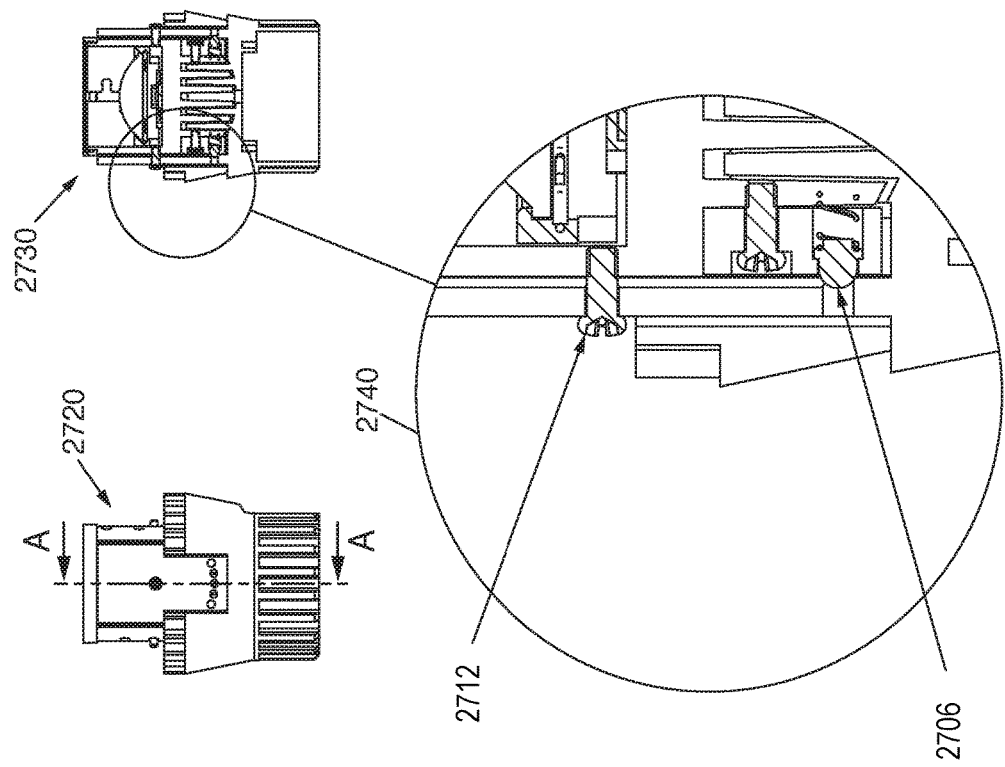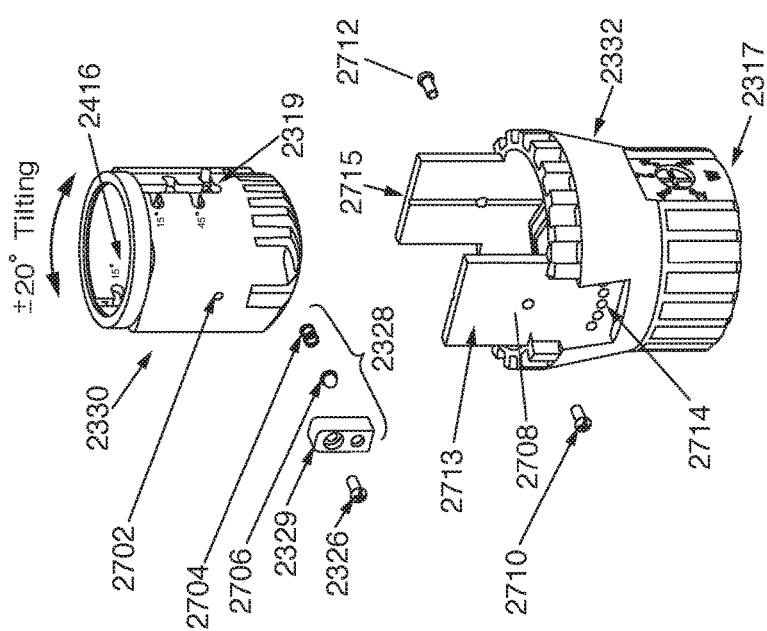
FIGURE 27

3095

| Component Label | Component Type | Element Designation Number | Component Information |
|---|---|---|---|
| C1-C4 | CAPACITOR | 3012, 3014, 3016, 3108 | 330 µF /25V |
| C5 | CAPACITOR | 3026 | 1 µF /50V |
| MVR1 | METAL VARISTOR | 3008 | MVR1812-330G |
| F1 | FUSE | 3006 | 5A/32V |
| D5-D6 | DIODE (Schottky) | 3038, 3036 | 5A/60V |
| D1-D4 BRIDGE | 4 DIODES FORMING BRIDGE (Schottky) | 3010 | 5A/40V |
| ZD2 | ZENER DIODE | 3042 | 43V |
| ZD1 | ZENER DIODE | 3028 | 6.2V |
| ZD3 | ZENER DIODE | 3022 | 6.2V |
| Q1 | IC (XL6006) | 3032 | |
| Q2 | TRANSISTOR (MMBTA06) | 3060 | NPN |
| C6 | CAPACITOR | 3034 | 47pF/50V |
| C7 | CAPACITOR | 3048 | 100µF/50V |
| C8 | CAPACITOR | 3050 | 100pf/50V |
| R1 | RESISTOR | 3056 | 1.3 OHM |
| R2 | RESISTOR | 3052 | 1.3 OHM |
| R3 | RESISTOR | 3044 | 27K OHM |
| R4 | RESISTOR | 3020 | 33K OHM |
| R5 | RESISTOR | 3068 | 10K |
| R6 | RESISTOR | 3064 | 56K |
| R7 | RESISTOR | 3046 | 1K OHM |
| R8 | RESISTOR | 3030 | 10K OHM |
| R9 | RESISTOR | 3040 | 33 OHM |
| L1 | INDUCTOR | 3024 | 100µH |
| RV1 | POTENTIOMETER | 3062 | 100K |
| C10 | CAPACITOR | 3066 | 104nF/50V |

TABLE 1

| Component Label | Component Type | Component Information |
|---|---|---|
| C1-C3 | CAPACITOR | 470 µF /25V |
| C5 | CAPACITOR | 1 µF /50V |
| MVR1 | METAL VARISTOR | MVR1812-330G |
| F1 | FUSE | 5A/32V |
| D5-D6 | DIODE (Schottky) | 5A/60V |
| D1-D4 BRIDGE | 4 DIODES FORMING BRIDGE (Schottky) | 5A/40V |
| ZD2 | ZENER DIODE | 43V |
| ZD1 | ZENER DIODE | 7.5V |
| ZD3 | ZENER DIODE | 6.2V |
| Q1 | IC (XL6006) | |
| Q2 | TRANSISTOR (MMBTA06) | NPN |
| C6 | CAPACITOR | 47pF/50V |
| C7 | CAPACITOR | 100µF/50V |
| R1 | RESISTOR | 0.82 OHM |
| R3 | RESISTOR | 27K OHM |
| R4 | RESISTOR | 30K OHM |
| R5 | RESISTOR | 56K |
| R6 | RESISTOR | 10K |
| R7 | RESISTOR | 1K OHM |
| R8 | RESISTOR | 10K OHM |
| R9 | RESISTOR | 30 OHM |
| L1 | INDUCTOR | 88µH |
| RV1 | POTENTIOMETER | 500K |
| C10 | CAPACITOR | 100nF/50V |

TABLE 2

FIGURE 30F

LED LIGHTING METHODS AND APPARATUS

RELATED APPLICATION

The present application is continuation of U.S. patent application Ser. No. 15/001,230 filed on Jan. 19, 2016 which claims the benefit of the filing date of U.S. Provisional Application Ser. No. 62/267,899 filed on Dec. 15, 2015, Ser. No. 62/269,751 filed on Dec. 18, 2015, and Ser. No. 62/270,517 filed on Dec. 21, 2015, Ser. No. 62/280,114 filed on Jan. 18, 2016 with each of the listed applications being hereby expressly incorporated by reference in its entirety.

FIELD

The present application relates to LED (Light Emitting Diode) lighting methods and apparatus, and, more particularly, with regard to LED lighting methods and apparatus which are well suited for exterior lighting applications.

BACKGROUND

Exterior lighting often involves illuminating different areas of an outdoor environment with different amounts of light, with lights of different colors and/or with lights that have beams of different widths. Often spotlights are used to illuminate particular features or elements of the outdoor environment.

To support a wide range of lighting applications lighting installers currently carry or use a wide variety of different types of lights. Even for a given type of light to support different angles, amounts of light output and/or different colors, an installer may need to disassemble one or more light fixtures in a way that may compromise the integrity of the fixtures and replace one or more components such as lamps or color filters, to configure a fixture as desired. Such field operations can result in dirt or water being introduced into the fixture affecting bulb life or the overall reliability of the fixture as exposure of electrical elements to water and dirt may result in rapid corrosion.

In view of the above it should be appreciated that there is a need for methods and/or apparatus which can support a wide variety of lighting configurations. It would be desirable if the supported lighting configurations included one or more of different beam angles, amount of light output, color of light output and/or direction of light output. Furthermore it would be desirable if changes in one or more of these characteristics could be made by an installer in the field without compromising the water tight integrity of a light fixture and/or without the need for specialized or expensive tools.

SUMMARY

Methods and apparatus for implementing an LED light fixture with different tilt settings, support for different color light filters and various attachable accessories including rock guards, cross louvers, and snoots are described. In various embodiments an LED light emitter is sealed in a fixed position in a water tight cavity of a fixture body. A movable element holder including a beam angle changing lens is mounted in the fixture body. The element holder is then moved within slots within the fixture body to change the position of the beam angle changing lens relative to the LED light emitter thereby changing the beam angle being emitted from the fixture. Color changing lenses, rock guards, cross louvers and other accessories can be added. In some embodiments, a tilting mechanism and/or on-board dimming control features are also included In various embodiments, one or more seals are used to prevent the entry of water into the light assembly.

While various features and elements are described in this summary all features and elements are not necessary or required for all embodiments of the invention.

In one particular exemplary embodiment the LED light fixture includes an upper fixture main body, an LED light source secured in the upper fixture main body, a lower fixture main body including support arms between which the upper fixture main body is mounted by pivots; and a tilt position stop for holding said upper fixture main body at one of a plurality of user selectable tilt positions. In some embodiments, the LED light fixture further includes a plurality of tilt position holes in a lower portion of at least one of said support arms, each of said tilt position holes corresponding to a different tilt position, the tilt position stop being secured into one of the tilt position holes corresponding to a user selectable tilt position at which the upper fixture main body is set. In some embodiments, the tilt position holes include holes corresponding to a 0 degree tilt position, a 10 degree tilt position, a 20 degree tilt position, a −10 degree tilt position and a −20 degree tilt position. In some embodiments, the LED light fixture further includes a first stopper bracket secured to a first bottom portion of a first side the upper fixture main body; and a first spring, the first spring being positioned between the first tilt position stop and the upper fixture main body forcing the first tilt position stop to extend out through a hole in the first stopper bracket and into one of the one of the tilt position holes corresponding to the user selectable tilt position at which the upper fixture main body is set. In some embodiments the configurable LED light fixture is an inground LED landscape light fixture.

Numerous additional features, benefits and embodiments are discussed in the detailed description which follows.

BRIEF DESCRIPTION OF THE FIGURES

FIG. 7 illustrates various features of an exemplary embodiment of a LED landscape spotlight beam changing mechanism.

FIG. 8 illustrates additional features of the exemplary embodiment of the LED landscape spotlight beam changing mechanism shown in FIG. 7.

FIG. 11A illustrates features of another exemplary embodiment of the LED landscape spotlight beam changing mechanism configured to provide a light beam output of 10 degrees.

FIG. 11B illustrates features of the exemplary embodiment of the LED landscape spotlight beam changing mechanism shown in FIG. 11A configured to provide a light beam angle output of 60 degrees.

FIG. 24 illustrates various features of an exemplary embodiment of an LED landscape inground light beam changing mechanism.

FIG. 26A illustrates features of another exemplary embodiment of the LED landscape inground light fixture beam changing mechanism configured to provide a light beam angle output of 15 degrees.

FIG. 26B illustrates features of the exemplary embodiment of the LED landscape inground light fixture beam changing mechanism of FIG. 26A configured to provide a light beam angle output of 30 degrees.

FIG. 26C illustrates features of the exemplary embodiment of the LED landscape inground light fixture beam changing mechanism of FIGS. 26A and 26B configured to provide a light beam angle output of 40 degrees.

FIG. 26D illustrates features of the exemplary embodiment of the LED landscape inground light fixture beam changing mechanism of FIGS. 26A, 26B, and 26C configured to provide a light beam angle output of 60 degrees.

FIG. 27 illustrates various features of an exemplary embodiment of a LED landscape inground light fixture light beam aiming mechanism including a tilting structure.

FIG. 30E illustrates a Table 1 including exemplary components used in the exemplary LED circuit shown in FIG. 30.

FIG. 30F illustrates a Table 2 including exemplary components for another exemplary embodiment, which is a variation of the LED circuit of FIG. 30.

DETAILED DESCRIPTION

Figure 1:
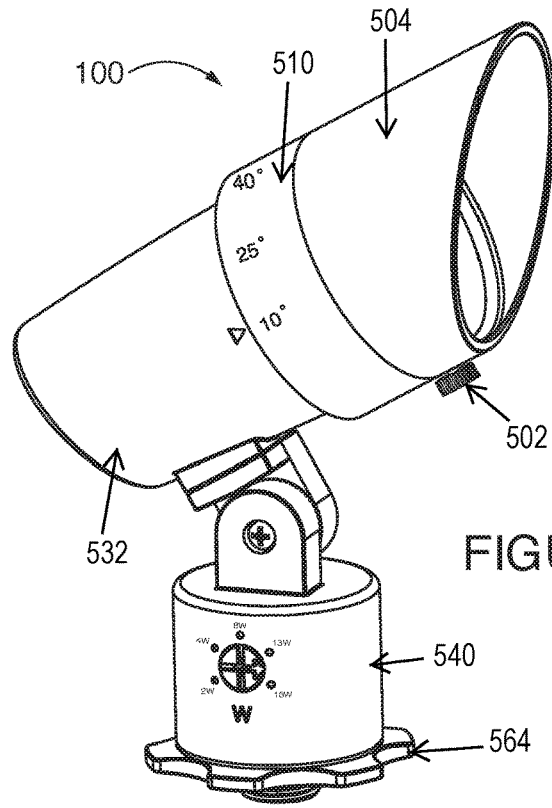
FIG. 1 is a drawing illustrating various features of an exemplary embodiment of a LED landscape spotlight.

FIG. 1 is a drawing illustrating various features of an exemplary embodiment of a LED landscape spotlight light assembly 100. The details of various features and components of the LED landscape spotlight light assembly 100 is shown in further detail in FIG. 5. As can be seen in FIG. 1, the top portion of the LED lighting assembly 100 includes a main fixture housing 532, a beam angle changing dial 510, and a shroud 504. The light shroud 504 is slid or screwed onto the beam angle changing dial 510 and secured in place with a screw 502 with a large head allowing for easy removal and changing of the shroud 504 by hand.

The adjustable beam angle control dial 510 allows for changing the beam angle of the light output of the fixture by hand without breaking one or more water tight seals which protect some of the electronics and optics of the light fixture as will be discussed below. The beam angle control dial 510 is shown with indicator markings corresponding to different angle beam positions. Alignment of the pointer on the body of the main body portion 532 of the light assembly 100 with an angle position marker on the beam angle control dial 510 indicates the angle setting at a given point in time. Angle position indicator markings may be in the form of a line or lines, a printed mark indicating a specific angle such as 10 degrees, 25 degrees, 40 degrees, 60 degrees or some other user selectable angle position. By rotating the beam angle change control dial 510 a user can change the lens angle to which the light assembly is set. The support base includes an electrical driver enclosure 540 with a light output control with corresponding wattage indicators. The electrical driver enclosure 540 is water tight and protects the components housed in the enclosure 540 from both dirt and water. A locking nut 564 can be used to secure the fixture to an electrical box after the threaded portion of the enclosure 540 is extended through a hole of the electrical box being used to mount the light fixture 100. Alternatively, rather than use retaining nut 564, the light fixture 100 can be screwed into a threaded hole of a light box such as is commonly available on many waterproof exterior electrical boxes intended to mount light fixtures outdoors.

Figure 2:
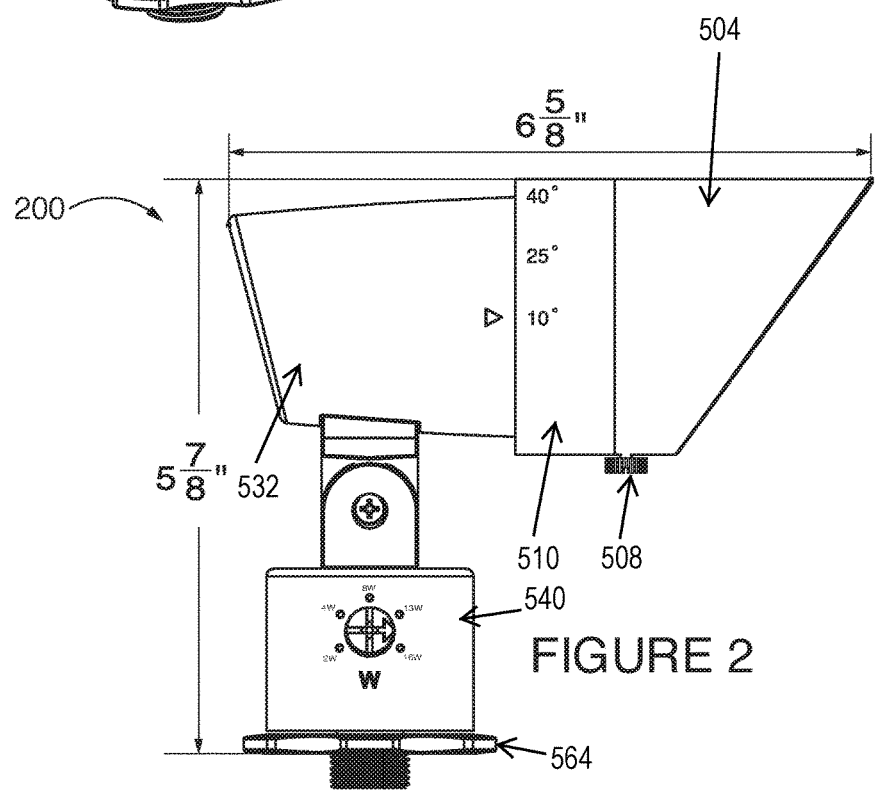
FIG. 2 is a drawing of a side view of the LED landscape spotlight of FIG. 1 illustrating various features of the exemplary embodiment of the LED landscape spotlight.

Diagram 200 of FIG. 2 is a drawing of a side view of the LED landscape spotlight light assembly 100 of FIG. 1 illustrating various features of the exemplary embodiment of the LED landscape spotlight. Diagram 200 illustrates that in the exemplary embodiment the fixture is 5⅞ inches high measured from the fixture securing nut to the top of the shroud and 6⅝ inches in length.

Figure 3:
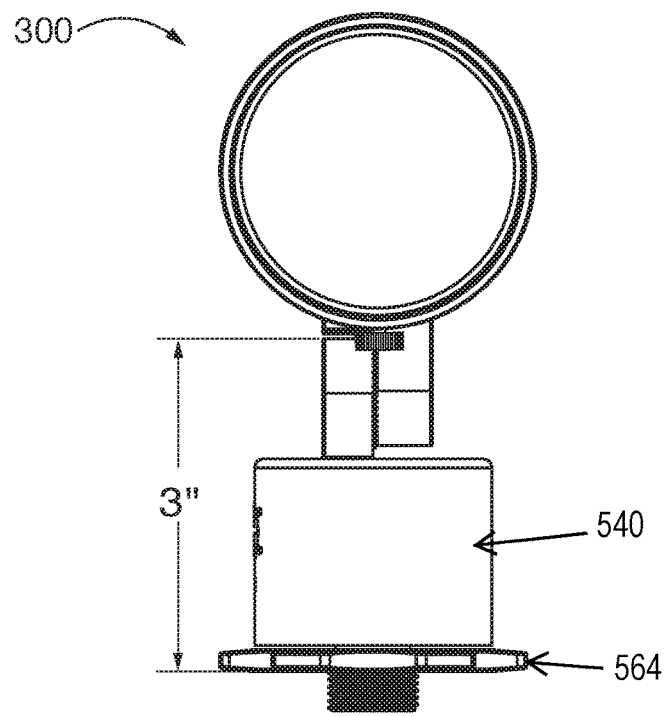
FIG. 3 is a drawing of a front view of the LED landscape spotlight of FIG. 1 illustrating various features of the exemplary embodiment of the LED landscape spotlight.

Diagram 300 of FIG. 3 is a drawing of a front view of the LED landscape spotlight light assembly 100 of FIG. 1. In the exemplary embodiment from the fixture securing nut to the thumbscrew used to attach external glare control accessories to the main body measures 3 inches.

Figure 4:
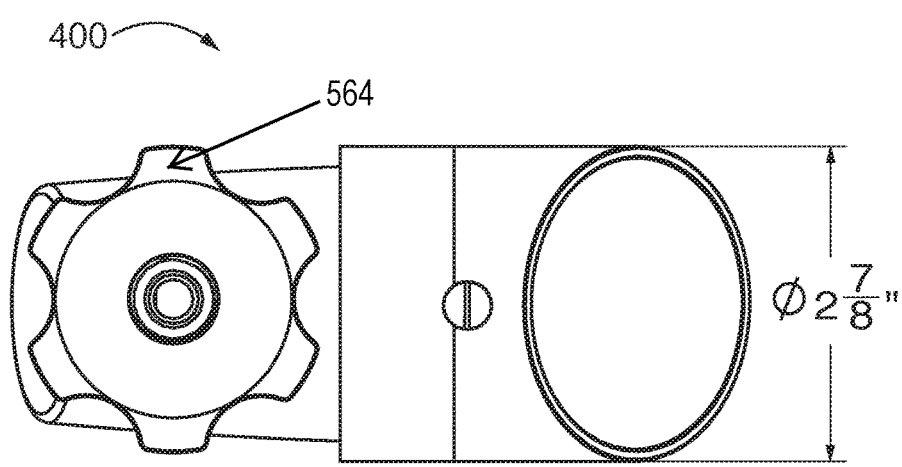
FIG. 4 is a drawing of a bottom view of the LED landscape spotlight of FIG. 1 illustrating various features of the exemplary embodiment of the LED landscape spotlight.

Diagram 400 FIG. 4 is a drawing of a bottom view of the LED landscape spotlight light assembly 100 of FIG. 1. The size of the shroud is shown as 2⅞ inches wide.

While various dimensions are shown in the Figures, these dimensions are only exemplary in nature. For the figures are not drawn to scale as emphasis is placed on explaining the invention and the invention is applicable to fixtures and parts of differing dimensions.

Figure 5:
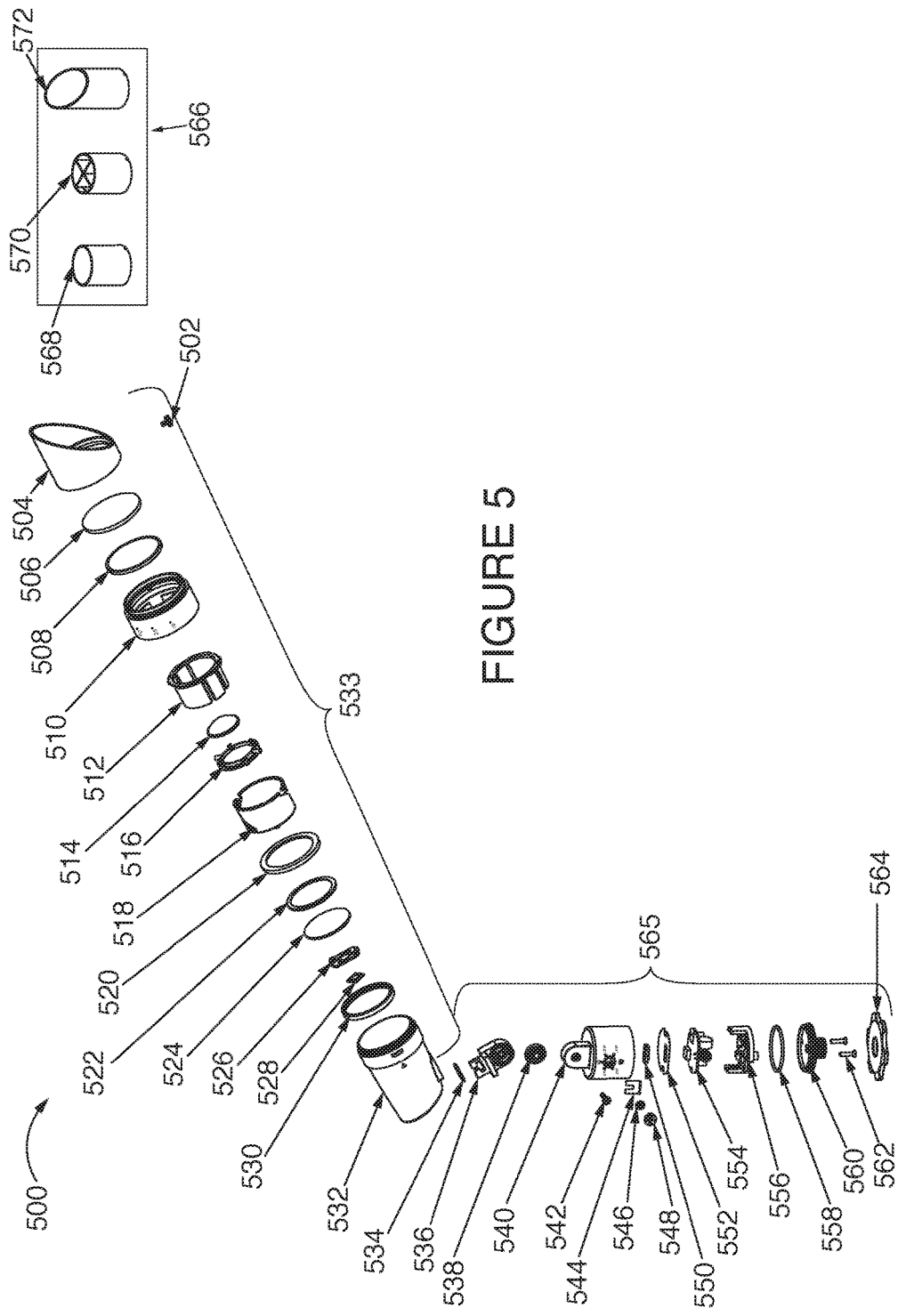
FIG. 5 is a drawing illustrating an exploded view of the exemplary LED landscape spotlight of FIG. 1 showing various features and components of the exemplary embodiment of the LED landscape spotlight.

Diagram 500 FIG. 5 is a drawing illustrating an exploded view of the exemplary LED landscape spotlight light assembly 100 of FIG. 1 showing the details of various features and components of the exemplary embodiment of the LED landscape spotlight.

Elements or steps in different figures bearing the same reference numbers are the same or similar and will only be described in detail once.

Features and components of the exemplary LED landscape spotlight light assembly 100 as shown in diagram 500 of FIG. 5 will now be described. The LED landscape spotlight fixture 100 includes structures for on-board light beam angle control, beam direction control, and control of wattage adjustments without the need to disassembly the light fixture. In some embodiments, a user can adjust the light beam angle from 10 to 60 degrees changing the light beam angle from a spot position to a flood position. In other embodiments other ranges of beam angle changes are possible. In some embodiments, a user can adjust the wattage from 2 to 16 with an operating range of 9-15 volts AC or DC with these ranges being exemplary and not limiting. The LED landscape spotlight includes seals, e.g., gaskets (flat or custom shaped to match the objects), o rings and/or other flexible shaped seals. One or more of the seals may be, and in some embodiments are made of silicone material with the seal or seals protecting the light fixture from the intrusion of water and dirt thereby providing a water proof or water resistant fixture which is also resistant to dirt. The use of LEDs as the light source provides a cost and energy savings over the use of other light sources such as incandescent bulbs and provides multiple lumen output ranges comparable to 10 W-75 W MR 16 halogen lights.

An LED landscape spotlight, implemented in accordance with one or more features, may and in some embodiments is use to provide accent lighting. The accent lighting in such a case may be and often is directional lighting that draws attention to a displayed object such as for example a statue or tree, or surface, or to highlight, dramatize, and focus attention on a defined space such as a garden or position on a monument or stage.

In at least one exemplary embodiment the LED landscape spotlight light fixture includes an upper LED light assembly 533 and a lower LED light assembly 565 also referred to as a LED light base assembly 565.

The exemplary upper LED light assembly 533 shown in FIG. 5 includes: a shroud 504, a thumbscrew 502, accessory lens 506, transparent seal 508, e.g., sealing glass 508, a beam angle control dial 510, a movable holder assembly 513 (which includes a main holder body 512 and an element holder 516), a beam angle changing lens 514, a lower holder guide 518, a LED (light emitting diode) protection layer locking nut 520, a seal 522, e.g., gasket, LED protection layer glass 524, a LED holder 526, a light source 528 which in this exemplary embodiment is a LED, a seal 530, e.g., gasket, and a fixture main body 532 also sometimes referred to as main body fixture 532.

Box 566 illustrates several exemplary optional accessories for the spotlight fixture including snoot accessory 568, cross louver accessory 570 and long shroud assembly 572 which may be used in place of or in combination with the shroud 504. One or more of the accessories may be, and in some embodiments are, used with spotlight fixture 100. Other external accessories such as shades, hoods, grills may, and in some embodiments are, used with the light fixture and can be replaced without affecting the water tight seal of the fixture.

These optional accessories for the spotlight fixture including snoot accessory 568, cross louver accessory 570 and long shroud accessory 572 provide glare control and shape the light emanating from the lighting fixture. The snoot accessory 568 is a tube that provides glare control and shapes the light leaving the fixture. It is used for example to control the direction and radius of the light beam. Snoot accessories may be, and in some embodiments are, conical, cylindrical, or rectangular in shape. A louver is a structure including a series of baffles used to shield a source from view at certain angles, to absorb, block, reflect or redirect light. The cross louver accessory 570 includes a cross blade or grid in the louver structure. One or more of the accessories may be, and in some embodiments are, used with spotlight fixture 100. The long shroud assembly 572 is a shroud which may be a shade which is longer in length it also provides glare control and shapes and directs the light beam emanating from the light fixture. In some embodiments, one or more of these accessories may replace the shroud 504.

Figure 6A:
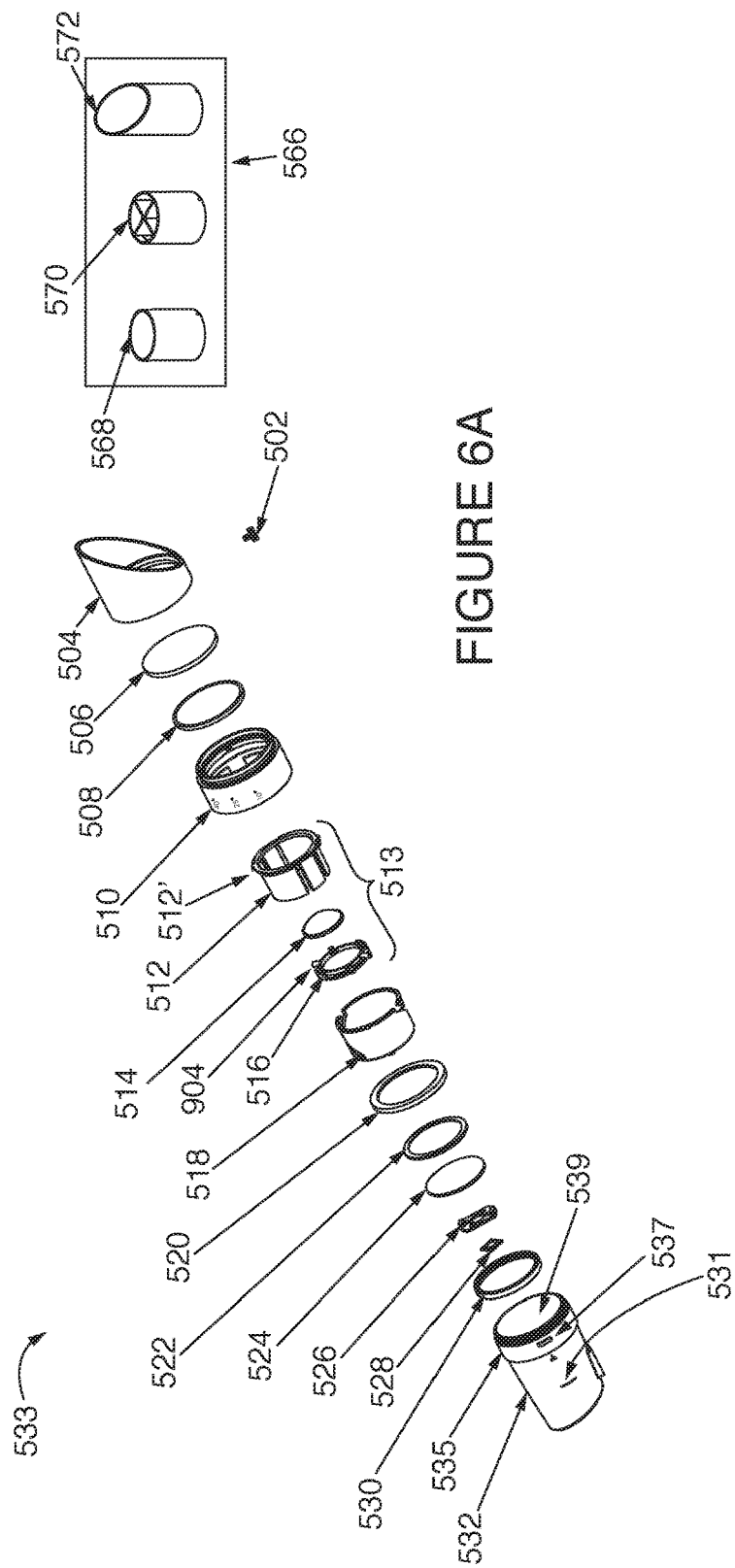
FIG. 6A is a drawing illustrating an exploded view of the upper assembly of the exemplary LED landscape spotlight of FIG. 1.

In some embodiments, one or more of these accessories may replace the shroud 504. An enlarged view of the upper LED light assembly 533 is shown in FIG. 6A with the accessory being secured using screw 502.

The elements and components of the upper LED light assembly 533 will now be discussed in additional detail in connection with FIGS. 6A, 7, 8, and 9. The shroud 504 of the upper LED light assembly 533 in some embodiments is made of cast aluminum. The shroud 504 is used for glare control. It can be rotated 360 degrees around the fixture main body 532 and is secured, after rotation to the desired position, to the fixture main body 532 with thumb screw 502. The thumbscrew 502 in some embodiments is made of stainless steel and is used to secure external control accessories such as for example glare control accessories including the shroud 504 to the fixture main body 532 and may extend through a hole or slot in the accessory and presses against the fixture main body 532 forming a friction fit and in some embodiments the tip of the screw seats in a groove which extends around the side of the top portion of the fixture main body 532 allowing the accessory to be rotated around the fixture main body 532 to a user desired position and then locked in placed by tightening the thumb screw 502.

Optional glare and light shaping accessories including the snoot accessory 568, cross louver accessory 570 and long shroud accessory 572 can be secured to the fixture main body 532 using thumb screw 502. The optional snoot accessory 568 in some embodiments is made of brass. In some embodiments, the optional snoot accessory 568 is made of aluminum. The snoot accessory 568 is a glare control accessory which may be, and in some embodiments is, used in place of the shroud accessory 504. The cross louver accessory 570 is another optional accessory that may and in some embodiments is used in place of the shroud 504. In some embodiments the cross louver accessory is made of brass. In some embodiments the cross louver accessory is made of aluminum. The cross louver accessory also provides glare control. The long shroud 570 accessory is also an optional accessory that may be, and in some embodiments is, used in place of the shroud 504. The long shroud 570 is similar in shape to the shroud assembly but is longer than shroud 504. In some embodiments shroud 570 is made of aluminum while in some embodiments it is made of brass or plastic. The shroud 570 can be and sometimes is used to provide glare control.

The accessory lens 506 is used to control or select the spectrum of the light emitted from the light fixture. In some embodiment the accessory lens 506 is made of colored glass. In some other embodiments, the accessory lens 506 is made of plastic. The accessory lens 506 in some embodiments acts as a color filter allowing light of the desired color to pass out of the light but block light of other colors by filtering out the undesired colors. The sealing glass 508 in some embodiments is tempered glass. The sealing glass 508 seals and protects the light fixture from environmental conditions such as the entry of water and/or dirt that may damage the internal components of the upper light assembly 533 such as for example the beam changing lens 514 and light source 528. In some embodiments, translucent plastic is used in place of the tempered glass.

The sealing glass 508 can remain in place while accessories such as shroud 504 and color control lens 506 may be changed.

The beam angle changing dial 510, also sometimes referred to a beam angle control dial, is made of cast aluminum but other materials such as plastic may be used. The beam angle changing dial 510 in some embodiments has markings indicating a beam angle width selected by the user and which will be output from the light fixture. The beam angle changing dial 510 changes the beam angle when it is rotated clockwise and counter clockwise as will be explained in greater detail below. Movable holder assembly 513 in the exemplary embodiment of upper light assembly 533 includes main holder body 512 and element holder 516. In some embodiments, the main holder body 512 is made of polycarbonate. The main holder body 512 is inside the beam angle changing dial 510 and contacts tabs on the beam angle changing dial 510 which cause the main holder body 512 to rotate in response to rotation of the beam angle changing dial 510. In some embodiments, the element holder 516 is made of polycarbonate.

The element holder 516 is shown in this exemplary embodiment as holding the beam angle changing lens 514. The element holder 516 includes guide pins 904 and 922 shown in greater detail in FIG. 8. As will be discussed below, the element holder 516 can rotate in response to the turning of the beam angle changing dial 510 and holder 512 and move up and down in slots of the lower holder guide 518 as the rotation occurs causing the element holder 516 to move in or out with respect to the bottom of the fixture main body 532. As arrows 765 in FIG. 7 show rotation of the beam angle changing dial 510 in a counter clockwise direction results in the beam angle changing lens moving down into the housing toward the LED light source. Rotation of the beam angle changing dial 510 in a clockwise results in the beam angle changing lens moving up and away from the LED light source. In some embodiments as will be explained in greater detail below the element holder 516 holds the LED light source instead of the beam angle changing lens 514.

The lower holder guide 518 is in some embodiments made of polycarbonate. The lower holder guide 518 in some embodiments houses the beam angle main holder body 512 and beam angle changing lens 514. The lower holder guide 518 includes one or more slotted angled grooves 909 in which the pins 904 and 922 of the element holder 516 slide as the element moves in and out as it rides in the diagonal slots 908 of the lower holder guide 518 and rotates with the rotation of the main holder body 512. Thus as the pins 904 and 922 of the element holder 516 slide up and down in the straight top to bottom slots 803 and 905 of the main holder body 512 they will also slide along the diagonal slots 908 of the lower holder guide 518. The combination of the diagonal slots 908 of the lower holder body 518 in combination with the straight slots 803 and 905 of the main holder body 512 guide and drive the element holder 516 as the beam angle changing dial 510 is rotated.

Having discussed the moveable holder assembly 513, the discussion will now turn to the sealing and protection of the LED light source 528 in the main fixture body 532 so that the light source is protected while still allowing the beam angle to be changed via rotation of the beam changing dial 510.

The LED (light emitting diode) protection layer locking nut 520 in some embodiments is made of cast aluminum. The LED protection layer locking nut 520 secures the LED protection layer 524 and seal 530 in place. The seal 530 is in some embodiments made of a silicone material, e.g., silicone sealant or another gasket material such as rubber. The LED protection layer 524 is in some embodiments made of glass. The LED protection element 524 is translucent and protects the LED light source 528 from moisture and possible moisture build up in the cavity of the main body fixture 532.

In some embodiments such as the exemplary embodiment shown in FIG. 6A, the LED holder 526 is made of plastic and is secured to the fixture main body 532. In some embodiments, the LED holder 526 is secured to the fixture main body using snaps, screws and/or glue. In some embodiments, the LED holder 526 is secured to the fixture main body using a fastener such as for example one or more screws.

As previously explained in some other embodiments than the one shown in FIG. 6A, the element holder 516 holds the LED light source 528 in which case the LED holder 526 is not used. It will be appreciated that in such embodiments, a lens holder is positioned above the LED light source 528 and element holder 516 holds the beam angle changing lens 514 in a fixed position so that when the element holder 516 holding the LED light source 528 moves, the distance between the fixed beam angle changing lens and light source will vary changing the beam angle.

The light source 528 in each of the various embodiments converts electrical energy (electricity) into light. In this example the light source is a light emitting diode, such as for example a semiconductor LED. In some embodiments, the light source is an LED that operates on low voltage for example 12V or 24V. In some embodiment the light output is white light and reaches an output of up to 900 lumens or approximately 900 lumens. In some particular embodiments, the LED produces a warm white light 2700K Correlated Color Temperature (CCT) or approximately 2700K CCT. In some embodiments, the LED light source produces a pure white light 3000K CCT or approximately 3000 CCT. In some embodiments, the LED is an Organic LED. In some embodiments, the light source is a combined LED and OLED. In some embodiments, the light source is a polymer light-emitting diode (PLED). The light source 528 in some embodiments is an LED module or assembly including a plurality of separate LEDs that produce light. The LED light source 528 is in some embodiments the LED shown and described in FIGS. 30, 30A, 30B, 30C, 30D, and 30G labelled LED and/or numbered 3054 and 3077. When the LED 528 is the LED 3054 and 3077, the LED is coupled to the control circuit 3001 by wires 578 shown in FIG. 6B.

The gasket 530 in some embodiments is made of a silicone material but use of other materials such as rubber are possible and used in some embodiments. The gasket 530 is used to seal the lens assembly from entry of water and dirt.

Figure 38:
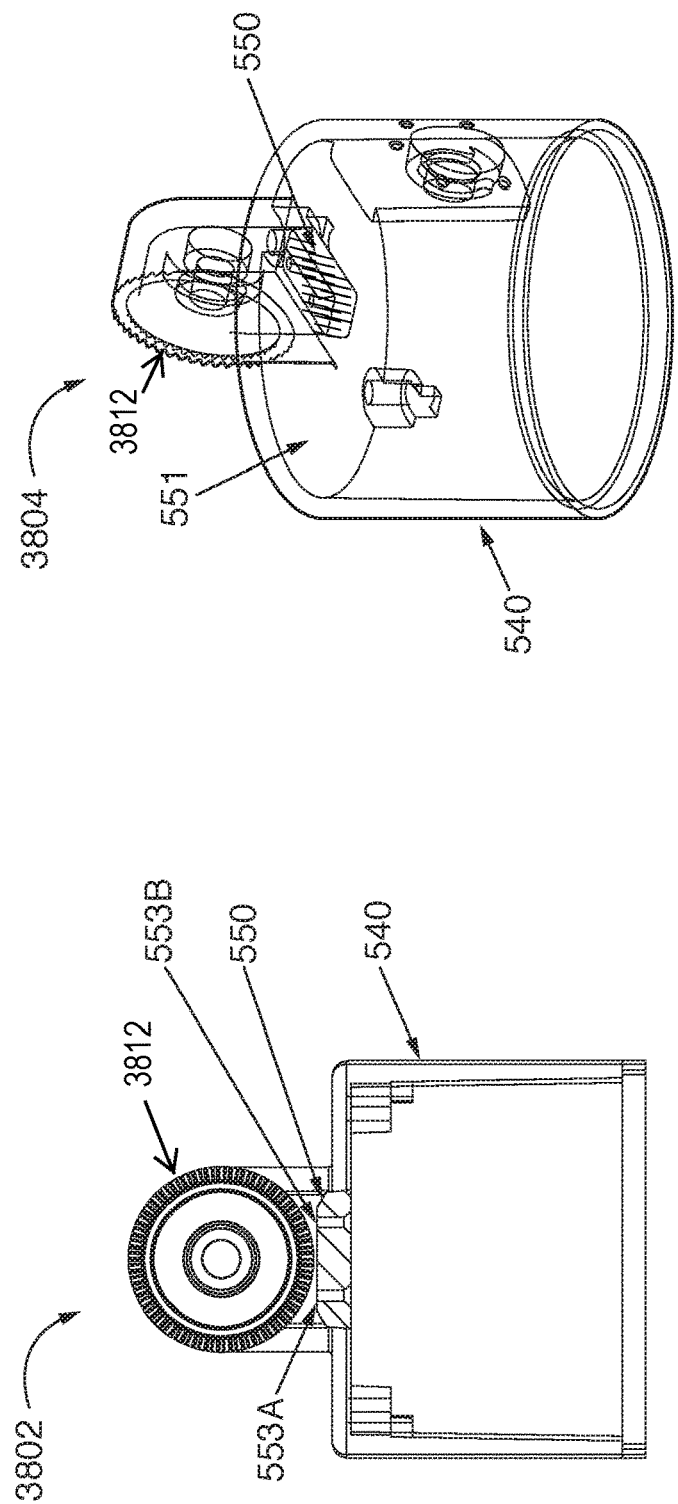
FIG. 38 illustrates features and portions of an exemplary driver housing and a sealing gasket of a base assembly of an exemplary LED landscape lighting fixture.
Figure 39:
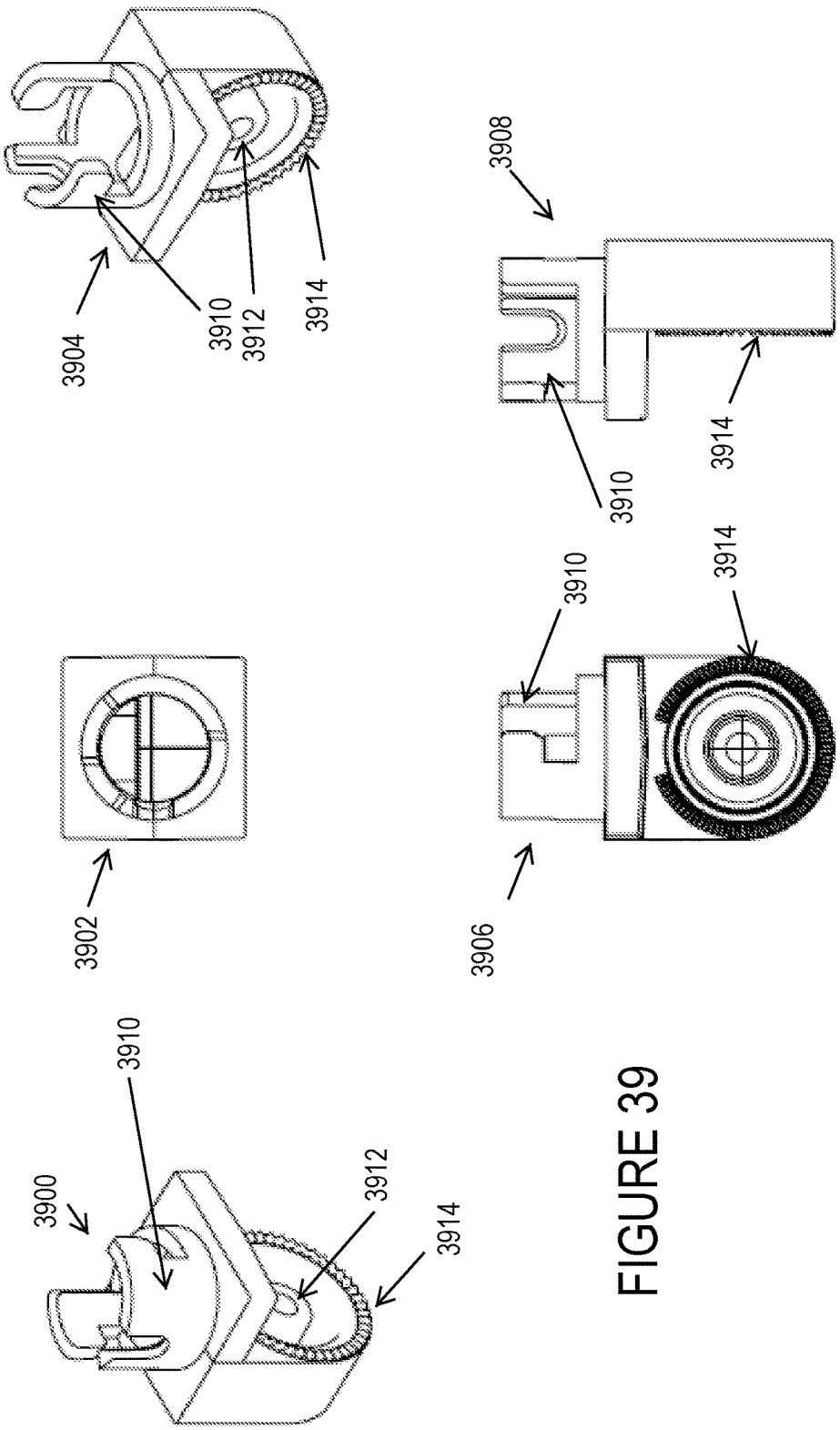
FIG. 39 illustrates features and portion of an exemplary tilting mechanism for spot light and flood light landscape lighting fixtures.

The fixture main body 532 in some embodiments is made of cast aluminum which helps to dissipate heat generated by the LED light source 528. In some embodiments the fixture main body 532 is cylindrical in shape. The fixture main body 532 includes a cavity 539 (see FIG. 7) in which various components of the upper light assembly 533 including the light source 528 are housed. In some embodiments, at least a portion of the cavity 539 of the fixture main body 532 is filled with a sealant such as for example a silicone material that seals and protects the light source 528 from water and dirt. The fixture main body 532 also includes an opening in a portion of the wall or rear bottom portion of the fixture main body 532 through which wires 578 pass and are connected to supply power to the light emitter 528. The fixture main body 532 is attached to the LED light base assembly 565. The fixture main body 532 is attached to the tilting mechanism 536 of the LED light base assembly 565. In some embodiments, a tilting mechanism is not used and instead a mounting bracket in the same form but which does not tilt is used in place of the tilting mechanism. FIG. 39 shows several different perspective views of the tilting mechanism 536 (3900 angled view, 9304 angled view, 3902 top view, front view, and 3908 side view). Angled perspective views 3900 and 3904 of the tilting mechanism 536 show the teeth 3914 which mate and interlock with the teeth 3812 in the upper power of the housing driving 540B shown in diagrams 3802 and 3804 of FIG. 38. When the tilting mechanism locking screw 542 is loosened the tilting mechanism can be rotated in a clockwise or counter clockwise direction changing the direction of the light beam being emitting from the light fixture. After rotating the tilting mechanism so that the light beam is being emitted in the desired direction the tilting mechanism locking screw 542 is tightened securing and locking the tilting mechanism in place. The teeth or grooves 3914 mate with the teeth 3812 in the upper driver housing 540B interlocking and further preventing the tilting mechanism from moving once the tilting mechanism 536 has been secured in place by the locking screw 542. The upper portion 540B of the driver housing 540 includes a hole or opening with smooth side walls through which the locking screw 542 extends. The locking screw 542 then extends through the seal 538, e.g., a sealing gasket, which is positioned between the upper portion of the driver housing 540B and the tilting mechanism 536 and into the hole 3912 of the tilting mechanism 536. The hole 3912 includes female threads for receiving the screw 542. In some embodiments a gasket such as for example a silicone O-ring is positioned on the shaft of the screw 542 and seals the hole or opening in the upper driver housing 540A through which the screw passes sealing it from entry of water and dirt. The tilting mechanism 536 includes locking connector 3910 including arms which are integral to the tilting mechanism 536 and which lock into the base of the fixture main body 532 when inserted and rotated into position.

As discussed further below in at least some embodiments a seal 534 is positioned between the tilting mechanism which is a movable mount or in some embodiments the fixed mounting bracket and seals the fixture main body 532 and the tilting mechanism or fixed mounting bracket from dirt and water at the point the power wires enter the fixture main body 532.

The LED light assembly 533 will now be described in greater detail with reference to FIGS. 6A, 7, 8, 9, 10A and 10B. In the exemplary embodiment a beam angle changing lens 514 is moved relative to the position of an LED light source 528 to change the beam angle. In other embodiments it should be appreciated that the LED light source 528 is moved relative to the position of a fixed beam angle changing lens placed over the LED light source 528. Thus, while described in the context of an example where the beam angle changing lens is moved, in other embodiments the LED light source is mounted in the movable holder assembly 513 and the beam angle changing lens mounted above element holder 516 which may move in and out with respect to the front of the fixture assembly 533. In either embodiment, use of a holder assembly 513 in combination with a slotted lower holder guide 518 allows the distance between an LED light source 528 and a beam angle changing lens (514) for directing light to be changed as the beam angle changing dial 510 is rotated. This change in distance between the LED light source and lens is achieved by a simple rotation of the dial 510 without requiring disassembly of the LED light assembly 533 and without compromising one or more of the water tight seals included in the LED light assembly as will be discussed below.

As previously discussed, the LED light assembly 533 shown in FIG. 6A includes an LED light source 528 which is mounted in the LED holder 526 and inserted into the cavity 539 of the fixture main body 532 and secured at a fixed location 531 within the fixture main body 532. The holder 526 is secured to the fixture main body 532 using screws, glue, snaps or some other fastening technique.

Figure 6B:
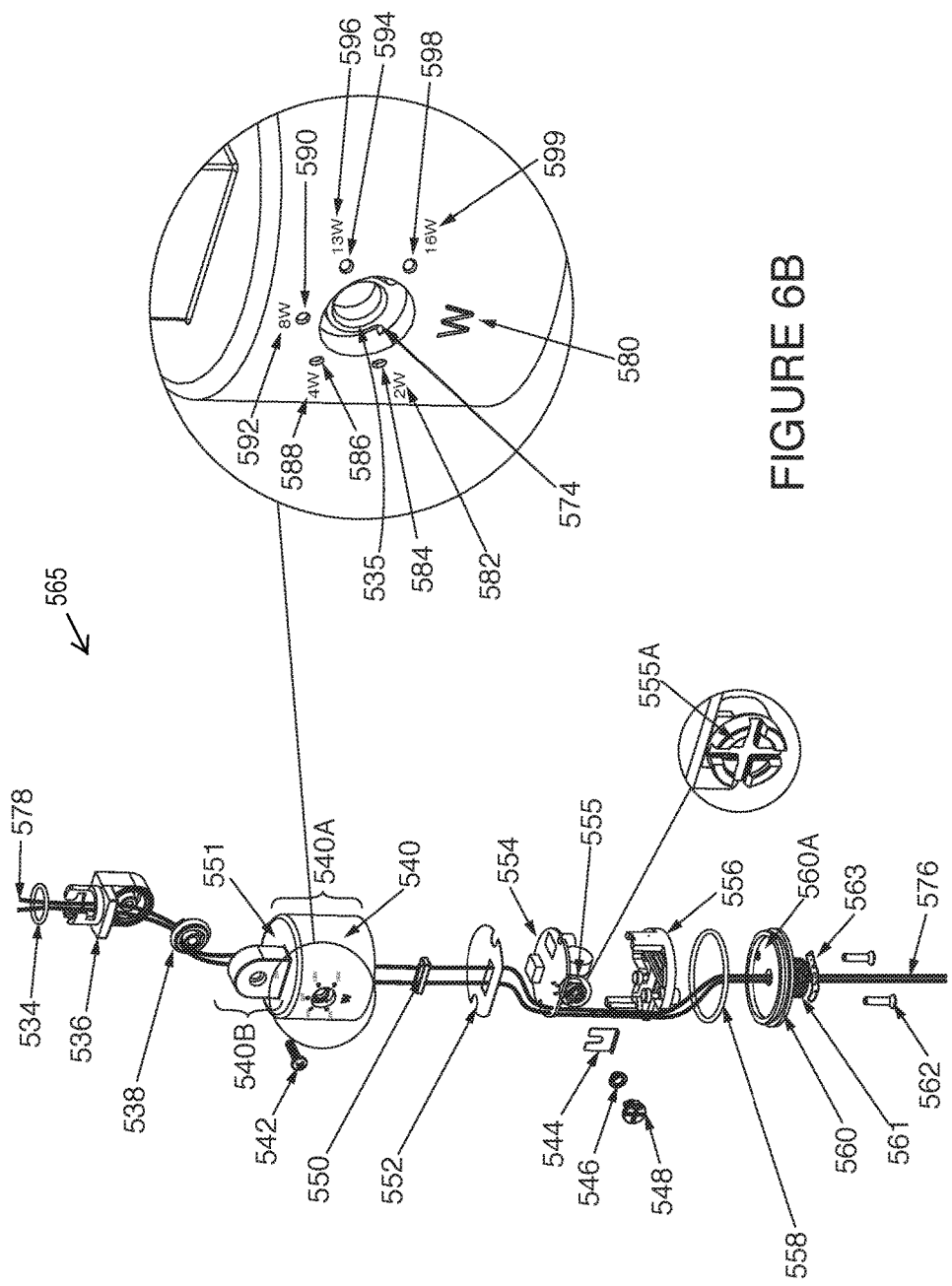
FIG. 6B is a drawing illustrating an exploded view of the lower assembly of an exemplary LED landscape lighting fixture.

The LED light source 528 is connected to wires 578 shown in FIG. 6B which extend through an opening in the bottom portion of the fixture main body 532. The opening in the bottom portion of the fixture main body 532 is sealed with glue, e.g., a waterproof silicone adhesive which in some embodiments is also used to glue, e.g., pot, the led light emitter into the bottom of the cavity 539 at the desired light emitter location 531. The fixture main body 532 is attached to a mounting portion of the tilting mechanism 536 of LED light base assembly 565. As previously explained the tilting mechanism 536 includes a locking connector 3910 shown in FIG. 39 with arms that extend up into the fixture main body 532 and when rotated into position secure and lock the fixture main body 532 to the tilting mechanism 536. The tilting mechanism 536 is extended or in some embodiments threaded into a hole in the bottom of the fixture main body 532 through which the wires 578 pass. The hole is sealed by a seal 534 (see FIG. 6B) which is placed between the fixture main body 532 and the titling mechanism mount portion as well as with glue in some embodiments. In some embodiments the gasket 534 is a rubbery block through which the power wires pass and when wedged into the opening compresses around the wires to provide a watertight seal.

A top portion 535 of the fixture main body 532 includes one or more mounting pads 537, also sometimes referred to as tabs, which extend outward from the wall of the fixture main body 532. The mounting pads 537 can and in some embodiments are used to hold a beam angle changing dial 510 in place over the top portion 535 of the fixture main body 532 while allowing the beam angle changing dial 510 to rotate. This can be seen more clearly in FIG. 7. The assembly of the beam angle changing dial 510 onto the fixture main body 532 is achieved in some embodiments by sliding the beam angle changing dial 510 over the top portion 535 of the main body fixture 532 with the tabs 537 aligned with notches 706 inside the beam angle changing dial (see FIG. 7) and then once the tabs 537 are in a retaining groove 707 rotating the beam angle changing dial 510 so that the tabs slide into the groove and while in the retaining groove 707 prevents the beam angle changing dial 510 from moving forward off the top of the fixture main body 532. A seal, e.g., an O ring 530 or other gasket, is placed around the outside of the top portion 535 of the fixture main body 532 and seals between the inside surface of the wall of the cylindrical beam angle changing dial 510 and the outer surface of the top portion 535 of the fixture main body 532. The seal 530 provides a water tight seal even as the beam angle changing dial 510 is rotated and moves around the top portion 535 of the fixture main body 532 of the light fixture.

Referring now to FIG. 7, it can be seen that in some embodiments the beam angle changing dial 510 includes angle markings 711 on the exterior side surface of the beam angle changing dial 510, e.g., 10 degrees, 25 degrees, 40 degrees, etc. (See FIG. 7) In this example, the beam angle changing dial has angle markings for 10, 20, 40 and 60 degrees (see angle markings 710) but in other embodiments other degree angle markings may be and sometimes are used depending on whether the supported range of angles is smaller or larger than in the exemplary embodiment. The fixture main body 532 includes an angle indicator marking 702, e.g., an arrow or dot, on its exterior surface which when aligned with an angle marking 711 on the beam angle changing dial 510 indicates the beam angle setting to which the light fixture is set. Thus, from the outside of the LED light assembly 533 by looking at the angle on the beam angle changing dial 510 adjacent the mark 702 a user can easily see the current angle setting in effect and by rotating the beam angle changing dial 510 can alter the beam angle as will be discussed further below by changing the relative distance between the LED light source 528 and a beam angle changing lens 514 without opening the LED light assembly 533.

Referring once again to FIG. 6A, it can be seen that the fixture main body 532 includes cavity 539 through which wires 578 enter at the bottom through an opening sealed with glue. The wires 578 extend into the cavity 539 and are connected to the light source 528 thus providing power to the LED light emitter 528 which is mounted in a holder 526 which is secured, e.g., using glue, snaps and/or screws, at the fixed location 531 within the main body fixture 532. While the bottom of the cavity portion in which the LED light emitter 528 is housed is sealed by glue and/or a gasket 534 such as for example an O-ring in the area where wires 578 enter, the cavity portion in which the LED light source 528 is mounted is sealed at the top of the cavity 539 through which light exits by protection glass 524 which is held in place by an adhesive and/or a seal, e.g., gasket 522, and locking nut 520. In embodiments where a locking nut is used, the locking nut 520 may include a recessed surface for receiving the gasket 522 and protective glass 524 and for pressing the gasket against the glass as the locking nut 520 is screwed on threads located at the top outside portion of the fixture main body 532.

Thus, it should be appreciated that the LED light source 528 is sealed in the cavity 539 and protected from water and dirt entry at the top by the sealing glass 524 and at the bottom through the use of glue and/or a gasket or O ring 534. Additional layers of sealing protection are provided by the gasket 530 which seals the bottom portion of the beam angle changing dial 510 and a changing dial protective sealing glass 508 which is glued to the top of the changing dial 510 sealing the top of the changing dial and protecting the elements including a movable holder assembly 513, and a lower holder guide 518 into which said holder assembly 513 is inserted and which are covered by the beam angle changing dial 510, from dirt, water and other contaminants.

The holder assembly 513, in the FIG. 6A embodiment, includes a main holder body 512 and an element holder 516. Element holder 516 is inserted into the holder 512 with the pins 904 and 922 of the holder sliding in the vertical slots 803 and 905 (see FIG. 8) of the main holder body 512 and the holder being forced to rotate as the holder 512 rotates. In some embodiment the main holder body 512 is inserted into the lower guide 518. While the holder 512 snaps onto the lip 909 also referred to as a flange (see FIG. 8) of the guide 518 in some embodiments it can rotate within the guide 518 and the element holder 516 can move along the diagonal slots 908 of the guide 518.

In some embodiment the lens 514 has an outer lip which is used to secure the lens in the element holder which includes snaps 930 which protrude over the lip of the lens and hold it in the element holder after the lens is snapped into the element holder.

As should be appreciated, the element holder, depending on the embodiment and whether the light emitter or lens is to be moved, holds one of the beam angle changing lens 514 or the LED light source 528 which is held in the holder assembly 513. In the FIG. 6A embodiment, it is the beam angle changing lens 514 that is held in the element holder 516 of the holder assembly 513. The element holder 516 includes at least one guide pin 904 (see FIG. 9) but in some embodiments has one guide pin on each side of the element holder 516 (e.g., guide pins 904 and 922) while even more guide pins are possible and used in some embodiments. The main holder body 512 of the holder assembly 513 includes drive flange 512' which engages a drive tab 709 on the inside wall the beam angle changing dial 510. In at least some embodiments the beam angle changing dial 510 includes multiple drive tabs, e.g., one on each side, for engaging corresponding drive tabs, one on each side, of the main holder body 512.

The holder assembly is inserted into a lower holder guide 518. The lower holder guide 518 includes at least one angled slot (908) (see FIG. 9) but normally two 180 degrees apart, in a sidewall (519) of said lower holder guide 518 and extending at an angle from a lower portion of said sidewall 519 to an opening in the top of said sidewall 519. The guide pin (904) of the element holder 516 is inserted into said at least one angled slot 908 and travels along said angled slot 908 in response to rotation of the main body holder 512. Travel of the holder along the angled slot changes a distance between the LED light source 528 and the beam angle changing lens 514 as the holder assembly 513 travels in said angled slot 908 and moves closer or further from the LED light source. Thus by rotating the changing dial 510 a user can alter the position of the LED light source to the beam angle changing lens 514 since the light beam angle changing lens will move closer to or further from the light source 528 as the element holder 516 moves with the main holder body 512 guided by the pin 904 that extends into the angled slot of the lower holder guide 518 as the changing dial 510 rotates. In some embodiments two guide pins and corresponding slots are used. The guide pins 904 and 922 extend into and move along the angled slots of the lower holder guide 518 as the changing dial 510 rotates.

In some embodiments, the LED light assembly includes a beam angle locking set screw 708 shown in FIG. 7 which extends through an opening in the beam angle changing dial 510 and presses against the outside wall of the fixture main body 532. Once the user has rotated the beam angle changing dial to the desired setting, the beam angle lock screw 708 is screwed down so that it makes contact with and is pressing against the fixture main body 532 and locks the beam angle changing dial in place preventing movement, such as unintentional movement, of the beam angle changing dial 510. When the user wishes to change the beam angle of the fixture the beam angle lock screw 708 is loosened until the screw is no longer making contact with or pressing against the fixture main body 532 with enough force to prevent the beam changing dial from rotating. Once loosened the beam angle lock screw 708 is loosened the beam angle change dial 510 can be rotated to a new beam angle position and the beam angle lock screw 708 re-engaged locking down the beam changing dial 710 from rotating.

In various embodiments one or more accessories are mounted to the top of the beam angle changing dial 510 by sliding the accessory such as a shroud 504 over the top of the beam angle changing dial 510 and securing the accessory to the beam angle change dial 510 with one or more screws (e.g., thumbscrew 502) which may be and in some embodiments are hand tightened.

The accessory, such as the shroud 504, can be and in some embodiments is used to hold a color changing lens or filter 506 over the outer protective glass 508 through which emitted light passes. A user can easily change the color of light by removing the shroud 504 and replacing the color changing lens 506 with a different color lens and then placing the shroud 504 back in place. In addition to shroud 504, a snoot 568, a cross louver 570 or a shroud 572 with a longer length than the shroud 504 may be and sometimes are used in place of shroud 504.

A color filter lens 506 placed over said outer sealing lens 508 and held in place by an accessory may be used to filter the light and provide different light colors and patterns. Thus, in at least some embodiments the holder assembly 513 includes at least one guide pin 904 and drive flange 512' where the holder assembly 513 holds one of the lens 514 or the LED light source 528. In addition the beam angle changing dial 510 includes at least one inner tab 709 for driving a drive flange 512' of the holder assembly 513 to induce rotation in the holder assembly 513 and movement within said angled slot (908) when said beam angle changing dial (510) is rotated.

Thus it should be appreciated that filters and accessories can be changed as well as the beam angle, without affecting the numerous water tight seals and protections against water and dirt intrusion incorporated in to the LED light assembly 533.

FIG. 7 shows additional features and details of some of the components of the LED spot light upper assembly 533.

The top portion 535 of the fixture main body 532 includes one or more mounting or locking pads 537 as previously noted. In the exemplary embodiment two mounting pads at 180 degrees from each other are used which are on the outer surface of the fixture main body 532 and they extend outward from the wall of the fixture main body 532. The mounting pads 537 in some embodiments are used to hold the beam angle changing dial 510 in place over the top portion 535 of the fixture main body 532 while allowing the beam angle changing dial 510 to rotate. The beam angle changing dial 510 includes angle markings 711 which indicate the beam angle setting to which the light fixture is set when aligned with the angle indicator marking 702 on the outer surface of the fixture main body 532. The beam angle changing dial 510 includes at least one inner tab 709 for driving a drive flange 512' of the holder assembly 513 (see FIG. 9) to induce rotation in the holder assembly 513 and movement within said angled slot (908) when said beam angle changing dial (510) is rotated. A beam angle changing locking screw 708 is used in some embodiments to lock and prevent the beam angle changing dial 510 from moving once the beam angle changing dial has been rotated to the desired beam angle therein locking and fixing the beam angle for the light fixture.

Several different views of the beam angle changing dial are shown in FIG. 7 to provide different perspectives of the beam angle changing dial 510 and so that different features of the beam angle changing dial 510 can be illustrated. Beam angle changing dial 510' illustrates the beam angle changing dial 510 at a slight angle so that the side of the beam angle changing dial 510 into which the main body holder 512 fits can be seen. Beam angle changing dial 510' illustrates the securing or retaining groove 707 and notches 706 inside the beam angle changing dial with which the tabs 537 of the fixture main body 532 are aligned so that the change dial can be assembled so that it is in the retaining groove 707. While only one notch 706 is shown a second notch or slot opening is included in some embodiments at 180 degrees from the notch 706 shown which are aligned with the second locking pad or tab 537 on the fixture main body 532. When assembled the tabs 537 are in a retaining groove 707 so that when the beam angle changing dial rotates the tabs 537 prevent the beam angle changing dial 510 from moving forward off the top of the fixture main body 532.

The view 510" of the beam angle changing dial 510 show in FIG. 7 is an top perspective view of the beam angle changing dial 510'. The view 510" shows the beam angle changing lock screw 708. The beam angle changing dial 510 shown in the different views 510' and 510" show the inner tab 709 for driving a drive flange 512' of the holder 512 to induce rotation in the main holder body 512 and movement of the element holder 516 and lens 514 along the angled slots 908 when said beam angle changing dial 510 is rotated.

Beam angle markings 710 of 60 degrees, 40 degrees, 25 degrees and 10 degrees are shown on the beam angle changing dial 510 in view 510'.

FIG. 7 also shows the grouping of elements referred to as the holder assembly 513. The holder assembly 513 includes the main holder body 512 and element holder 516. In this exemplary element holder 516 holds the lens 514. Also shown in FIG. 7 is the lower holder guide 518 with side wall 519 which has one or more angled slots 908 (see FIG. 9). Illustration 752 is a side cross sectional view of upper light assembly 533 in an assembled form taken along the line defined by arrows A in illustration 750. Illustration 750 is a front view of the upper light assembly 533 in an assembled form. Reference number 756 indicates a view of the seal 530 being pressed between a portion 758 of the beam angle changing dial 510 and a portion 754 of the fixture main body 532 therein sealing the fixture main body 532 from entry of water and dirt.

FIG. 8 illustrates various features of the upper light assembly 533 and will be used in explaining how the beam angle is changed by rotating by the beam angle changing dial 510. The elements of the upper light assembly 533 when put together appear as shown in illustration 940. The main holder body 512 can rotate within the lower holder guide 518 as indicated by the curved arrows identified by reference number 965.

As shown in FIG. 8, main holder body 512 includes drive flange 512' which includes 4 wider portions. Two of the wider portions identified by reference 513 are flat while two other portions 515 of the flange 512' include snaps 936. The snaps 936 snap onto a top flange 909 of the lower holder guide 518. The snaps 936 keep the main holder body 512 from separating from the lower holder guide while allowing the main holder body 512 to rotate with respect to the lower holder guide 518 while the flange 909 of the lower holder guide 518 supports the flange 512' of the main holder body.

The extended portions 513, 515 of the flange 512 including flange portions 513, 515 as well as actuators 804 which are an integral part of the flange 512' interact with one or more of the drive tabs 709 on the inside of the beam angle changing dial 510 causing main holder body 512 to rotate with the beam angle changing dial 510. The main holder body 512 includes vertical stabilizing pin slots 803 and vertical guide drive pin slots 905.

The element holder 516 includes stabilizer pins 934 which extend outward beyond the lip of the element holder 516. The top inside portion of the lens stabilizer pins 934 near the lens 514 include a lens snap 930 while the outside of the stabilizer pins 934 in some embodiments includes a T shaped head and a rectangular shaft. The T shaped head facilitates retaining of the stabilizer pin 934 in the stabilizer pin slot 803 of the main holder body 512 while the rectangular shaft helps prevent tilting of the element holder 516 and stabilization of the element holder 516 as it moves up and down in main holder body 512 guided by the slots 803 which extend perpendicular or generally perpendicular to the flange 512' in what would be a vertical direction if the spotlight was facing straight up.

In addition to the stabilizing pins 934 the element holder 516 includes a pair of guide drive pins 904 and 922. The guide drive pins 904 and 922 are in some embodiments round pins that extend out further than the stabilizer pins 934 and pass through the angled drive slots 908 of the lower holder guide 518. The lower holder guide 518 is fixed in the main holder body by screws and/or glue, e.g., located in the flat bottom portion 921 of the lower hold guide 518 adjacent a center hole 919 in the bottom of the lower holder guide 518 through which light from the light emitter 528 passes.

While stabilizer pins 934 remain inside the body of the lower holder guide 518, the drive guide pins 904 and 922 in the angled slots 908 of the lower holder guide 518 pass through the sidewall 519 of the lower holder guide 518. The sidewall of the lower holder guide 518 exerts pressure on the drive pins 904 and 922 as the beam angle changing dial 510, main holder body 512 and element holder 516 rotate due to user rotation of the beam angle changing dial 510 forcing drive tabs 709 against an extended flange portion 515, 517 and/or 804 causing rotation of the main holder body 512 and element holder 516 mounted therein. While the term drive tab has been used, it should be appreciated that the drive tabs may be in the form of have a pointed shape, a rectangular shape or some other form which can transfer a force from the beam angle changing dial 510 to another element, e.g., main holder body 512 to induce the desired movement with the rotation of the beam angle changing dial 510.

The force exerted by the wall 519 against the drive pins 904 and 922 as the element holder 512 rotates in the lower holder guide 518 drives the pins 904 and 922 to move in the angled slots 908 causing the element holder 516 to move up or down in the straight slots 803, 905 of the main holder body 512. In this way, when a user rotates the beam angle changing dial 510, which in turn causes the main holder body 512 and element holder 516 to rotate, angled slots 908 in the lower holder body 518 which is fixed relative to the main body housing 532 of the light fixture will cause the element holder 516 and lens 514 mounted therein to move up or down. This changes the distance between the light emitter 528 and lens 514 causing the beam angle to change as the beam angle changing dial 510 is rotated.

Figure 9:
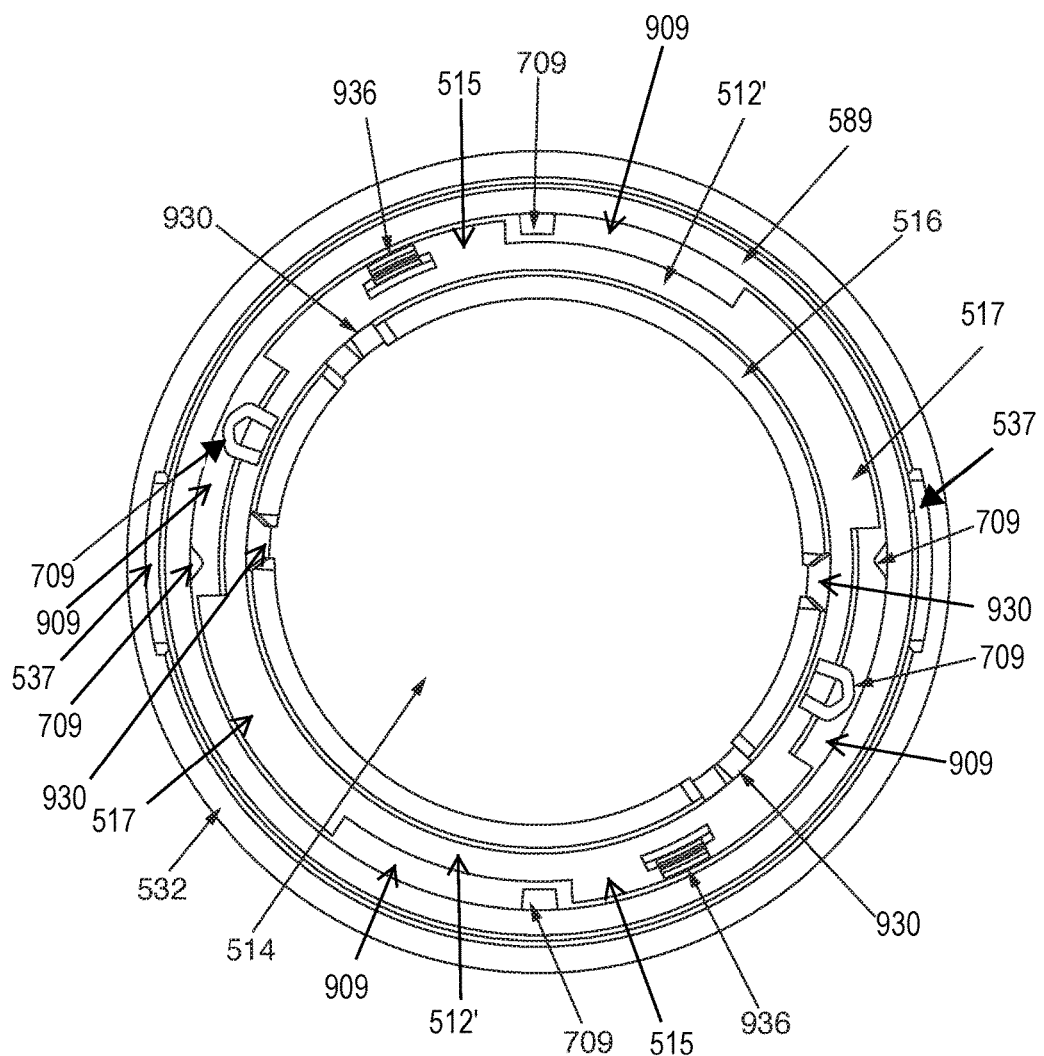
FIG. 9 illustrates additional features of the exemplary embodiment of the LED landscape spotlight beam changing mechanism shown in FIG. 7.

FIG. 9 is a top view, e.g. a view as would be seen if looking directly through the top of the beam changing dial 510 down towards the light emitter 528. Reference numbers in FIG. 9 which are the same as in other figures show the same elements and thus will not be discussed in detail again.

In FIG. 9 the four snaps 930, for holding lens 514 in the element holder 516 are visible with the lens 514 being at the center of the assembly. The element holder 516 is inside of the main holder body 512 which has its top flange 512' visible in FIG. 9. The extended portions 515, 517 of the flange 512' are visible in FIG. 9 as well. One or more of the extended flanges 515, 517 will contact a drive tab 709 of the beam angle changing dial 510 as the beam angle changing dial 510 rotates. Since the flange 512' of the main holder body 512 sits on top of the flange 909 of the lower holder guide 518 into which the main holder body 512 is inserted, on portions of the top flange 909 of the lower holder guide 518 are visible in FIG. 9. The drive tabs 709 of the beam angle changing dial 510 and extended flanges 515, 517 of the main holder body 512 are above the top flange 909 of the lower holder guide 518.

The two outermost rings shown in FIG. 9 are different portions of the main holder body 532 into which the lower holder body 518 if fixed, e.g., by screws at the bottom of the lower holder body 518 which are not visible in FIG. 9 due to obstruction from view by the lens 514 and flanges 512', 909.

The top 589 of the threaded portion of the main holder body 532 is visible in FIG. 9. The threads are represented by two small lines between the top surface 589 and the largest diameter portion of the fixture main body 532. Beam angle changing dial retaining tabs 537 can be seen extending out from below the threaded portion of the fixture main body 532. These retaining tabs 537 allow the beam angle changing dial 510 to be retained on the fixture main body 532 with the tabs extending into grove 707 after being slipped into the groove 707 via slot 706.

Snaps 936 are shown in FIG. 9. While these snaps can be seen from the top, it should be appreciated that they extend down and snap over the lip of flange 909 of the lower holder body 518 securing the flange 512' to the flange 909 while still allowing the holder main body 512 to rotate with respect to the lower holder A better view of the snaps 936 can be seen in FIG. 8.

Having described various features which allow the adjustment of the beam angle of the fixture shown in FIG. 1, beam angles which can be supported by such a fixture will now be discussed.

Figure 10A:
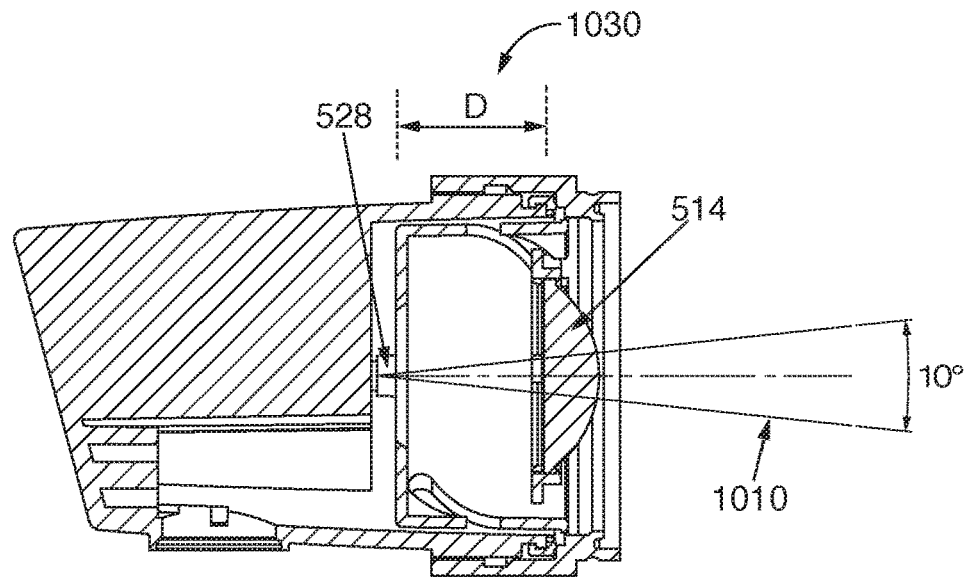
FIG. 10A illustrates features of the exemplary embodiment of the LED landscape spotlight beam changing mechanism shown in FIGS. 7, 8 and 9 configured to provide a light beam angle output of 10 degrees.
Figure 10B:
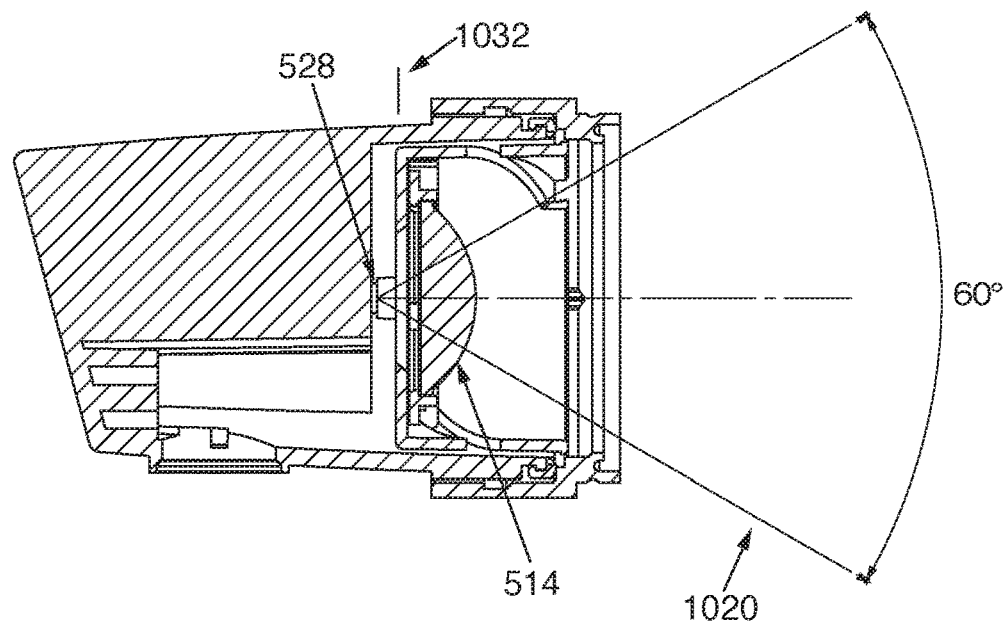
FIG. 10B illustrates features of the exemplary embodiment of the LED landscape spotlight beam changing mechanism shown in FIGS. 7, 8 and 9 configured to provide a light beam angle output of 60 degrees.

FIGS. 10A and 10B illustrate a light fixture embodiment wherein the beam angle changing lens moves relative a fixed LED light source. FIGS. 11A and 11B illustrate a light fixture embodiment in which the LED light source is moved relative to a fixed beam changing lens.

FIG. 10A illustrates an embodiment in which the LED light source 528 is fixed and the beam angle changing lens 514 moves in the upper light assembly 533. As shown in the diagram of FIG. 10A the upper light assembly 533 is set to provide a light beam angle output of 10 degrees. The light beam 1010 is shown in the drawing FIG. 10A with an output angle of 10 degrees which would correlate with a spot light output configuration or setting wherein the beam is narrower. In this setting as is shown in FIG. 10A, the LED light source 528 is a distance D 1030 from the beam angle changing lens 514 where D is the maximum permitted distance from the light source 528 and correlates with a light output beam angle of 10 degrees. This is the case where the beam angle changing dial 510 has been rotated clockwise so that the beam angle marking of 10 degrees shown on the beam angle changing dial 510 is aligned with the arrow 702 on the fixture main body 532.

FIG. 10 B illustrates the same embodiment as FIG. 10 in which the LED light source 528 is fixed and the beam angle changing lens 514 moves in the upper light assembly 533. As shown in the diagram of FIG. 10B the upper light assembly 533 is set to provide a light beam angle output of 60 degrees. The light beam 1020 is shown in the drawing FIG. 10B with an output angle of 60 degrees which would correlate with a flood light output setting or configuration wherein the beam is more spread out covering a wider area. In this setting as is shown in FIG. 10B, the light beam changing lens 514 is now at point 1032 which is the minimum permitted distance from the light source 528 and correlates with a light output beam angle of 60 degrees. This is the case where the beam angle changing dial 510 has been rotated counter clockwise so that the beam angle marking of 60 degrees shown on the beam angle changing dial 510 is aligned with the arrow 702 on the fixture main body 532. The lens 514 as shown in this example is a convex lens.

Diagram 1100 of FIG. 11A illustrates an embodiment in which the LED light source 528 in holder 1102 (element holder) moves in the upper light assembly and the beam angle changing lens 514 is fixed. As shown in the diagram of FIG. 11A the upper light assembly is set to provide a light beam angle output of 10 degrees. The light beam 1110 is shown in the drawing FIG. 11A with an output angle of 10 degrees which would correlate with a spot light output configuration or setting wherein the beam is narrower. In this setting as is shown in FIG. 11A, the LED light source 528 is a distance D 1130 from the beam angle changing lens 514 where D is the maximum permitted distance from the light source 528 and correlates with a light output beam angle of 10 degrees.

Diagram 1100' of FIG. 11B illustrates the same embodiment as FIG. 11 in which the LED light source 528 in holder 1102 (element holder) moves in the upper light assembly and the beam angle changing lens 514 is fixed. As shown in the diagram of FIG. 11B the upper light assembly is set to provide a light beam angle output of 60 degrees. The light beam 1120 is shown in the drawing FIG. 11B with an output angle of 60 degrees which would correlate with a flood light output setting or configuration wherein the beam is more spread out covering a wider area. In this setting as is shown in FIG. 11B, the LED light source 528 is at a point 1132 from the beam angle changing lens 514 which is the minimum permitted distance from the light source 528 and correlates with a light output beam angle of 60 degrees.

Various features of the LED light base assembly 565 including on-board dimming control, a tilting mechanism for changing the direction of the light beam previously described, and the water proof and/or water resistant structure of the LED light base assembly 565 will now be explained in greater detail.

The LED light base assembly 565 is shown in greater detail in FIG. 6B along with the wiring of the LED light fixture. The LED light base assembly 565 includes seals, e.g., gaskets (flat or custom shaped to match the objects or specific surfaces to be sealed), O rings and/or other flexible shaped seals. The LED light base assembly 565 includes a seal 534, e.g., a gasket. In some embodiments, the gasket 534 is an O-ring 534, a tilting mechanism 536, a seal 538, e.g., a gasket, an electrical driver enclosure 540 also referred to as a driver housing 540, tilting mechanism lock screw 542, dimming control knob bracket 544, dimming control knob seal 546, e.g., a gasket 546 which in some embodiments is an O-ring, dimming control knob 548, seal 550, e.g., a gasket 550 also referred to as top gasket 550, insulating film 552, LED driver assembly 554 which in some embodiments includes the circuits described in FIGS. 30, 30A, 30B, 30C, 30D, 30E, 30F, 30G, 31 with the exception of the LED to which the circuits are connected with wires 578, potentiometer 555 which in some embodiments is the potentiometer 3062 (see FIGS. 30, 30A, 30B, 30C, 30D, 30E, 30F; or potentiometer RV1/500k of FIG. 30G), mounting bracket 556, gasket 558 which in some embodiments is an O-ring also referred as bottom gasket 558 or O-ring 558, driver housing enclosure cap 560, driver enclosure cap screws 562, sealing glue 563, and fixture securing nut 564. The fixture securing nut 564 which in the exemplary embodiment is made of cast aluminum and secures the fixture horizontal rotation in place is not shown in FIG. 6B but is shown in FIG. 5. Also shown in FIG. 6B are the light fixture power supply wires 576 which come from the power source and are connected to the LED driver circuit of the LED driver assembly 554 and wires 578 which are connected on one end to the LED driver circuit of the LED driver assembly 554 and are connected on other end to the light source of the fixture which is LED 528.

Features and details of the LED light base assembly 565 will now be explained in connection with FIGS. 6B, 6C, 6D, 35, 36, 37, 38 and 39. This LED light base assembly 565 allows for light fixture with the ability to externally change the light output and power usage of the light fixture without compromising the water tight seal. While the embodiments describe the sealing of the system to prevent the intrusion of water, they also prevent in some embodiments the intrusion of dirt and/or other liquids. This is accomplished as will be explained in detail below through the use of several layers of seals which in some embodiments include gaskets and O-rings and potting in order to seal the LED light base assembly from water intrusion. Potting referring to the inclusion of a sealing glue such as for example silicone included in the cavity of the driver housing 540. In some embodiments, one or more of the gaskets used in either the upper assembly 533 or LED light base assembly 536 are O-rings. While the terms gasket and O ring have been used it should be appreciated that the invention is applicable to use of seals which seal and protect against the intrusion of water and dirt. While in many embodiments, the seals, gaskets and O-rings are made from a silicone material, other suitable sealing or gasketing material that protects against the intrusion of liquids such as water may be, and in some embodiments are, used. In some embodiments, one or more of the seals, gaskets or O-rings are made from rubber.

The gasket 534 in some embodiments is an O-ring made of silicone. The gasket 534 is used to seal and prevent the intrusion of water between the tilting mechanism assembly 536 and the fixture main body 532. The tilting mechanism 536 in some embodiments is made of cast aluminum. The tilting mechanism 536 is used to change the vertical angle of the fixture main body 532 to which it is connected and therein the direction of the light output from the light fixture. Different perspective views 3900, 3902, 3904, 3906, and 3908 of the tilting mechanism 536 illustrating different surfaces of the tilting mechanism are shown in FIG. 39. Gasket 538 in some embodiments is made of silicone. Gasket 538 is positioned between a surface of the driver housing 540 and a surface of tilting mechanism 536. The surface of the tilting mechanism 536 may be, and in some embodiments is, recessed so that the gasket 538 is seated in the recessed portion of the tilting mechanism 536. The wires 578 extend through an opening in the seal or gasket 538. In some embodiments, the opening through which the wires 578 extend are in a side portion of the gasket 538. The tilting mechanism locking screw 542 also extends through an opening in the gasket 538. The opening through which the tilting mechanism locking screw extends may be, and in some embodiments is, relatively circular and centered in the middle of the seal and is separate from the opening through which the wires 578 extend. The gasket 538 seals the tilting mechanism 536. For example, the gasket 538 seals an opening in the titling mechanism through which the tilting mechanism lock screw extends from the intrusion of water as well as the opening through which wires 578 extend. In some embodiments, the wires 578 also extends through the same opening in the seal as the tilting mechanism locking screw wherein the opening is generally circular but includes a cut out notch in one side of the opening in which the wires are inserted and pass through the gasket. The gasket 538 also seals one or more openings through which the wires 578 extend from the intrusion of water when the openings through which the wires extend are different from the opening through which the tilt mechanism lock screw 542 extends. In some embodiments, the gasket 538 also seals any openings in the top of driver housing 540 through which the wires 578 extends. The tilting mechanism lock screw 542 in some embodiments is made of stainless steel. The tilting mechanism lock screw is used to lock the fixture vertical angle in place and prevent it from moving.

The LED driver assembly 554 is mounted and enclosed in a driver housing 540. The driver housing 540 is an enclosure for the gasket 550, an insulating film 552, LED driver assembly 554 which includes a potentiometer 555 with potentiometer dimming control switch 555A, and LED driver mounting bracket 556. The driver housing 540 is connected to the dimmer control knob 548 and the tilting mechanism 536.

The driver housing 540 has an upper portion 540B including an opening through which the tilting mechanism locking screw 542 extends and a base portion 540A. The base portion 540A includes a control knob opening. The housing base portion 540A includes dimples 584, 586, 590, 594 and 598 for aligning the dimmer control knob indicator to a specific setting. In this example, the settings the dimples represent are wattage settings as indicated by the W letter 580 included on the housing base portion 540A. Positioned next to the dimple 584 is the wattage marking 2 W 582 indicating a power usage setting of the light fixture of 2 watts when the dimming control knob setting indicator is aligned with the dimple 584. Positioned next to the dimple 586 is the wattage marking 4 W 588 indicating a power usage setting of the light fixture of 4 watts when the dimming control knob setting indicator is aligned with the dimple 588. Positioned next to the dimple 590 is the wattage marking 8 W 592 indicating a power usage setting of the light fixture of 8 watts when the dimming control knob setting indicator is aligned with the dimple 590. Positioned next to the dimple 594 is the wattage marking 13 W 596 indicating a power usage setting of the light fixture of 13 watts when the dimming control knob setting indicator is aligned with the dimple 594. Positioned next to the dimple 598 is the wattage marking 16 W 599 indicating a power usage setting of the light fixture of 16 watts when the dimming control knob setting indicator is aligned with the dimple 598. While in this example the dimples and corresponding wattage settings of 2 W, 4 W, 8 W, 13 W, and 16 W have been shown other wattage settings and dimples and/or additional wattage settings and corresponding dimples may be, and in some embodiments, are used. Instead of dimples, other indicators or marks such as for example a line, or raised dot may be, and in some embodiments, are used. Similarly while the dimming control knob indicator includes an arrow (see FIG. 33 reference numeral 3302 pointing to the arrow on the dimming control knob 548) to identify where it is pointing other indicators markings such as a dimple, line or raised dot may be used on the dimming control knob 548. In the embodiment of the landscape LED spot light illustrated in diagram 3300 of FIG. 33 which also includes a pedestal the dimples, the wattage, the letter W and arrow indicator on the dimming control knob 548 are shown as being molded into the driver housing and dimming control knob 548. Other methods of including these marking indicators such for example via paint, engraving or the application of labels may, and in some embodiments, is used to create the marking indicators and corresponding wattage values. The different power settings also corresponding to different light output levels based on the power usage with the lower the wattage setting the lower the intensity of the light output of the fixture.

Figure 6C:
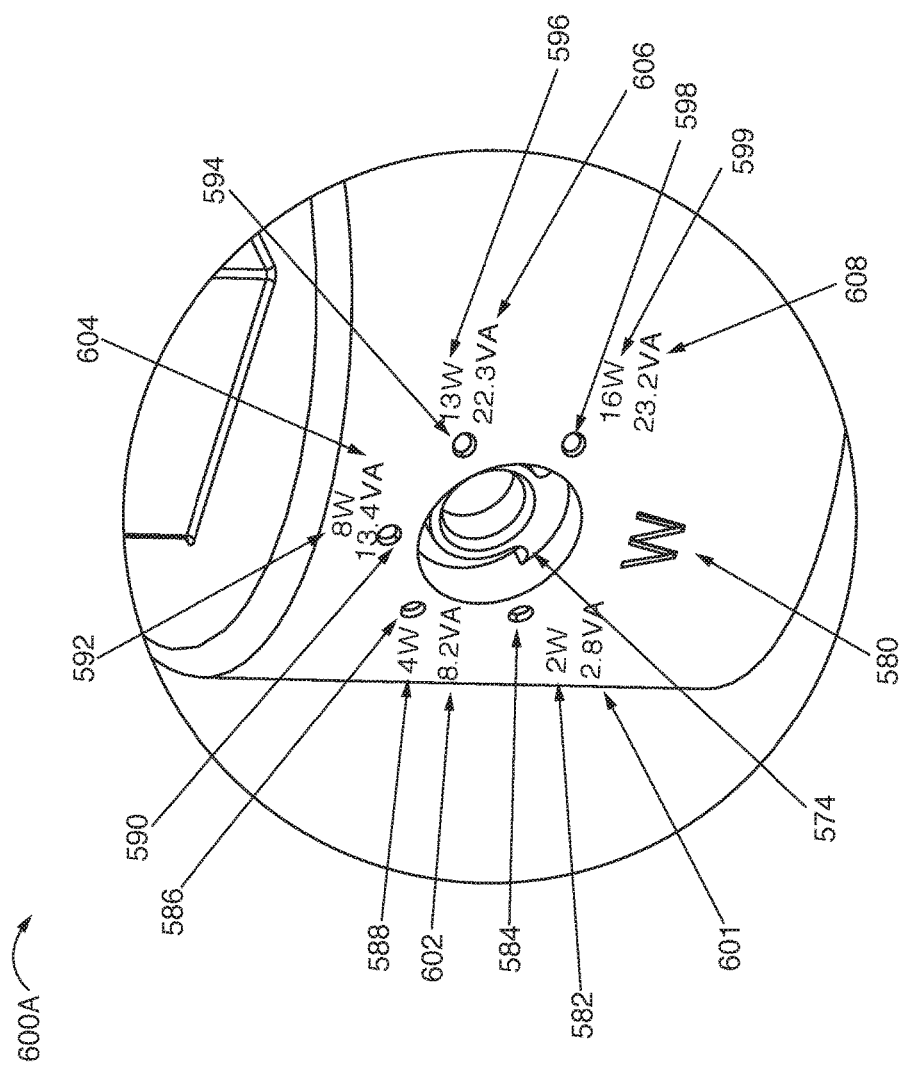
FIG. 6C is a drawing illustrating another exemplary embodiment of a driver housing for a LED landscape lighting fixture.

Diagram 600A of FIG. 6C shows another exemplary embodiment of the driver housing base portion 540A of FIG. 6B with additional power usage/dimming markings included on the surface of the driver housing base portion 540A. In the exemplary embodiment of FIG. 6C the housing base portion 540A includes dimples 584, 586, 590, 594 and 598 for aligning the dimmer control knob indicator to a specific setting. In this example, the settings the dimples represent are wattage settings and apparent power VA (volt times amperage) settings. The marking W 580 included on the housing base portion 540A is an indicator that some of the marking indicators reference wattage. The wattage markings are 2 W 582 corresponding to dimple 584, 4 W 588 corresponding to dimple 586, 8 W 592 corresponding to dimple 590, 13 W 596 corresponding to dimple 594 and 16 W 599 corresponding to dimple 598. The wattage markings are located on the outer surface of the driver housing base portion 540A and located by the dimple to which they correspond so that a user understands that when the dimming control knob 548 indicator (e.g., arrow) points to the dimple the corresponding wattage is being used by the lighting fixture to produce light. In addition to the wattage settings, apparent power ratings markings 2.8 VA 601, 8.2 VA 602, 13.4 VA 604, 22.3 VA 606 and 23.2 VA 608 are also provided on the outer surface of the driver housing base portion 540A with each marking located close to the dimple to which the apparent power corresponds. The 2.8 VA 601 marking is located by corresponding dimple 584, the 8.2 VA 602 marking is located by the corresponding dimple 586, the 13.4 VA marking is located by the corresponding dimple 590, the 22.3 VA 606 marking is located by the corresponding 594 dimple, and the 23.2 VA marking is located by the corresponding dimple 598. In some embodiments, the wattage markings are located above the apparent power markings. In some embodiments, only the apparent power markings are included and not the wattage markings. In such embodiments, the letter W 580 located at the bottom center is changed from W to VA. The use of both the wattage and apparent power markings aid installers in calculating the wattage and apparent power being used by the device, for example when installing a system including multiple lighting fixtures powered from the same source. The apparent power settings are typically used when the power source is an AC source. The different power settings also corresponding to different light output based on the power usage with the lower the wattage setting the lower the intensity of the light output of the fixture. The wattage settings are typically used when the power source is a DC source. The reference numeral 574 of FIG. 6C points to a mechanical hard stop raised surface or ridge 574 which is included in some embodiments of the driver housing 540 to prevent the over-turning of the potentiometer 555. In some embodiments, the hard stop ridge 574 is molded into the driver housing 540. The same hard stop raised surface or ridge 574 is shown in the driver housing 540 of FIGS. 6B and 6D.

Figure 6D:
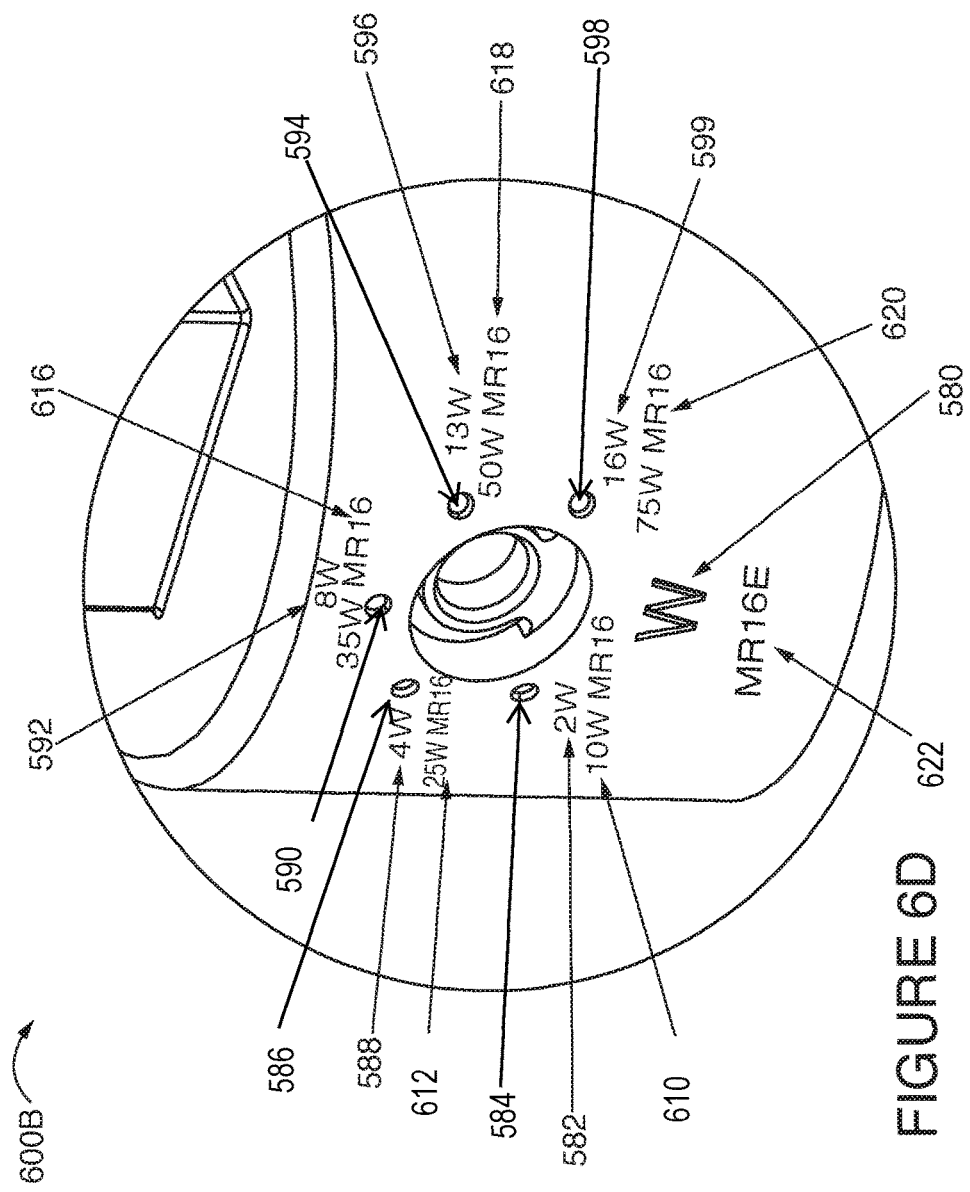
FIG. 6D is a drawing illustrating another exemplary embodiment of a driver housing for a LED landscape lighting fixture.

Diagram 600B of FIG. 6D shows another exemplary embodiment of the driver housing base portion 540A of FIG. 6B with additional power usage/dimming markings included on the surface of the driver housing base portion 540A. In the exemplary embodiment 600 B of FIG. 6D the housing base portion 540A includes dimples 584, 586, 590, 594 and 598 for aligning the dimmer control knob indicator to a specific setting. Wattage markings of 2 W 582, 4 W 588, 8 W 592, 13 W 596 and 16 W 599 are shown the same as in FIGS. 6B and 6C and will not be discussed in further detail. In the embodiment shown in FIG. 6D, the markings MR 16E 622 are shown below the marking W 580. The MR 16E 622 marking indicates that MR 16 halogen equivalent wattage settings are shown below wattage settings on the surface of the driver housing 540. In addition to the wattage settings, halogen MR 16 equivalent wattage rating or settings are also indicated that identify the MR 16 equivalent or comparable wattage output settings. This allows an installer who is familiar with MR 16 halogen light output wattage setting to configure the light fixture to provide a comparable light output based on the MR 16 halogen light out settings. The MR 16 equivalent halogen wattage marking corresponding to dimple 584 is 10 W MR 16 610 and is located below wattage marking 2 W 582. The MR 16 equivalent halogen wattage marking corresponding to dimple 586 is 25 W MR 16 612 and is located below wattage marking 4 W 588. The MR 16 equivalent halogen wattage marking corresponding to dimple 590 is 35 W MR 16 616 and is located below wattage marking 8 W 592. The MR 16 equivalent halogen wattage marking corresponding to dimple 594 is 50 W MR 16 618 and is located below wattage marking 13 W 596. The MR 16 equivalent halogen wattage marking corresponding to dimple 598 is 75 W MR 16 620 and is located below wattage marking 16 W 596. An installer can use the 10 W MR 16 610, 25 W MR 16 612, 35 W MR 16 616, 50 W MR 16 618, and 75 W MR 16 620 markings to set the illumination brightness and determine the respective 2 W 582, 4 W 588, 8 W 592, 13 W 596 and 16 W 599 wattage indications located above MR 16E (MR 16 halogen equivalent) setting by just looking at the light fixture to determine the amount of wattage being used by the LED light fixture. The MR 16E 622 marking is engraved or marked on the driver housing 540 below the W 580 marking so that users, e.g., installers, can understand the meaning of the wattage indications referring to MR 16 halogen lights. The wattages and equivalent halogen MR 16 wattage markings are only exemplary in nature and other wattages and their equivalent halogen MR 16 wattage markings may be, and in some embodiments, are used. In some embodiments, the lumens being output by the lighting fixture when the dimming control knob arrow points to a corresponding dimple is marked next to the dimple on the outer surface of the driver housing 540.

Figure 35:
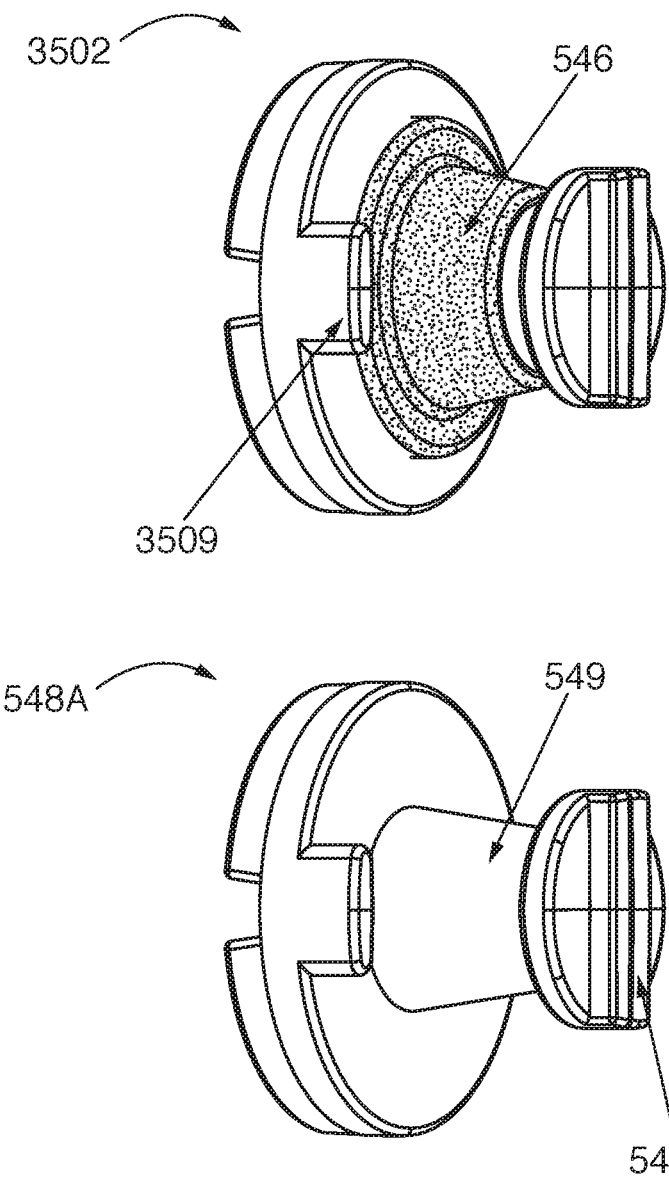
FIG. 35 illustrates an exemplary dimming control knob with and without a dimming control knob sealing gasket.

Returning now to the discussion of the elements of the LED light base assembly 565, the dimming control knob bracket 544 is used to hold the dimmer control knob 548 in place and is positioned between the potentiometer 555 and the dimming control knob 548. The dimming control knob bracket 544 is in some embodiments made of sheet aluminum. The gasket 546 is in some embodiments made of silicone. In some embodiments, the gasket 546 is a sealing O-ring. Turning now to FIG. 35, the diagram 3502 of FIG. 35 shows the dimming control knob 548 from a side view perspective along with the seal or gasket 546 fitted over the shaft 549 of the dimming control knob 548. The gasket 546 is used as a seal between the dimming control knob 548 and the driving housing 540. The dimming control knob 548 includes a shaft portion 549 shown in FIG. 35. The gasket 546 which in the exemplary embodiment is shaped in a canonical form may be, and in some embodiments is an O-ring, is positioned between a rear or back side 548A of the dimming control knob 548 and a surface 535 of the wall of the base portion 540A of the driver housing 540 shown in FIG. 6B. The shaft portion 549 of the dimming control knob 548 is in physical contact with a rotatable control 555A of the potentiometer 555. The seal or in some embodiments O-ring 546 provides a water tight seal between the dimming control knob 548 and the surface of the wall of the base portion 540A of the driver housing 540. The seal 546 in this way seals and prevents the intrusion of water from entering the driver housing 540 via the opening 535 in the driver housing 540 for the dimming control knob 548 while still allowing the dimming control knob 548 to make physical contact with and move the potentiometer control 555A when the dimming control knob 548 is rotated.

Figure 33:
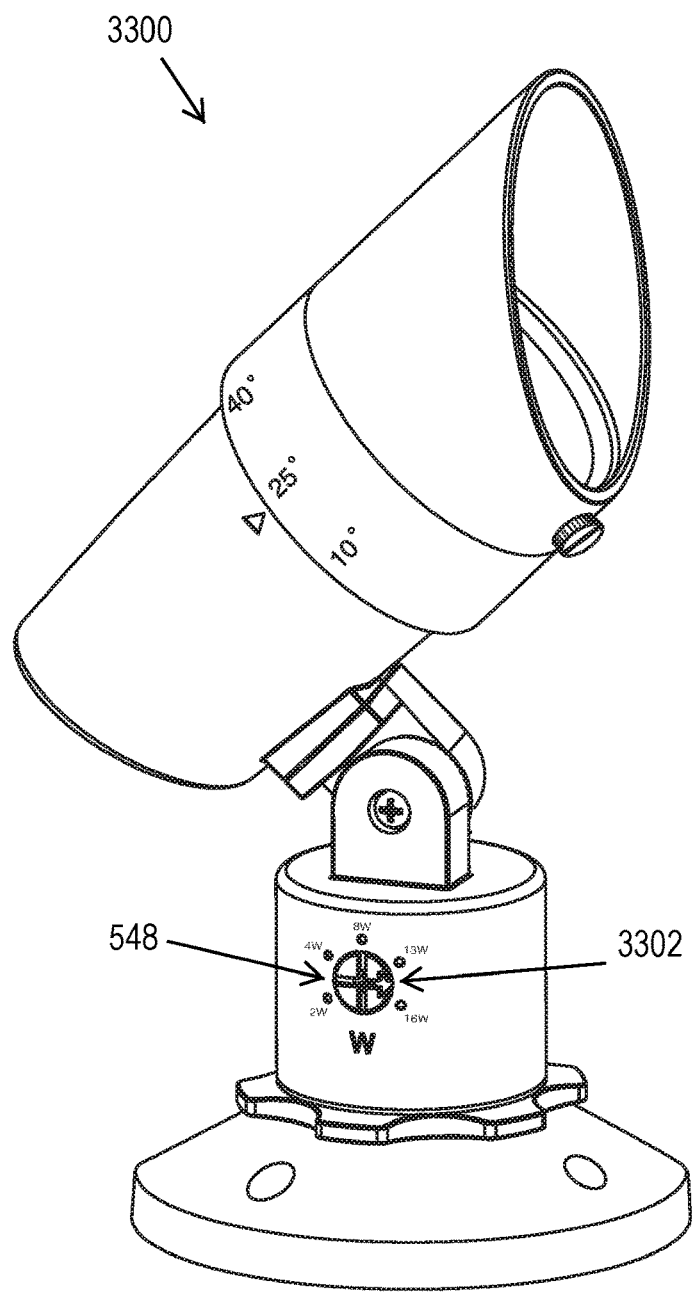
FIG. 33 illustrates an exemplary embodiment of an LED landscape spotlight.

The dimming control knob 548 in some embodiments is made of polycarbonate. The dimming control knob 548 includes an indicator showing the position of the knob. As previously discussed, the position indicator is an arrow 3302 as shown in the embodiment of FIG. 33. The dimming control knob 548 is used to change the power input and light output of the fixture. A user can turn the dimming control knob 548 until the indicator in this case an arrow 3302 points to and/or is aligned with the power setting correspond to the desired wattage for the fixture. As the dimming control knob 548 is turned the potentiometer control 555A is turned so that the potentiometer 555 is set to provide a resistance value to a portion of a control circuit which will result in the desired wattage to which the dimming control knob 540 indicator is pointing.

Figure 37:
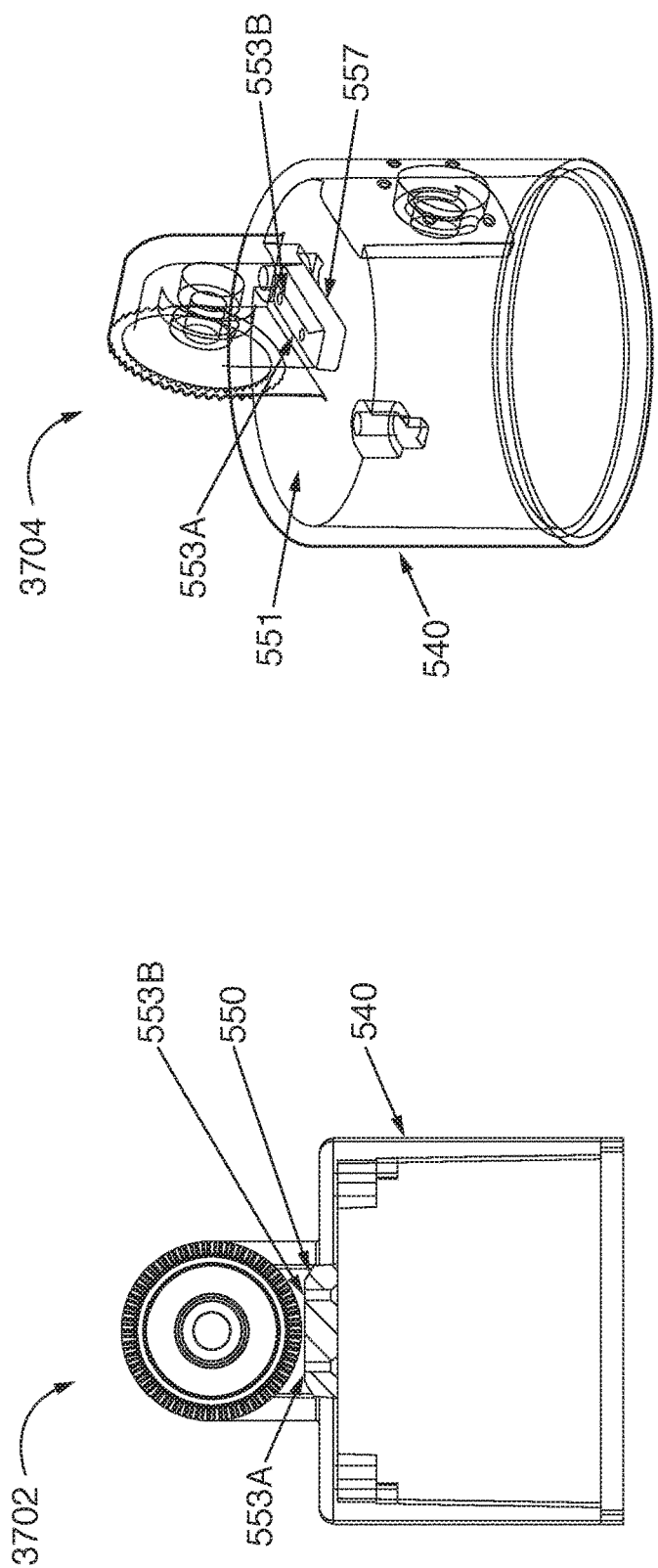
FIG. 37 illustrates features and portions of an exemplary driver housing of a base assembly of an exemplary LED landscape lighting fixture.

Returning once again to FIG. 6B, the driver housing base portion 540A includes a top portion 551. FIGS. 37 and 38 show the top portion 551 of the driver housing in further detail. The top portion 551 including a surface, e.g., a flat surface, with a top opening (see e.g., FIG. 37 553A and 553B) through which the wires 578 extend. The wires 578 being coupled to the LED driver circuit of the LED driver assembly 554. The wires 578 are also coupled to the light source 528. The LED light base assembly 565 includes gasket 550 through which the wires 578 extends through the top portion 551 of the LED light base portion 540A of driver housing 540. In some embodiments, the gasket 550 is made of silicone. Gasket 550 is used to seal the driver housing 540 to prevent the intrusion of water and/or dirt through the top opening through which the wires 578 extend. See FIGS. 37 and 38. The seal or gasket 550 is positioned between driver assembly 554 and driver housing 540. In some embodiments the seal or gasket 550 is rectangular in shape.

Diagram 3702 illustrates a cross section view of the driver housing 540 including the gasket 550 and showing the openings 553A and 553B in the driver housing through which the wires 578 extend. Diagram 3704 of FIG. 37 illustrates various surfaces and openings of the driver housing 540 along with features of the driver housing 540 interior. Among the features illustrated in diagram 3704 are the driver housing top surface 551 and the recessed surface 557 into which the gasket 550 is seated. Also shown are the openings 553A and 553B in the driver housing 540 through which the wires 578 pass.

Diagram 3802 provides a cross sectional view of various features of the driver housing 540 including the gasket 550. The openings 553A and 553B are openings in the housing through which the wires 578 extend. The gasket 550 seals the wire openings from the intrusion of water and dirt. Diagram 3804 of FIG. 38 shows another view of the driver housing 540 with its interior features shown. The top surface 551 is shown along with the gasket 550 seated in the driver housing in the recess surface 557 shown in FIG. 3704.

Returning once again to elements of the light fixture base assembly 565, the LED light base assembly 565 also includes an insulating film 552. The insulating film 552 in some embodiments is made of V0 rated plastic. The insulation film 552 provides heat insulation for the driver that is the driver circuit of the driver assembly 554. The insulation film 552 is positioned between the driver assembly 554 and driver housing surface 551 of driving housing 540. The insulating film 552 covers the top portion of the LED driver assembly 554 and a bottom surface of the top portion of the LED driver housing 540.

The LED drive assembly 554 includes a potentiometer 555. In some embodiments, the LED drive assembly 554 includes some or all of the electrical circuitry 3000 with the exception of the LED described in FIG. 30. In such embodiments, the LED drive assembly 554 includes the control circuit 3001 as shown in FIG. 30D which is used to provide power to the light source 528 which is the LED 3054 shown in FIG. 30D. The control circuitry 3001 in some embodiments is included on an integrated circuit board. In some embodiments, the control circuit 3001 is incorporated into an integrated circuit (IC). In such embodiments, the potentiometer 555 is the potentiometer 3062 described in the circuit 3000 (see FIG. 30D). In some embodiments, the LED drive assembly 554 includes some or all of the electrical circuitry of FIG. 30G with the exception of the LED shown. In such embodiments, the potentiometer 555 is the potentiometer with reference RV1 shown in FIG. 30G. The dimming control knob 548 fits into the potentiometer 555 at its control interface 555A and when the dimming control knob 548 rotates the potentiometer control interface 555A rotates. Descriptions of the circuits 3000, 3001 and 3099 are discussed in detail below in connection with FIGS. 30, 30A, 30B, 30C, 30D, 30E, 30F, 30G, and 31. The different embodiments described may be, and in some embodiments are, used in the driver assembly 554 with the exception of the LED which is housed in the upper light assembly 533 but is connected to the control circuit by wires 578. In some embodiments, the driver assembly 554 includes a circuit board on which various circuit components such as the potentiometer 555 are mounted.

Returning once again to FIG. 6B, the LED driver assembly 554 is mounted in the driver assembly mounting bracket 556. The LED driver assembly mounting bracket 556 in some embodiments is made of aluminum. The driver mounting bracket 556 is used to secure the LED driver assembly 554 in place and allows the driver enclosure cap 560 to attach.

The LED light base assembly 565 further includes an enclosure cap 560 inserted into a recess in the bottom of the driver housing 540. The LED light base assembly 565 also includes a gasket 558 sometimes referred to as a bottom gasket. In some embodiments, the gasket 558 is made of silicone. In this example, the gasket 558 is an O-ring. The bottom gasket 558 is positioned between a top lip of the enclosure cap 560 and a bottom surface of the recess in the bottom of the driver housing 540. The bottom gasket 558 which is an O-ring in this example is used to seal the driver housing 540 from intrusion of water.

In some embodiments, the enclosure cap 560 is made of cast aluminum. The enclosure cap 560 is used to close and seal the driving housing 540. The enclosure cap 560 includes a threaded shaft 561 extending from a bottom of said enclosure cap, the threaded shaft 561 includes an opening through which the light fixture power supply wires 576 extend. The wires 576 also extend through an opening in the driver mounting bracket 556 and are coupled to the LED driver assembly 554 and in some embodiments the circuitry 3000 of the driver assembly 554 or the circuitry shown in FIG. 30G. With respect to the circuitry 3000 and the circuitry shown in FIG. 30G, the wires 576 attach to input terminals, e.g., input terminals 3002 and 3004 of FIG. 30 or input terminals labelled 12V AC of diagram 3099 of FIG. 30G.

The LED light assembly 565 also includes a sealing glue 563 inserted in the opening in the threaded shaft 561 of the enclosure cap 560 and which seals said opening through which the light fixture power supply wires 576 extend from water entry. In some embodiments, the sealing glue 563 is a silicone glue that is applied to seal the fixture at the opening for the power supply wire entry 576. In some embodiments, the LED light base assembly 565 includes sealing glue which fills portions of a cavity in the driver housing 540 in which the LED driver assembly 554 is mounted. The sealing glue providing a water proofing of the driver assembly 554 in addition to the water proofing provided by the use of the seal 546, top gasket 550 and bottom gasket 558. In some embodiments, the sealing glue is a silicone material which acts as a potting material for the driver assembly and which stabilizes, secures and waterproofs the driver assembly 554 within the cavity of the driver housing 540.

The LED light base assembly 565 enclosure cap 560 includes a top threaded portion which is screwed into the driver housing 540 and includes two screw holes through which driver enclosure cap screws 562 extend. The screws 562 secure the driver mounting bracket 556 on which the driver assembly 554 is mounted to the enclosure cap 560 thereby securing the driver assembly 554 in the cavity of the driver housing 540. In some embodiments the driver enclosure cap screws 562 are made of stainless steel. The enclosure cap screws 562 are used to secure the enclosure cap 560 in place. Hole 560A is one of the two holes through which the two enclosure cap screws 562 is extended. The other hole through which the second enclosure cap screw is extended is not shown but is located approximately 180 degrees from the hole 560A.

Figure 36:
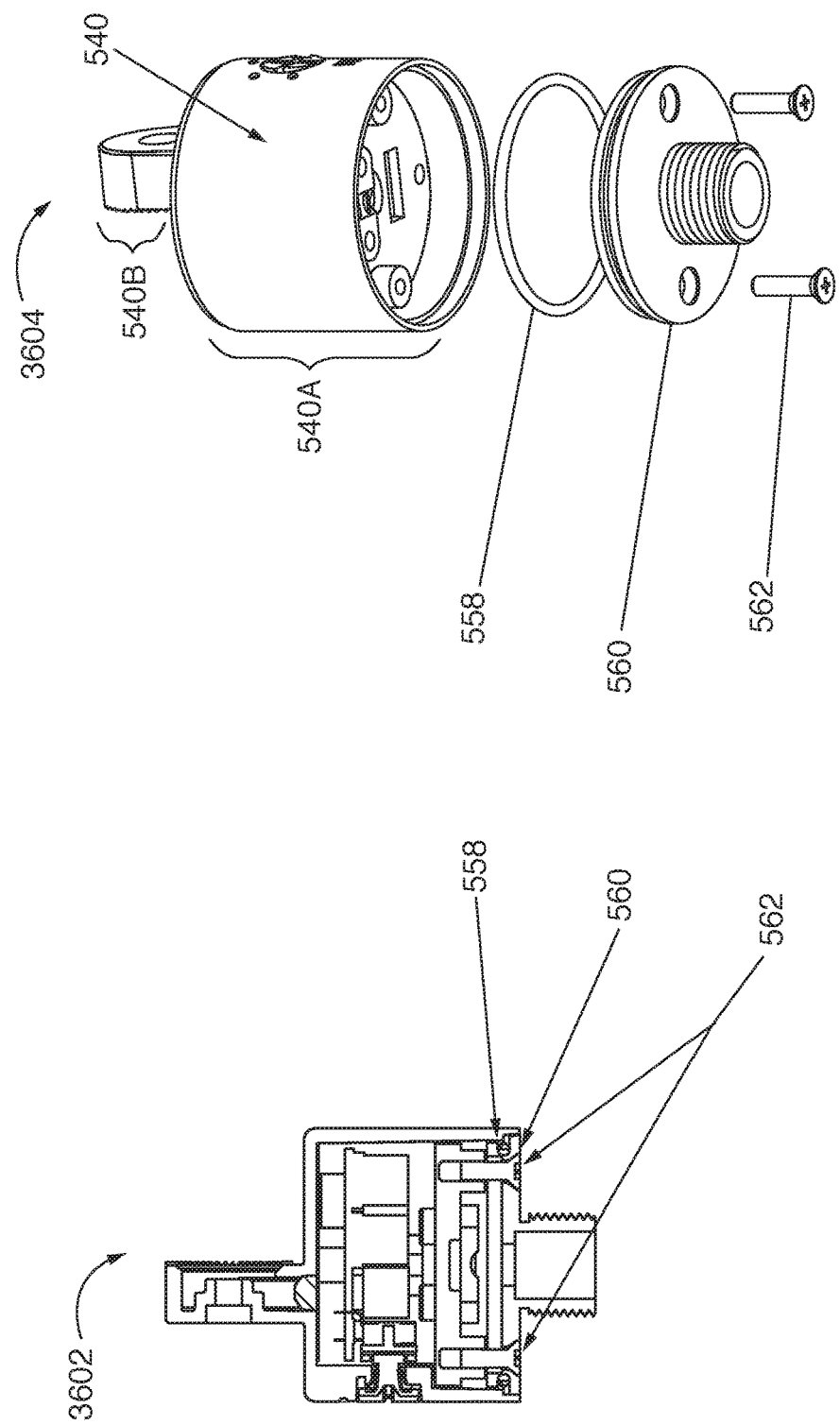
FIG. 36 illustrates features and portions of an exemplary embodiment of a lower or base assembly of an exemplary LED landscape lighting fixture.

Diagram 3602 of FIG. 36 illustrates a cross sectional view of the driver housing 540 when it is assembled with the enclosure cap screwed on and it is housing the LED driver and other components. Diagram 3602 shows among other things the sealing bottom gasket 558, the enclosure cap 560, and the enclosure cap screws 562. Diagram 3604 of FIG. 36 shows the driver housing 540 with portions 540A and 540B, the sealing gasket 558, the surface on the driver housing 540 into which the gasket 558 fits, the enclosure cap 560 and the enclosure cap screws 562.

Returning once again to FIG. 6B, in some embodiments the driver housing 540 includes a mechanical hard stop raised surface or ridge 574 to prevent the over-turning of the potentiometer 555 as previously discussed. In some embodiments, the hard stop ridge 574 is molded into the driver housing 540.

Referring now briefly to FIGS. 35 and 6B the dimming control knob 548 will be discussed further. The dimming control knob 548 includes a raised stop tab 3509 on the opposite side, from the face of the dimming control knob 548, i.e., on the rear side of the knob, that engages the mechanical hard stop 574 (see FIG. 6B) in the driver housing 540 when turned the maximum allowable amount.

The potentiometer 555 is actuated by the dimming control knob 548 to achieve dimming of the light output of the LED fixture. The lower portion of FIG. 35 includes diagram 548A which illustrates a view of the rear side of the dimming knob showing the dimming knob shaft 549 and a ridge 549A in the end of the dimming knob shaft 549. The dimming knob shaft end with ridge 549A snaps or is fitted securely into a groove in the rotatable control 555A of the potentiometer 555. In some embodiments, the dimming knob shaft is secured using glue, a clip or the securing device. Diagram 3502 shows the dimming control knob 548 side view 548A so the back of the dimming control knob is shown with a seal also sometimes referred to as a gasket 546 fitted onto the dimming control knob 548. The seal 546 has a tapered shape and can be made of rubber, silicone or another flexible material which provides a watertight seal while still allowing the knob 548 to rotate.

Figure 16:
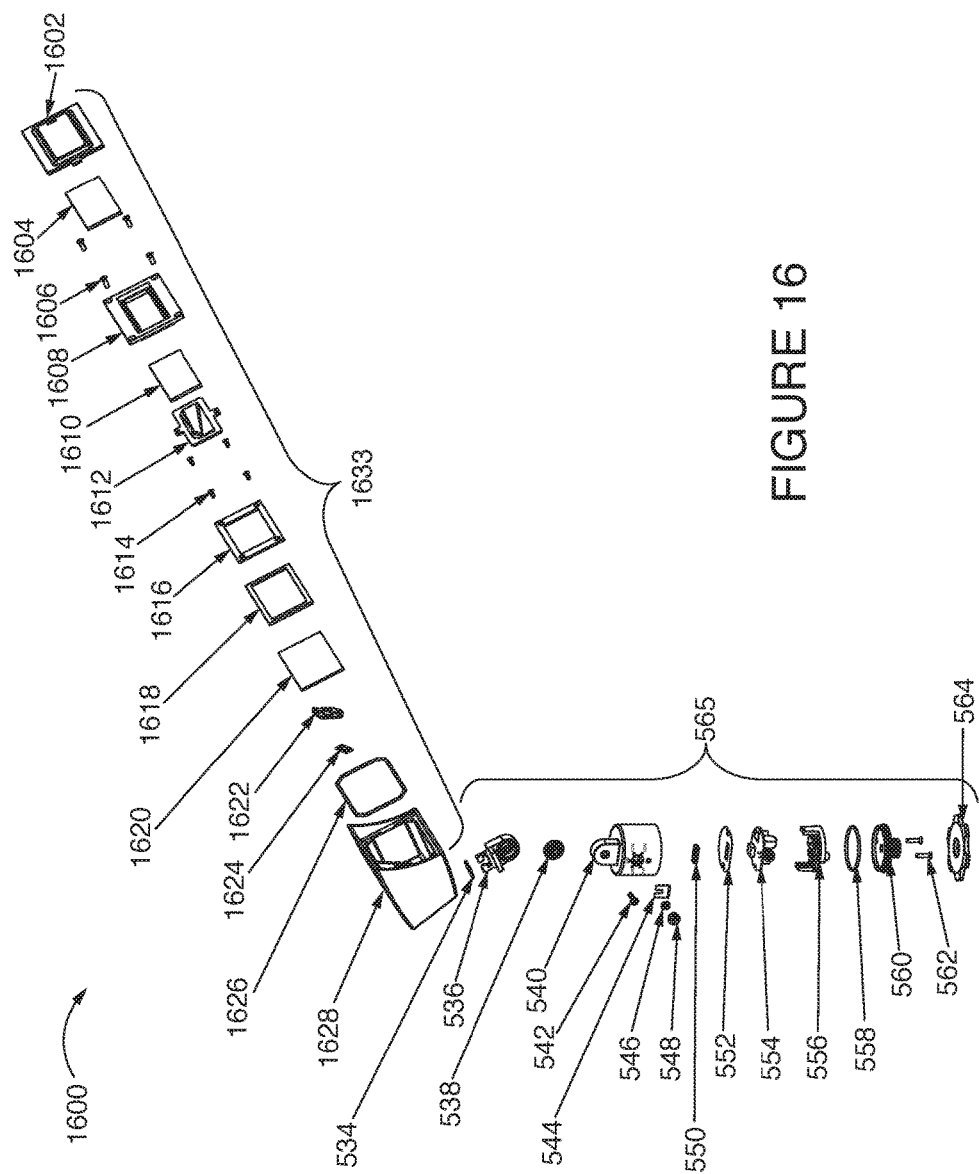
FIG. 16 is a drawing illustrating an exploded view of the exemplary LED landscape flood light of FIG. 12 showing various features and components of the exemplary embodiment of the LED landscape flood light.

Turning now from FIG. 35 back to FIG. 6B it is noted that the LED light base assembly 565 shown in FIG. 6B and described above can be used in a variety of different lighting fixtures such as for example in LED landscape flood light fixtures. Diagram 1600 of FIG. 16 shows the LED light base assembly 565 being used in an exemplary LED landscape flood light though not all of the components are shown in as much detail as described in FIG. 6B.

In an exemplary embodiment of an LED light base assembly (565), the LED light base assembly includes a driver housing (540) including a base portion (540A) including a control knob opening in a wall of the base portion; an LED driver assembly (554) including a potentiometer (555); a sealing O-ring (546); and a dimming control knob (548) including a shaft portion (549) (see FIG. 35), said O-ring (546) being positioned between a rear side (548A) (see FIG. 35) of said dimming knob 548 and a surface (535) of said wall of the base portion (540A) of the driver housing, said shaft of said dimming control knob (549) being in physical contact with a rotatable control of said potentiometer (555A), said O-ring (546) providing a water tight seal between the dimming control knob (548) and the surface of said wall of the base portion (540A) of the driver housing (540).

In some embodiments, the LED light base portion (540A) of the LED light base assembly includes a top portion (551) including a flat surface, said flat surface including a top opening (not shown need figure from bottom view) through which at least a first wire (578) extends, said first wire (578) being coupled to said LED driver assembly (554). In some embodiments, the LED light base assembly (565) also includes a top gasket (550) through which said wire (578) extends through said top portion of the driver housing (540) for sealing said top opening.

In some embodiments, the LED light base assembly (565) also includes an insulating film (552) covering a top portion of said LED driver assembly, said top gasket (550) being positioned between the insulating film (552) and a bottom surface of the top portion of the LED driver housing (540).

In some embodiments, the LED light base assembly (565) also includes an enclosure cap (560) inserted into a recess in the bottom of said driver housing (540); and a bottom gasket (558), said bottom gasket (558) being positioned between a top lip of the enclosure cap and a bottom surface of said recess in the bottom of said driver housing (540).

In some embodiments, the enclosure cap (560) of the LED light base assembly (565) includes a threaded shaft (561) extending from a bottom of the enclosure cap, the threaded shaft including an opening through which at least one light fixture power supply wire (576) extends.

In some embodiments, the LED light base assembly (565) also includes a sealing glue (563) inserted in the opening in the threaded shaft (561) of the enclosure cap (560) and sealing said opening through which the at least one light fixture power supply wire (576) extends from water entry.

In some embodiments, the sealing glue fills portions of a cavity in said driver housing (540) in which said LED driver assembly (554) is mounted, said sealing glue providing water proofing of said driver assembly (554) in addition to the water proofing provided by the use of said sealing O-ring (546), top gasket (550) and bottom gasket (558). In some embodiments of the LED light base assembly (565), the sealing glue is a silicone material which acts as a potting material for said driver assembly (554) and which stabilizes, secures and waterproofs said driver assembly within the cavity of said driver housing (540).

In some embodiments of the LED light base assembly (565), the enclosure cap (560) includes a top threaded portion which is screwed into the driver housing (540) and includes at least one screw hole through which a screw (562) extends to secure a driver mounting bracket (556) on which said driver assembly (554) is mounted to the enclosure cap (560) and secured within the cavity of the driver housing (540).

In some embodiments, the bottom gasket of the LED light base assembly is an O ring (558).

In some embodiments, the sealing O-ring (546), top gasket (550) and bottom gasket (558) of the LED light base assembly are made of silicone or rubber.

In some embodiments, the LED light base assembly further includes a tilting mechanism (538) secured to said driver housing (540) and to a light fixture main body (532), and a tilting mechanism lock screw (542). In some of such embodiments, the LED light base assembly further includes a first tilting mechanism gasket (538) positioned to fit within a recess around an opening of said tilting mechanism through which said tilting mechanism lock screw extends (542), the first tilting mechanism gasket sealing the LED driver housing (540) and the tilting mechanism (536) from entry of water; and a second tilting mechanism gasket (534) positioned to fit around an opening in a top portion of the tilting mechanism 538 through which at least one wire extends and to seal said tilting mechanism (538) from entry of water.

In some embodiments, the second tilting mechanism gasket 534 is further positioned to fit between said tilting mechanism 538 and a fixture main body 532, said second tilting mechanism gasket (534) further sealing said fixture main body (532) from entry of water.

In an LED landscape light fixture embodiment, the LED landscape light fixture comprises: an LED light source (528) and an LED light base assembly (565), said LED light base assembly including: a driver housing (540) including a base portion (540A) including a control knob opening in a wall of the base portion; an LED driver assembly (554) including a potentiometer (555); a sealing O-ring (546); and a dimming control knob (548) including a shaft portion (549) (see FIG. 35) said shaft portion including a ridge 549A that snaps into a rotatable control portion 555A of the potentiometer 555, said O-ring (546) being positioned between a rear side (548A need figure) of said dimming knob 548 and a surface (535) of said wall of the base portion (540A) of the driver housing, said shaft of said dimming control knob (549) being in physical contact with a rotatable control of said potentiometer (555A), said O-ring (546) providing a water tight seal between the dimming control knob (548) and the surface of said wall of the base portion (540A) of the driver housing (540). In some embodiments, the LED landscape light fixture is a spot light. In some embodiments, the LED landscape light fixture is a flood light fixture.

In some embodiments in which the LED landscape light fixture is a landscape flood light fixture (1802), the light fixture includes an asymmetric light reflector (1820), said asymmetric light reflector positioned in front of said LED light source (1810) and providing an asymmetrical light output distribution (1900) from the light fixture.

Figure 12:
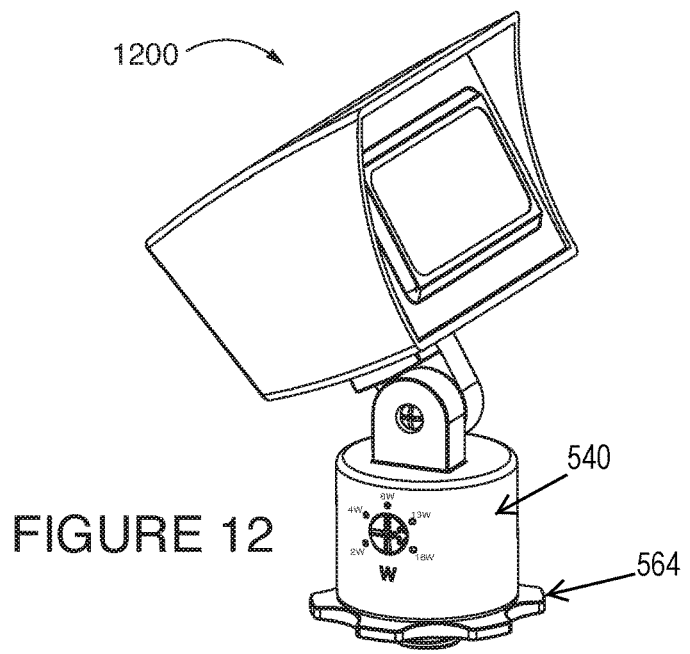
FIG. 12 illustrates various features of an exemplary embodiment of a LED landscape flood light.

FIG. 12 illustrates various features of an exemplary embodiment of a LED landscape flood light.

Figure 13:
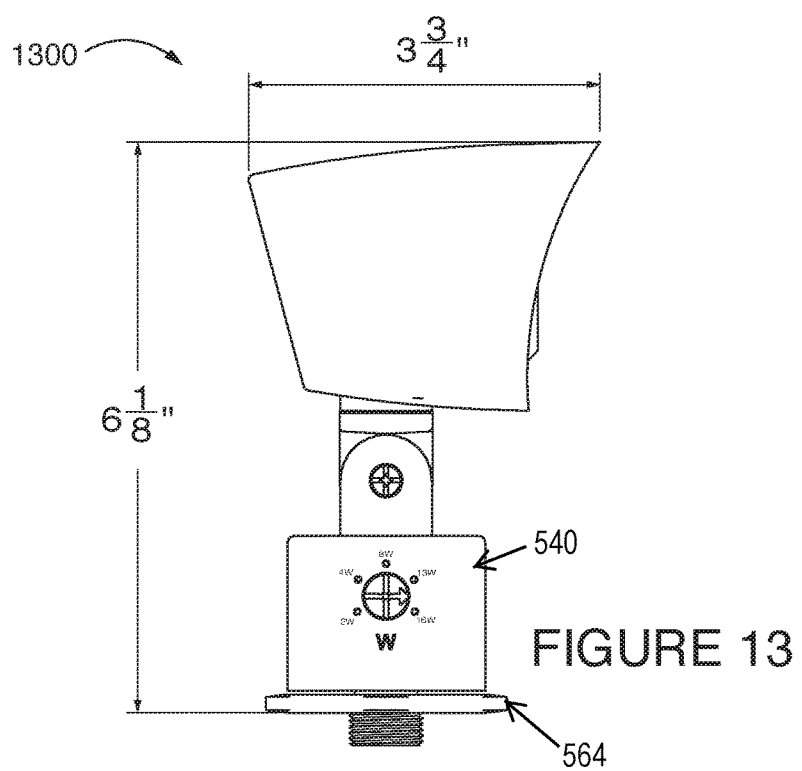
FIG. 13 is a drawing of a side view of the LED landscape flood light of FIG. 12 illustrating various features of the exemplary embodiment of the LED landscape flood light.

Diagram 1300 of FIG. 13 is a drawing of a side view of the LED landscape flood light 1200 of FIG. 12 illustrating various features of the exemplary embodiment of the LED landscape flood light. Diagram 1300 illustrates that in the exemplary embodiment the fixture is 6⅛ inches high measured from the fixture securing nut to the top of the flood light and 3¾ inches in length.

Figure 14:
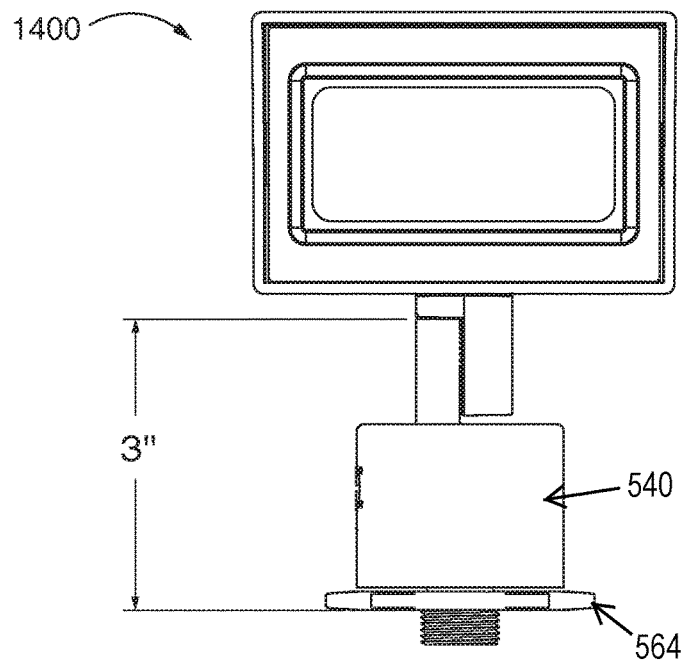
FIG. 14 is a drawing of a front view of the LED landscape flood light of FIG. 12 illustrating various features of the exemplary embodiment of the LED landscape flood light.

Diagram 1400 of FIG. 14 is a drawing of a front view of the LED landscape flood light 1200 of FIG. 12 illustrating various features of the exemplary embodiment of the LED landscape flood light. Diagram 1400 shows that the LED light assembly base is 3 inches in height.

Figure 15:
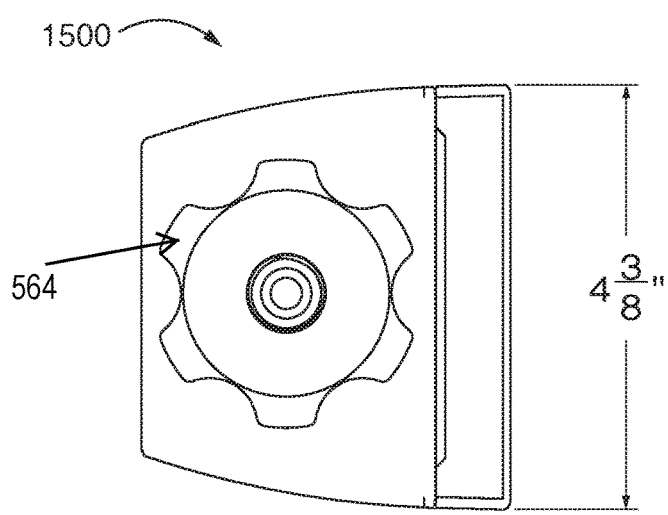
FIG. 15 is a drawing of a bottom view of the LED landscape flood light of FIG. 12 illustrating various features of the exemplary embodiment of the LED landscape flood light.

Diagram 1500 of FIG. 15 is a drawing of a bottom view of the LED landscape flood light 1200 of FIG. 12 illustrating various features of the exemplary embodiment of the LED landscape flood light. Diagram 1500 shows that flood light width is 4⅜ inches. While various dimensions are shown in the Figures, these dimensions are only exemplary in nature. For figures are not drawn to scale as emphasis is placed on explaining the invention and it should be appreciated that the invention is applicable to fixtures and parts of differing dimensions.

Figure 17:
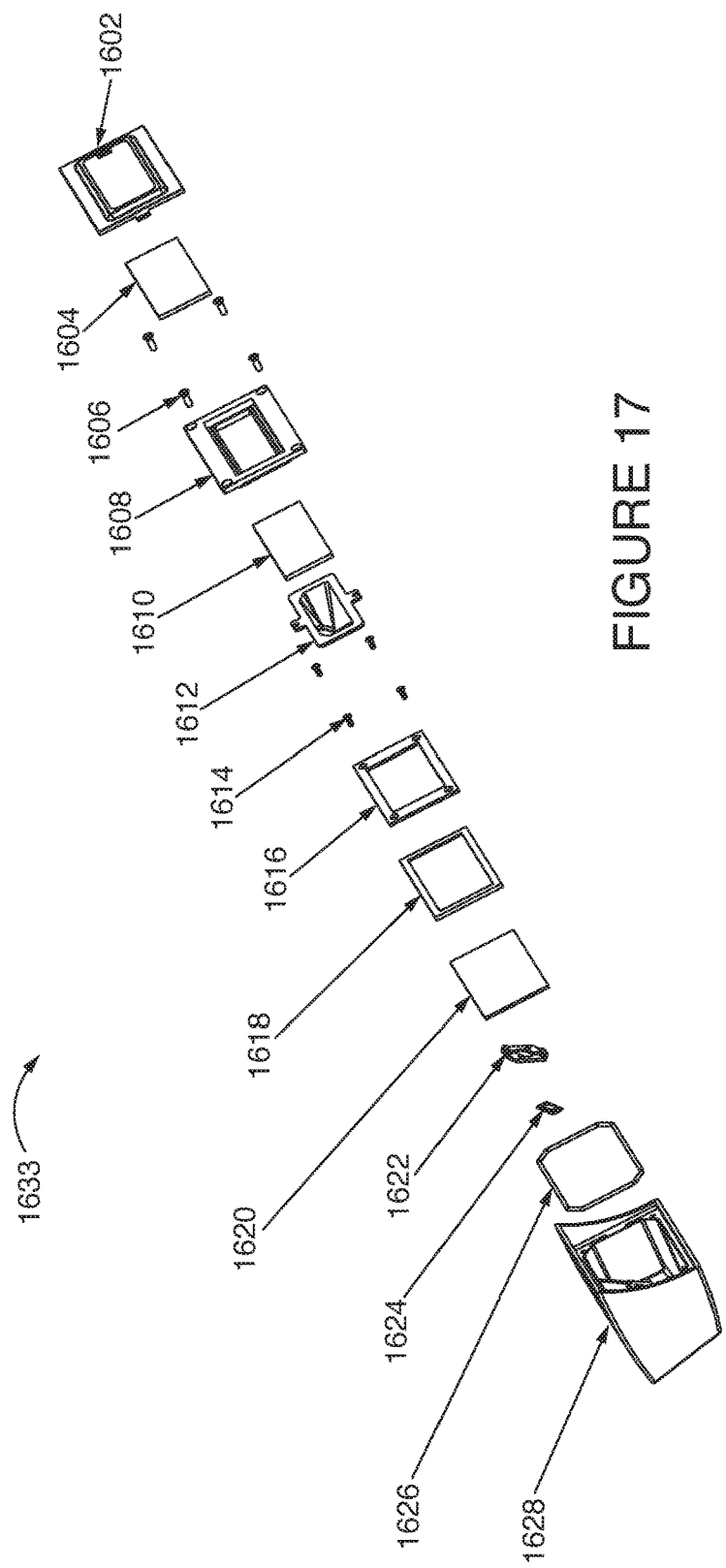
FIG. 17 is a drawing illustrating an exploded view of the upper assembly of the exemplary LED landscape flood light of FIG. 12.

Diagram 1600 of FIG. 16 is a drawing illustrating an exploded of a number of components of the exemplary LED landscape flood light 1200 of FIG. 12 showing various features and components of the exemplary embodiment of the LED landscape flood light. The LED landscape flood light fixture 1600 includes an upper LED flood light assembly 1633 connected to a mounting bracket tilting mechanism 536 of a lower LED light assembly 565 also referred to as a LED light base assembly 565. The LED light base assembly 565 is the same as the LED light base assembly 565 described in connection with landscape spot light LED base assembly 565 and will not be described in detail again. Diagram 1633 of FIG. 17 is a drawing illustrating an exploded view of the upper flood light assembly of the exemplary LED landscape flood light 1200 of FIG. 12. The upper LED flood light assembly is secured to the LED light base assembly 565 with the tilting mechanism mounting bracket 536 also shown in FIG. 18.

Components and features of the upper flood light assembly 1633 will now be explained in further detail in connection with FIG. 17. Accessory lens clip 1602 is used to attach the lens accessories to the fixture main body 1628. One or more of the accessory main clips are used for this purpose. In the exemplary embodiment shown two accessory lens clips are utilized. In some embodiments, the accessory lens clips are made of stainless steel. The accessory lens 1604 is in many but not in all cases made of glass and is used to change the spectrum of light. The accessory lens 1604 can be made of different colors and in some embodiments is made of plastic. The fixture main body cover screws 1606 are used to secure the fixture main body cover in place. In some embodiments, the fixture main body cover screws are made of stainless steel.

fixture main body cover 1608 is in some embodiments made of cast aluminum and is used to secure the main body cover in place. The sealing glass 1610 in some embodiments is made of tempered glass and is use to seal the fixture from environmental conditions while still letting light pass through it. The sealing glass is translucent. The sealing glass 1610 protects the internal components housed in the fixture main body 1628 including the light source 1624 and electrical connections to the light source from entry of water and dirt. The reflector 1612 is used to change the light beam output pattern of the light source 1624. The reflector 1612 is in some embodiments made of polycarbonate. In some embodiments the reflector 1612 is symmetrical while in other embodiments the reflector is asymmetrical as will be described in further detail in connection with FIGS. 18 and 19. The light source 1624 is an LED (light emitting diode) which is a semiconductor that converts electricity to light. The LED light source 1624 is held in place in a cavity of the fixture main body 1628 by a LED holder 1622. The LED holder 1622 in some embodiments is made of plastic. The LED holder 1622 attaches to the fixture main body and hold the LED light source 1624 in place. The LED holder may, and in some embodiments is, attached to the fixture main body using snaps, screws and/or glue. The fixture main body 1628 is a housing containing a cavity. The fixture main body 1628 is generally rectangular in shape and is used to house components of the flood light upper assembly such as the light emitter 1624. Wires 578 (see FIG. 6B) are threaded through an opening in the bottom of the fixture main body 1628 and connected or coupled to the LED light source 1624.

The gasket 1626 is used as a seal between the fixture main body 1628 and the fixture main body cover 1608. In some embodiments, the gasket 1626 is made of a silicone material. The gasket 1626 prevents the intrusion of water and dirt into the fixture main body 1628 protecting the components inside including the LED 1624. The LED protection layer glass 1620 is made of glass and protects the LED from potential moisture build-up. The gasket 1618 is used to seal the LED protection layer 1620 and in some embodiments is made of silicone. The LED protection layer faceplate 1616 is used secure the LED protection layer and gasket 1618 in place.

The LED protection screws 1614 are used to secure the LED protection layer faceplate to the fixture main body 1628. In some embodiments, the LED protection plate screws are made of stainless steel. As previously explained the upper flood light assembly is secured to the tilting mechanism bracket 536 of the lower light assembly 565. The tilting mechanism 536 extends into the fixture main body 1628 through an opening in the bottom surface of the fixture main body 1628 and is secured to the fixture main body 1628 using one or more screws. One or more seals 536, e.g., a gaskets are used to seal the opening through which the tilting mechanism extends into the cavity of the fixture main body 1628. In the same manner as described in connection with the flood light 100. In some embodiments, at least a portion of the fixture main body 1628 is filled with a silicone material to seal the housing of the fixture main body and protect the components such as the LED light emitter 1624 fixed in the fixture main body cavity from damage due to the entry of water and dirt. The hole or holes through which the wires 578 enter the fixture main body 1628 are sealed from the intrusion of water and dirt using a gasket, O-ring and/or silicone material such as silicone glue.

Figure 18:
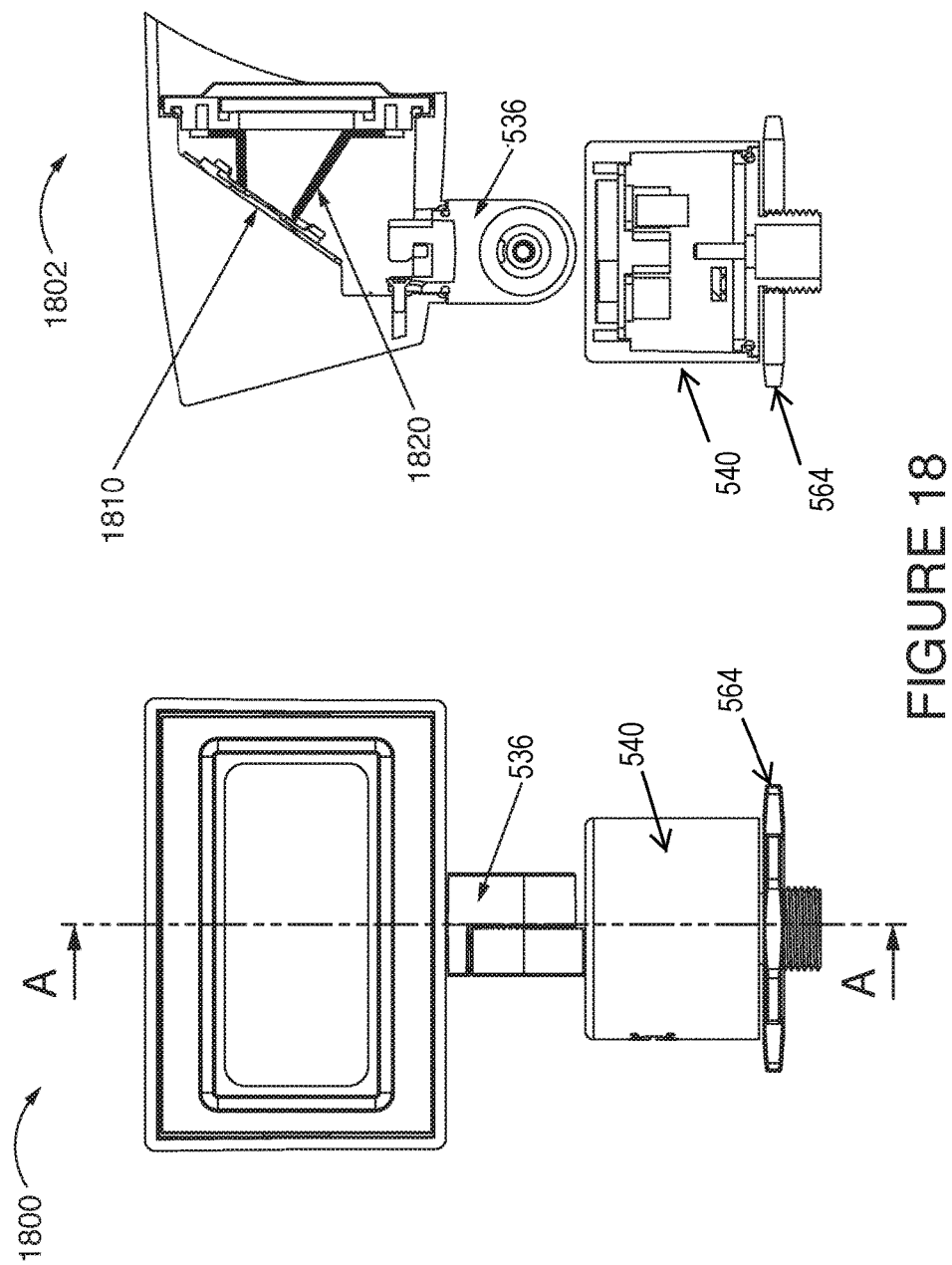
FIG. 18 is a drawing illustrating an exemplary embodiment of a landscape flood light with an asymmetric reflector.
Figure 19:
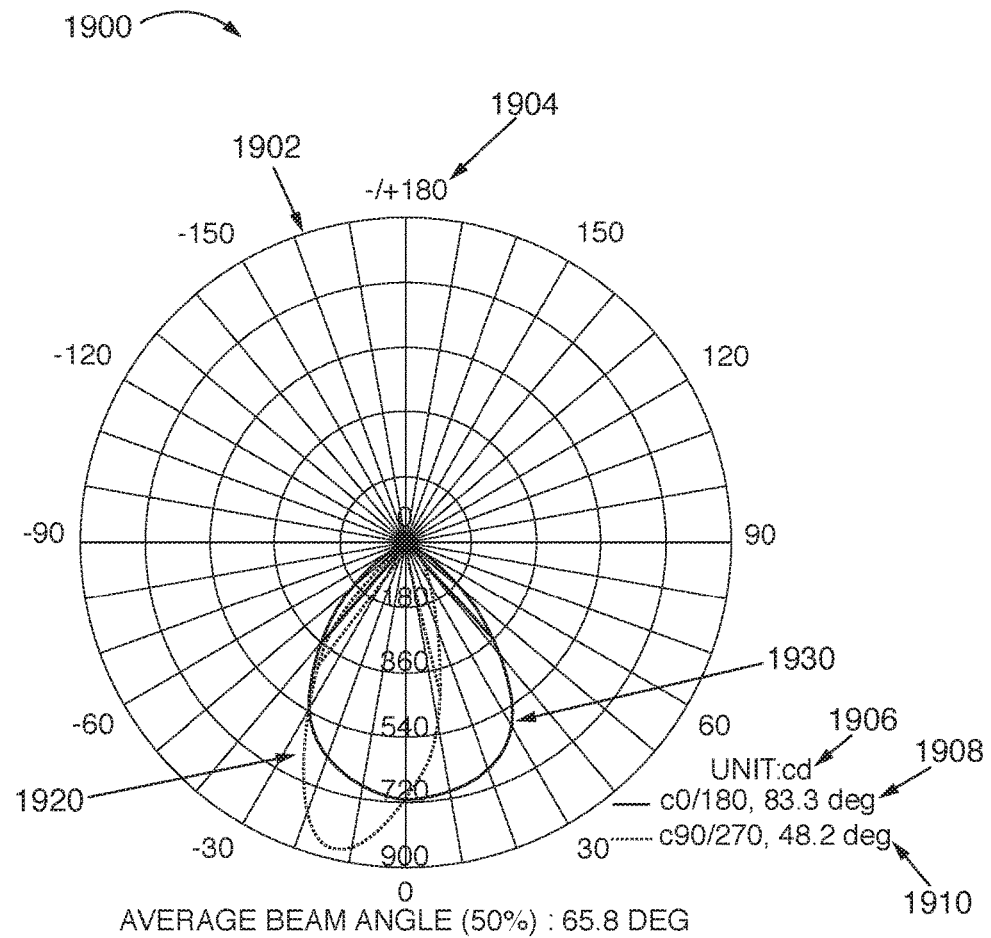
FIG. 19 is a drawing illustrating an asymmetrical light distribution plot chart for the exemplary flood light with an asymmetric reflector of FIG. 18.

Diagram 1800 of FIG. 18 is a drawing illustrating a front view of an exemplary embodiment of a landscape flood light with an asymmetric reflector. Diagram 1802 of FIG. 18 is a drawing illustrating a cross sectional view of section A-A of the landscape flood light 1802 with a scale of 1:1.5. The asymmetric reflector 1820 is position in front of the LED light source 1810 to so that light the flood light fixture produces an asymmetrical light pattern. Diagram 1900 of FIG. 19 is an asymmetrical light distribution chart for the landscape flood light 1802. One of the benefits of the use of the asymmetric reflector is the superior light distribution. The asymmetric projection of light provided by the landscape flood light 1802 with asymmetric reflector 1820 distributes light in a superior manner so that it covers a wide area of the ground to ensure safety with maximum efficiency.

Diagram 1900 of FIG. 19 will now be described in further detail. Diagram 1900 is a polar luminous intensity graph or chart that illustrates the distribution of luminous intensity, in candelas, for the transverse (solid line) and axial (dashed line) planes of the landscape flood light with an asymmetric light reflector. The LED light fixture is located at the center and the lines radiating out from the center depict the angles and concentric lines depict the decreasing luminous intensity. The curve shows the asymmetric distribution of light that will be produced by the landscape flood light with the asymmetric light reflector. Reference 1906 identify the units are in cd (candelas). The average beam angle (50%): 65.8 degrees. The reference 1902 points to the polar graph. Reference 1904 points to the −/+180 degree position on the graph. Reference numbers 1906, 1908, 1910 are the legend for the graph. The reference 1906 indentifies that the units are cd (candelas). The reference 1908 identifies that the solid line (transverse plane) 1930 shown on the graph is for c0/180, 83.3 degrees and that the reference 1910 indicates that the dashed line (axial plane) 1920 shown on the graph is for c90/270, 48.2 degrees.

Figure 20:
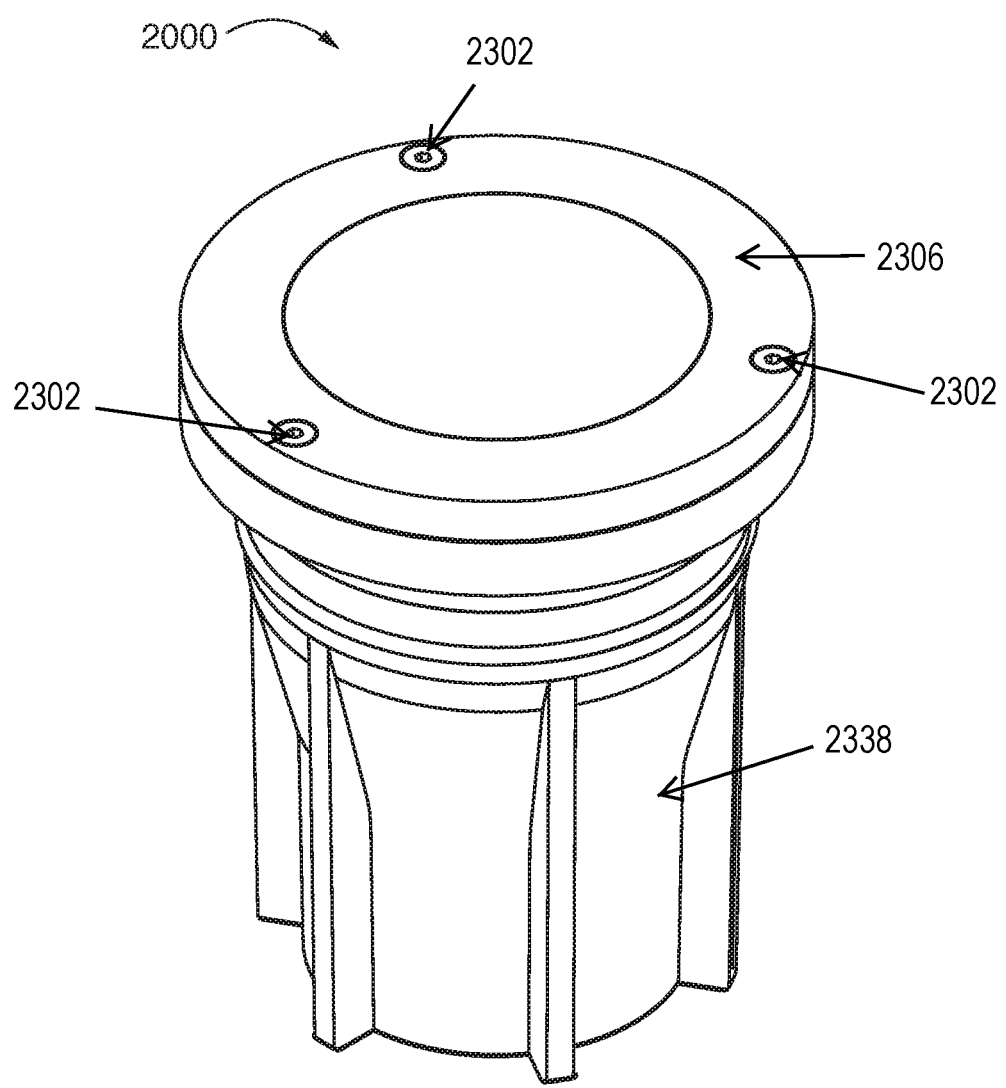
FIG. 20 is a drawing illustrating various features of an exemplary embodiment of a LED landscape inground light fixture.

Diagram 2000 of FIG. 20 is a drawing illustrating various features of an exemplary embodiment of a LED landscape inground light fixture.

Figure 21:
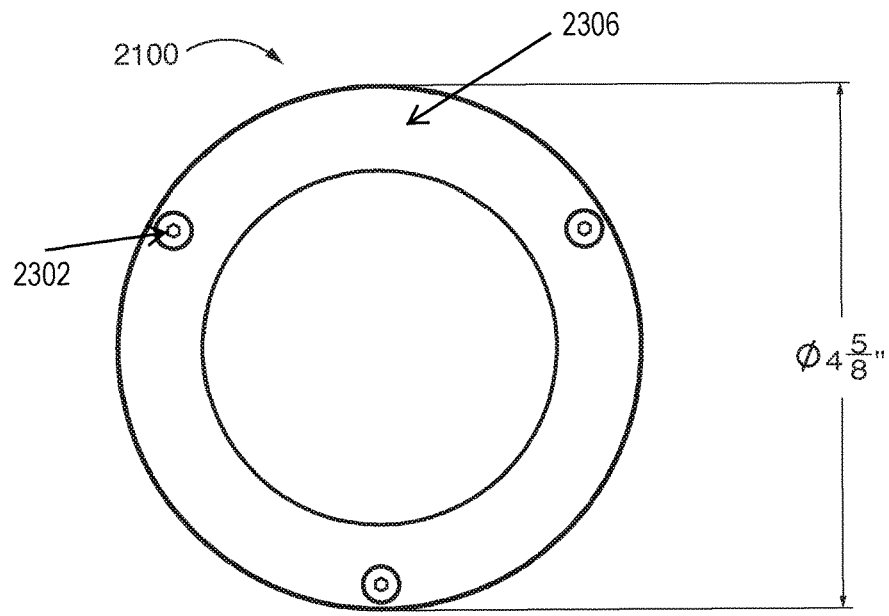
FIG. 21 is a drawing of a top view of the LED landscape inground light fixture of FIG. 20 illustrating various features of the exemplary embodiment of the LED landscape inground light fixture.

Diagram 2100 of FIG. 21 is a drawing of a top view of the LED landscape inground light fixture 2000 shown in FIG. 20 illustrating various features of the exemplary embodiment of the LED inground light fixture. Diagram 2100 illustrates that in the exemplary embodiment the fixture has a diameter of 4⅝ inches.

Figure 22:
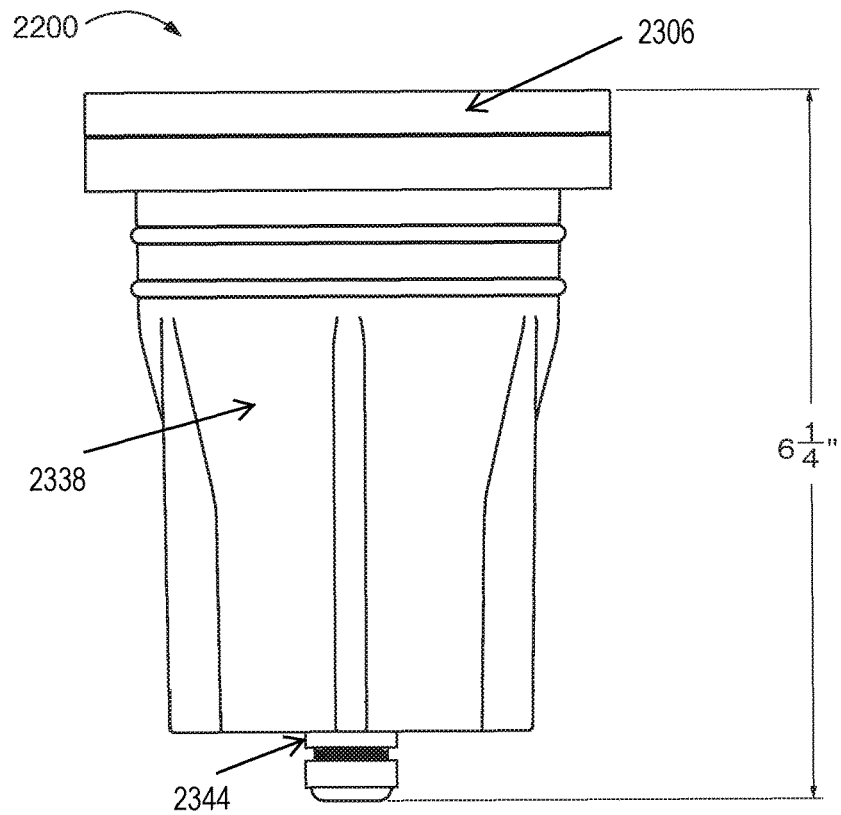
FIG. 22 is a drawing of a side view of the LED landscape inground light fixture of FIG. 20 illustrating various features of the exemplary embodiment of the LED landscape inground light fixture.

Diagram 2200 of FIG. 22 is a drawing of a side view of the LED landscape inground light fixture 2000 of FIG. 20. In the exemplary embodiment the fixture is 6¼ inches high.

While various dimensions are shown in the Figures, these dimensions are only exemplary in nature. The figures are not drawn to scale as emphasis is placed on explaining the invention and the invention is applicable to fixtures and parts of differing dimensions.

Figure 23:
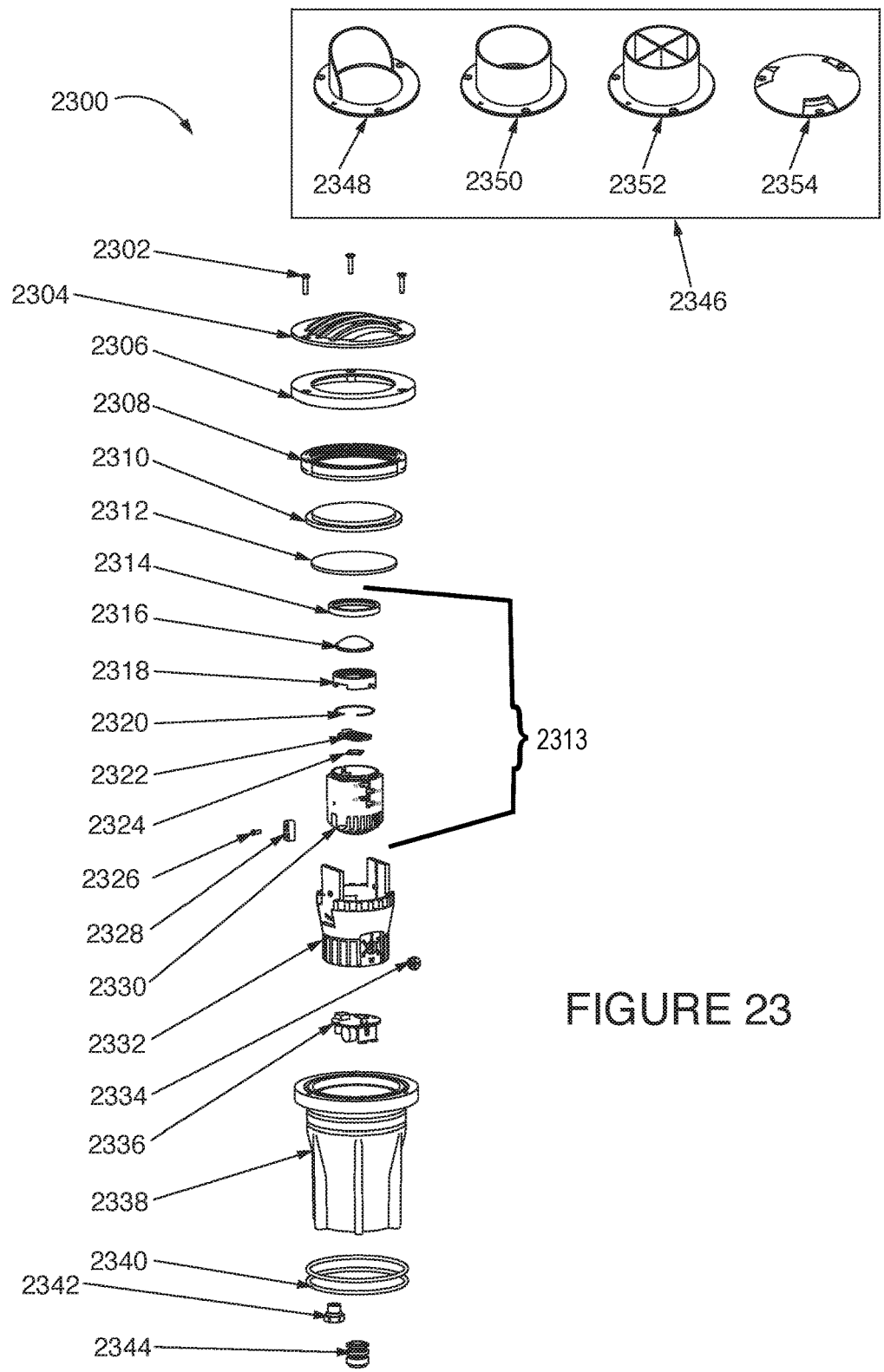
FIG. 23 is a drawing illustrating an exploded view of the exemplary embodiment of the LED landscape inground light fixture of FIG. 20 showing various features and components of the LED landscape inground light fixture.

Diagram 2300 of FIG. 23 is a drawing illustrating an exploded view of the exemplary LED landscape inground light fixture also referred to as an LED landscape inground light assembly 2000 of FIG. 20 showing the details of various features and components of the exemplary embodiment of the LED landscape inground light. Various components of the LED landscape in ground light assembly 2300, also referred to as light fixture 2300, will now be described with reference to FIG. 23.

The LED landscape inground fixture 2300 includes structures for on-board light beam angle control, beam direction control, and control of wattage adjustments. In some embodiments, a user can adjust the light beam angle to be one of a plurality of different predetermined settings, e.g., a 15 degree, 30 degree, 45 degree or 60 degree setting allowing the light beam angle to be set from a spot position to a flood position. In other embodiments other beam angle changes are possible. By using fixed settings, a user can easily configure a plurality of lights 2300 to the same setting for an installation and obtain predictable results.

In addition to beam angle settings, the light fixture 2300 supports a plurality of different light output and/or wattage settings. In some embodiments, a user can adjust the wattage from 2 to 16 while the fixture is allowed to operate in a range of 9-15 volts AC or DC with these ranges being exemplary and not limiting.

The LED landscape inground assembly 2300 includes seals, e.g., gaskets (flat or custom shaped to match the objects or specific surfaces to be sealed), O rings and/or other flexible shaped seals. One or more of the seals may be, and in some embodiments are, made of silicone material with the seal or seals protecting the light fixture from the intrusion of water and dirt thereby providing a water proof or water resistant fixture which is also resistant to dirt. The use of LEDs as the light source provides a cost and energy savings over the use of other light sources such as incandescent bulbs and provides multiple lumen output ranges comparable to 10 W-75 W MR 16 halogen lights.

An LED landscape inground light, implemented in accordance with one or more features, may and in some embodiments is used to provide accent lighting. The accent lighting in such a case may be and often is directional lighting that draws attention to a displayed object such as for example a statue or tree, or surface, or to highlight, dramatize, and focus attention on a defined space such as a garden or position on a monument or stage. The LED landscape inground light may also be used to illuminate defined spaces such as walk ways, entrance ways, driveways, roads, gardens, fields, play areas, and pools. In such applications it may be desirable to set multiple light fixtures 2300 to the same beam angle setting and arrange the light fixtures in a row or predetermined pattern with the ability to set the light fixtures to fixed beam angles and/or wattage settings allowing for a flexible use of the lights with predictable lighting results.

The light fixture 2300 includes face plate screws 2302, rock guard accessory 2304, fixture housing cover 2306, fixture housing seal 2308, e.g., a gasket, transparent seal 2310, e.g., sealing glass, accessory lens 2312, a movable light assembly 2313 which includes a retainer nut 2314, a beam angle changing lens 2316, a beam angle changing dial 2318, a lens retainer 2320, e.g., snap ring or clip, a LED holder 2322, a light source 2324 which in this exemplary embodiment is a LED, a tilting mechanism screw 2326, a tilting mechanism 2328 and an upper fixture main body 2330 arranged as shown in FIG. 23. In some embodiments the beam angle changing lens 2316 has an outer flange and is inserted into the beam angle changing dial 2318 from the bottom with the flange of the beam angle changing lens 2316 being placed against a bottom of a flange at the top of the beam angle changing dial 2318 with the retaining snap 2320 being placed in a grove in the inside wall of the beam angle changing dial 2318 holding the lens 2316 securely against the bottom of the flange located at the top of the beam angle changing dial 2318. The beam angle changing dial 2318 includes pins extending out from the sides of the dial 2318 which can be used to support the beam angle changing dial 2318 in horizontal slots 2405 in the sidewall of the upper main fixture body 2330. Thus in some embodiments the beam angle changing dial 2318 has at least one or more guide pins 2319 (see FIG. 24) which can be moved in beam angle changing channels, also referred to as horizontal slots 2405 and vertical slots 2403 of the upper fixture main body 2330.

The light fixture 2300 further includes a lower fixture main body 2332 which supports the moveable light assembly 2313 in one of a plurality of tilt positions depending on the user setting of the tilt angle.

The beam angle changing dial 2318 of the movable light assembly 2313, also sometimes referred to a beam angle control dial 2318, is made of cast aluminum but other materials such as plastic may be used.

The beam angle changing dial 2318 houses the element to be moved which as discussed with regard to other embodiments can be either the beam angle changing lens 2316 or the LED light emitter 2324 and enables the relative distance between the LED light source and the beam angle changing lens to vary by moving up or down in the upper fixture main body 2330. Accordingly, the element held in the beam angle changing dial is retained in the dial by retainer clip 2320. The retainer nut 2314 is in some embodiments made of aluminum. The beam angle changing lens 2316 is in most but not all embodiments is made of plastic but can be made of other materials such as for example glass. The retainer nut 2314 is shown in this exemplary embodiment as holding the beam angle changing lens 2316 in place. The beam angle changing lens 2316 changes the focus of the light when the distance between it and the light source is changed for example when the beam angle changing lens 2316 is moved up or down in the upper fixture main body 2330 relative to a fixed LED light source 2324. In some embodiments, the upper fixture main body 2330 is made of cast aluminum but other material such as for example plastic may and in some embodiments is used.

The light source 2324 in each of the various embodiments converts electrical energy (electricity) into light. In this example the light source is a light emitting diode, such as for example a semiconductor LED. In some embodiments, the light source is an LED that operates on low voltage for example 12V or 24V. In some embodiment the light output is white light and reaches an output of up to 900 lumens or approximately 900 lumens. In some particular embodiments, the LED produces a warm white light 2700K Correlated Color Temperature (CCT) or approximately 2700K CCT. In some embodiments, the LED light source produces a pure white light 3000K CCT or approximately 3000 CCT. In some embodiments, the LED is an Organic LED (OLED). In some embodiments, the light source is a combined LED and OLED. In some embodiments, the light source is a polymer light-emitting diode (PLED). The light source 2324 in some embodiments is an LED module or assembly including a plurality of separate LEDs that produce light.

In the embodiment shown in FIG. 23 the beam angle changing dial 2318 houses the beam angle changing lens 2316. After the beam angle changing dial 2318 with the beam angle changing lens 2316 mounted therein is inserted into the slots of the upper fixture main body 2330 the top of the vertical slots 2403 (see FIG. 24) are closed off by screwing the retaining nut 2314 onto threads 2417 at the top of the fixture main body portion 2330.

The light fixture 2300 further includes a lower fixture main body 2332. The lower fixture main body 2332 is in most but not all embodiments made of cast aluminum. The lower fixture main body 2332 supports the upper fixture main body 2330 at one of a plurality of tilt angles which are selectable by a user. The tilt angles may be 0 degrees, 15 degrees, etc.

The lower fixture main body 2332 also houses an LED driver assembly 2336 which can be used to set the wattage and/or light output of the LED light source 2324 to which the LED driver assembly 2336 supplies power.

A control knob 2334 is positioned on the lower side portion of the lower fixture main body 2332 and has a drive or shaft portion which extends through an opening in the lower fixture main body 2332 and interfaces with and mechanically drives a moveable element of a potentiometer on the LED driver assembly 2336. The knob 2334 may be, and in some embodiments is, the same as or similar to the knob 548 shown and described in FIGS. 6B, 16 and 35. The LED driver assembly 2336 may be and in some embodiments is the same as or similar to the LED driver assembly 554 shown and described with regard to FIGS. 6B and 16. A seal 546 shown in FIG. 35 is used in some embodiments to seal the lower fixture main body 2332 at the point the shaft of the knob 2334 passes through the lower fixture main body and comes into contact with the moveable element of the potentiometer of the LED driver assembly 2336. The seal may be and in some embodiments is the same or similar to the seal 546 shown in FIG. 35.

Figure 34:
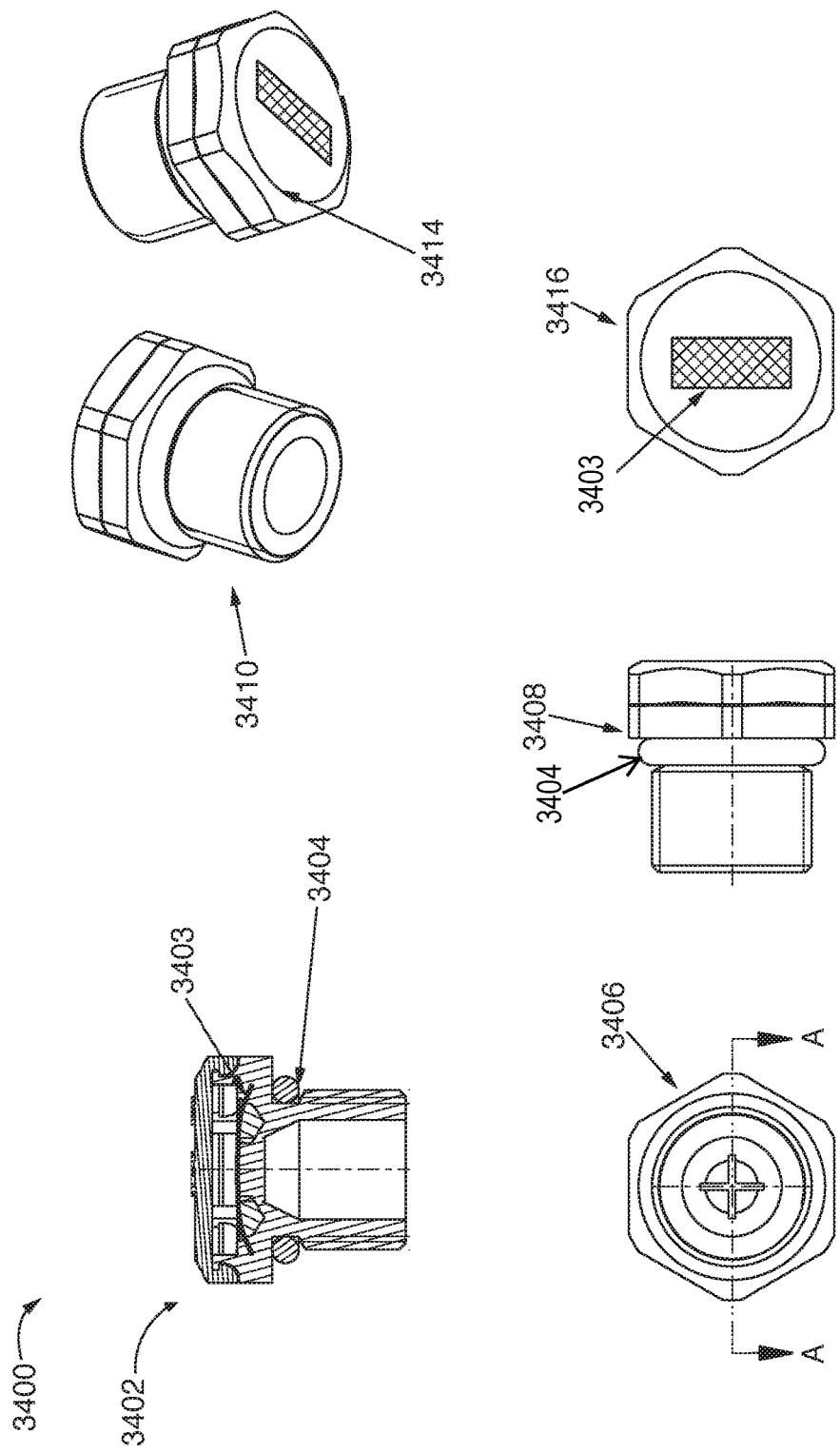
FIG. 34 illustrates various features of an exemplary LED landscape inground light fixture pressure equalizer screw in vent.

The movable light assembly 2313 is mounted in the lower fixture main body 2332 which has the LED driver assembly 2336 mounted in its base. Wires from the LED driver assembly extend from the LED driver assembly through the bottom of the moveable light assembly 2313 to supply power to the LED light source 2324 mounted in the bottom of the fixture main body 2330 which is tilt-able. The lower portion of the base through which wires enter and in which the LED driver assembly 2336 is located is sealed from the bottom in some embodiments with silicone glue for waterproofing purposes. Thus, where wires pass through a hole in the bottom of lower fixture main body 2332 and extend to the LED driver assembly 2336 to which they are electrically connected to provide power to the driver assembly 2336, the lower fixture main body 2332 is sealed with glue with the driver assembly 2336 being potted, e.g., set into, the glue to provide a water tight seal at the bottom of the lower fixture main body 2332. The moveable light assembly 2313 and lower fixture main body 2332 is inserted into a fixture housing 2338 which in some embodiments is in the form of a finned cylinder that is closed on the bottom and has a flange on the top to which the fixture housing cover 2306 can be secured with screws 2302. In some embodiments O rings 2340 are placed around an upper portion of the fixture housing body 2338 to form a water tight seal against the walls of a container, e.g., fixture pot which may be set in concrete, into which the light fixture 2300 may be inserted. Wires may and in some embodiments do pass through an electrical connector 2344 with a locking nut that may be and in some embodiments is threaded into a hole located in the bottom of the housing body 2338. The electrical connector 2344 may be and sometimes is in the form of a hollow threaded shift, rubber seal and locking nut. The wires providing power to the fixture pass through the hollow threaded shaft which is inserted into and secured to a hole in the bottom of the fixture housing 2338, e.g., by a nut or thread. The wires pass through the rubber washer or seal which is compressed around the wires as the locking nut is tightened onto the threaded shaft of the connector 2344. The use of the seal is optional with the silicone glue alone being used in some embodiments to seal the connector. The seal and/or silicone glue seal the electrical connector 2344 and sealing the bottom opening in the housing body 2338 through which the electrical power supply wires pass before reaching the LED driver assembly 2336. In some embodiments an optional pressure equalizer 2342 is inserted into the bottom of the housing 2338 allowing gas and air to vent between the fixture housing 2338, which is sealed by the translucent seal 2310 (e.g., glass seal) and cover seal 2308, and the external environment or interior of a mounting canister in which the light fixture 2300 may be placed. The pressure equalizer 2342 allows pressure to equalize between the inside of the fixture housing 2338 and exterior of the fixture housing 2338. Diagram 3400 of FIG. 34 illustrates various different perspective views of an exemplary optional pressure equalizer 2342. The pressure equalizer 2342 in one embodiment is a screw 3402 (cross sectional side view shown) with one or more vent holes covered by a semi-permeable fabric 3403 that allows air to pass through but does not allow other particles such as water and dirt from passing through. In one such embodiment, the semi-permeable fabric is made of polytetrafluoroethylene material. The screw shaft is sealed against the housing of the lighting fixture with a seal 3404. Various perspective views (top views 3406, side view 3408, a top cross section view 3416 showing the semi-permeable fabric 3403 inside the cap of the screw, the cap including vents, and angled perspective views 3410 and 3414 are illustrated.

The arrangement and function of various elements of the light fixture assembly 2300 will now be explained in greater detail.

The optional rock guard accessory 2304 in some embodiments is made of aluminum. In some other embodiments the rock guard accessory 2304 is made of brass. The rock guard accessory 2304 protect the elements of the fixture beneath the guard 2304 from possible damage that may be caused by small rocks, gravel and pebbles. The rock guard accessory 2304, when used, is secured to the top flange of the fixture housing 2338 with screws 2302 which pass through the rock guard assembly 2304 and cover 2306 and into threaded holes in the flange located in the fixture housing 2338. When not used the screws 2302 secure the cover 2306 to the top flange of the fixture housing 2338.

The face plate screws 2302 in some embodiments are made of stainless steel and as explained are used to secure external accessories such as for example rock guard 2304 and/or glare control accessories including a glare shield 2348 to the fixture housing 2338. The face plate screws 2302 may extend through holes or slots in the accessory, through holes in the fixture housing cover 2306 also referred to as a face plate and into a threaded portions, e.g., holes, in the top flange of the fixture housing 2338.

Optional glare and light shaping or patterning accessories including the glare shield 2348, snoot accessory 2350, cross louver accessory 2352, and light pattern accessory 2354 can be secured to the fixture housing 2338 using face plate screws 2302. In many but not all embodiments, these accessories are made from either aluminum or brass and are typically used in place of the rock guard accessory. The glare shield 2348, snoot accessory 2350 and cross louver accessory 2352 are used to control glare and/or shield the light output of the light fixture to achieve a desired lighting effect. The light pattern accessory is an accessory which when the light from light source passes through creates a light pattern.

While various accessories may be placed over the cover 2306, protective glass 2310 which is mounted in a groove of the seal 2308 is used to seal the top of the fixture housing. When the cover 2306 is secured to the flange of the fixture housing 2338 it compresses the seal 2308 and forces it out against the inner sidewall of the fixture housing 2338 as well as against the top of the fixture housing 2338 and the bottom of the cover 2306. In this manner the seal 2308 into which the protective glass 2310 is inserted seals the top opening of the fixture housing 2338 with the movable tiltable light assembly 2313 and lower fixture body 2332 inside.

In some embodiments an optional accessory lens 2312 is used to control or select the spectrum of the light emitted from the light fixture 2300. The accessory lens may be and in some embodiments is positioned beneath the protective cover glass 2310 above the beam changing lens 2316. The accessory lens 2312 may sit over the locking nut 2314. In some embodiments the accessory lens 2312 is made of colored glass. In some other embodiments, the accessory lens 2312 is made of plastic. The accessory lens 2312 in some embodiments acts as a color filter allowing light of the desired color to pass out of the light fixture but blocks light of other colors by filtering out the undesired colors.

The transparent seal 2310 in some embodiments is tempered glass. The transparent seal 2310 seals and protects the light fixture from environmental conditions such as the entry of water and/or dirt that may damage the internal components In some embodiments, translucent plastic is used for the transparent seal 2310 instead of tampered glass.

Box 2346 illustrates several exemplary optional accessories for the spotlight fixture including glare shield accessory 2348, snoot accessory 2350, cross louver accessory 2352 and light pattern accessory 2354 which may be used in place of or in combination with the rock guard accessory 2304. One or more of the accessories may be, and in some embodiments are, used with inground fixture 2000. Other external accessories such as hoods and grills may, and in some embodiments are, used with the light fixture and can be replaced without affecting the water tight seal of the fixture. In some embodiments, one or more of these accessories may replace the rock guard accessory which is an optional component of the light fixture 2000. The accessories are secured using face plate screws 2302.

The light fixture 2300 and the adjustments which can be made will now be explained further with reference to FIG. 24 which shows various elements of the light fixture 2300 in greater detail. Elements which are the same in FIG. 24 as FIG. 23 are identified using the same reference numbers.

In FIG. 24 the retaining nut 2314 which can be screwed onto the thread portion 2417 at the top of the upper fixture main body 2330 can be seen positioned over the changing dial 2318 in which the beam changing lens 2316 is mounted. The beam angle changing dial 2318 includes pins 2319, e.g., one per side, which extend out from the wall of the beam angle changing dial 2318. The pins 2319 support the beam angle changing dial 2318 in one of the horizontal slots 2405. Thus, as the pair of pins 2319 are held in a pair of horizontal slots 2405 on different sides of the upper fixture main body the element holder beam angle changing dial 2318 and therein the movable light assembly 2313 will be held in corresponding horizontal slots 2405 positioned at the same distance from the bottom of upper fixture main body 2330. The side wall 2404 is the side wall of the vertical slot 2403.

To change the beam angle, a user moves the beam angle changing dial 2318 so that the pins 2319 can travel along the vertical slots 2403 to reach the horizontal slots 2405 corresponding to a desired beam angle setting. For example, the horizontal slot 2401 is used for a 60 degree beam angle setting. The end of each horizontal slot is elongated. Reference numeral 2407 points to the elongated end of the horizontal slot for 15 degrees. The beam angle setting is indicated by a corresponding beam angle indication 2408, 2410, 2412, 2414 printed, engraved or otherwise indicated on the outside of the upper fixture main body 2330. By moving the pins from one horizontal slot to another the beam angle can be changed. In some embodiments the beam angle indicators 2418, 2416 are also included on the inside wall of the upper fixture main body 2330. During adjustment the user can see the beam angle indicators marked on the outside of the upper fixture main body 2330 and once assembled can see the markers on the inside of the fixture main body 2330 by looking down through the top of the fixture 2300 and the lens 2316. Thus, even when assembled in some embodiments a user can see the beam angle to which the light fixture 2300 has been set.

Once the pins 2319 are aligned in the vertical slots 2403 with the horizontal slots 2405 corresponding to the desired beam angle setting the user rotates the beam angle holder 2318 by hand moving the pins 2319 into the horizontal slots 2405 corresponding to the desired beam angle. Notably, the end of the horizontal slots is enlarged relating to the portion adjacent the vertical slots. The O rings 2321 compress while passing through the narrow portion of the horizontal slots 2405 while enlarging slightly when reaching the end of the slots to hold the pins 2319 snugly and securely at the end of the horizontal slots 2405. Once set at the desired position the O rings 2321 serve to keep the pins 2319 at the end of the slots 2405 while also protecting the element holder 2318 from minor vibrations through a dampening effect. Cooling fins 2402 are included at the bottom of the upper fixture main body 2330 to help in dissipating heat generated by the LED light source 2324 mounted in the bottom of the upper fixture main body 2330

Illustration 2448 shows the various components shown on the left side of FIG. 24 in assembled form with the beam angle changing dial pins 2319 set in the horizontal slot corresponding to the 60 degree beam angle position indicated by marker 2414. The beam angle changing dial 2318 can be rotated horizontally and be moved up and down vertically within the upper fixture main body 2330 with the guide pins 2319 of the beam angle changing dial 2318 moving along the horizontal slots 2405 and vertical slots 2403 of the upper fixture main body 2330 as indicated by the curved arrows identified by reference number 2465.

FIG. 25A through 25D illustrate the moveable light assembly 2313 of the light fixture 2300 set at different beam angles.

Figures 25A, 25B, 25C, 25D:
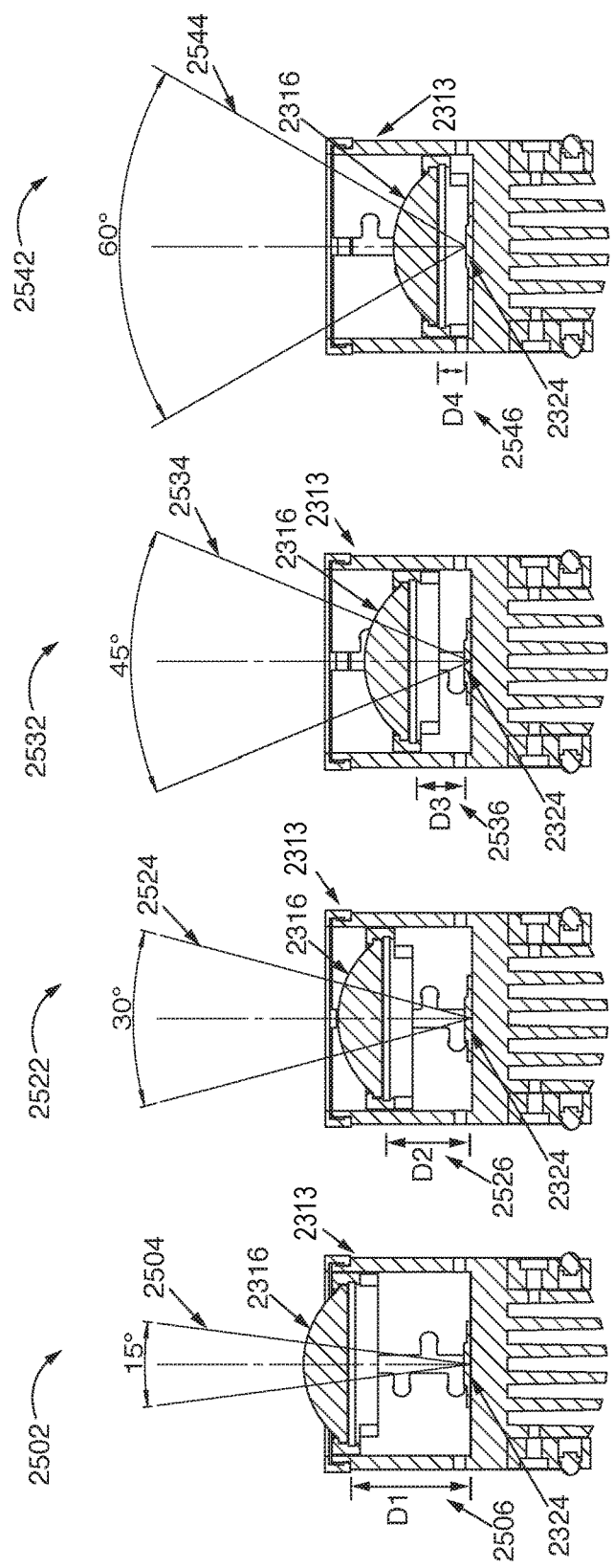
FIG. 25A illustrates features of an exemplary embodiment of the LED landscape inground light fixture beam changing mechanism configured to provide a light beam angle output of 15 degrees.
FIG. 25B illustrates features of an exemplary embodiment of the LED landscape inground light fixture beam changing mechanism configured to provide a light beam angle output of 30 degrees.
FIG. 25C illustrates features of an exemplary embodiment of the LED landscape inground light fixture beam changing mechanism configured to provide a light beam angle output of 45 degrees.
FIG. 25D illustrates features of an exemplary embodiment of the LED landscape inground light fixture beam changing mechanism configured to provide a light beam angle output of 60 degrees.

FIG. 25A shows an illustration 2502 of the moveable light assembly 2313 set at 15 degrees producing a light beam output 2504 of 15 degrees. Note that the distance D1 2506 between the beam angle changing lens 2316 and the light source 2324 is relatively large resulting in a narrow 15 degree beam angle.

FIG. 25B shows an illustration 2522 of the moveable light assembly 2313 set at 30 degrees producing a 30 degree light beam output 2524. Note that the distance D2 2526 between the beam angle changing lens 2316 and the light source 2324 is relatively large, but smaller than D1, resulting in a 30 degree beam angle of emitted light.

FIG. 25C shows an illustration 2532 of the moveable light assembly 2313 set at 45 degrees producing a 45 degree light beam output 2534. Note that the distance D3 2536 between the beam angle changing lens 2316 and the light source 2324 is small, i.e., smaller than D1 and D2, resulting in a 45 degree beam angle of emitted light.

FIG. 25D shows an illustration 2542 of the moveable light assembly 2313 set at 60 degrees producing a 60 degree light beam output 2544. Note that the distance D4 2546 between the beam angle changing lens 2316 and the light source 2324 is set to the smallest supported setting, i.e., D4 is smaller than D1, D2 and D3, resulting in a 60 degree beam angle of emitted light.

FIGS. 26A through 26D shows an exemplary moveable light assembly 2313' which can be used in the inground light fixture shown in FIG. 2300 in place of the moveable light assembly 2313. The construction of the movable light assembly 2313' is similar to that of the assembly 2313 but with beam angle changing lens 2316 being set at a fixed position at the top of the moveable light assembly 2313' and with the light emitter 2324 being mounted in the moveable element holder held in the horizontal slots of the upper fixture main body 2330 at a position determined based on the desired beam angle.

FIG. 26A shows an illustration 2602 of the moveable light assembly 2313' set at 15 degrees producing a light beam output 2604 of 15 degrees. Note that the distance D1 2606 between the beam angle changing lens 2316 and the light source 2324 is relatively large resulting in a narrow 15 degree beam angle.

FIG. 26B shows an illustration 2622 of the moveable light assembly 2313' set at 30 degrees producing a light beam output 2624 of 30 degrees. Note that the distance D2 2626 between the beam angle changing lens 2316 and the light source 2324 is relatively large, but smaller than D1, resulting in a 30 degree beam angle of emitted light.

FIG. 26C shows an illustration 2632 of the moveable light assembly 2313' set at 45 degrees producing a light beam output 2634 of 45 degrees. Note that the distance D3 2636 between the beam angle changing lens 2316 and the light source 2324 is small, i.e., smaller than D1 and D2, resulting in a 45 degree beam angle of emitted light.

FIG. 26D shows an illustration 2642 of the moveable light assembly 2313' set at 60 degrees producing a light beam output 2644 of 60 degrees. Note that the distance D4 2546 between the beam angle changing lens 2316 and the light source 2324 is set to the smallest supported setting, i.e., D4 is smaller than D1, D2 and D3, resulting in a 60 degree beam angle of emitted light.

FIG. 27 illustrates various features of the exemplary embodiment of a LED landscape in ground light fixture 2000 shown in FIG. 23. Illustrated in FIG. 27 are light beam aiming features, e.g., tilt, mechanisms that allow the upper fixture main body 2330 to be supported and held at one of a plurality of user selectable tilt angles. The tilting of the upper fixture main body 2330 is made possible by supporting the upper fixture main body 2330 using pivot screws 2710, 2712 which pass through support arms 2713, 2715, respectively, at or near a center portion 2708 of the individual support arms. As the screws pass through the support arms 2713, 2715 of the lower fixture main body 2332 and into pivot holes 2702 (one on each side of the upper fixture main body 2330), they become pivots, one per side, around which the upper fixture main body 2330 can be rotated, e.g., tilted, +/−20 degrees as shown in the FIG. 27 embodiment. In some embodiments while pivot screws 2710, 2712 are threaded at the tip, the threads stop before reaching the screw's head so that the shaft of the screw is smooth at the point where the sides of the 2713, 2715 of the lower fixture main body make contact with the screws facilitating a smooth pivoting action. The tilting mechanism 2328 acts as a spring loaded stop to hold the upper fixture main body 2330 at the tilt angle to which it is set.

Tilting mechanism 2328 includes a screw 2326, a stopper bracket 2329, a stop 2706 in the form of a button or ball, and a spring 2704. One tilting mechanism is on mounted on each side of the upper fixture main body 2330 as can be seen in illustration 2730. Thus the lighting fixture includes both a first tilting mechanism 2328 and a second tilting mechanism 2328 one per side.

The screw 2326 secures the tilting mechanism stop 2328 to the side of the upper fixture main body to which it is secured as shown in views 2730 and in more detail view 2740. The button 2706 is pressed outward by spring 2704 and protrudes slightly from a hole in the stopper bracket 2329 used to hold the button 2706 and spring 2704. The button 2706 under spring tension will extend into one of the tilt holes 2714 holding the upper fixture main body 2330 at the tilt angle corresponding to the hole into which the button 2706 extends. A plurality of tilt angle holes can be seen in illustration 2720 with the center hole corresponding to a 0 degree tilt setting, the holes adjacent to the center hole corresponding to +/−10 degree tilt setting and the outer most holes corresponding to +/−20 degree settings respectively. As a user tilts the upper fixture main body to change tilt positions the button will be forced inward against the spring 2704 and pop out once again when aligned with another tilt hole. Thus through the use of a simple button and spring mechanism tilting of the main fixture body can be supported while also allowing for a secure retaining of the tilt position once the desired tilt position is achieved.

Each support arm 2713, 2715 of the lower fixture main body includes a vertical grove extending down from the top through the pivot point to the 0 degree tilt hole of the set of tilt holes 2714. This facilitates insertion of the upper fixture main body with the tilting mechanism 2328 with the stop 2328 guided by the center inside slot of the support arms 2713, 2715 facilitating insertion of the upper fixture main body with one of the tilting stop mechanism 2328 secured to each side.

In some embodiments the side surfaces of the upper fixture main body in which the pivot holes 2702 are located so that once inserted into the lower fixture main body they make thermal contact with the sides of the support arms 2713, 2715 facilitating heat transfer from the LED light source mounted in the upper fixture main body 2330 through the support arms and down to the cooling fins located at the bottom and along the sides of the lower fixture main body. Mounted in the lower fixture main body is a power/light control indicated by the reference 2317 which includes a control knob which makes contact with a power control module. The control knob and power control module maybe the same or similar to the one described with respect to the FIG. 5 spotlight embodiment.

The power control knob 2317 and wattage setting indicators is positioned at the bottom of ht lower fixture main body and maybe the same or similar to the power control knob and power control module shown and used in the FIG. 6B spotlight embodiment.

Figure 28:
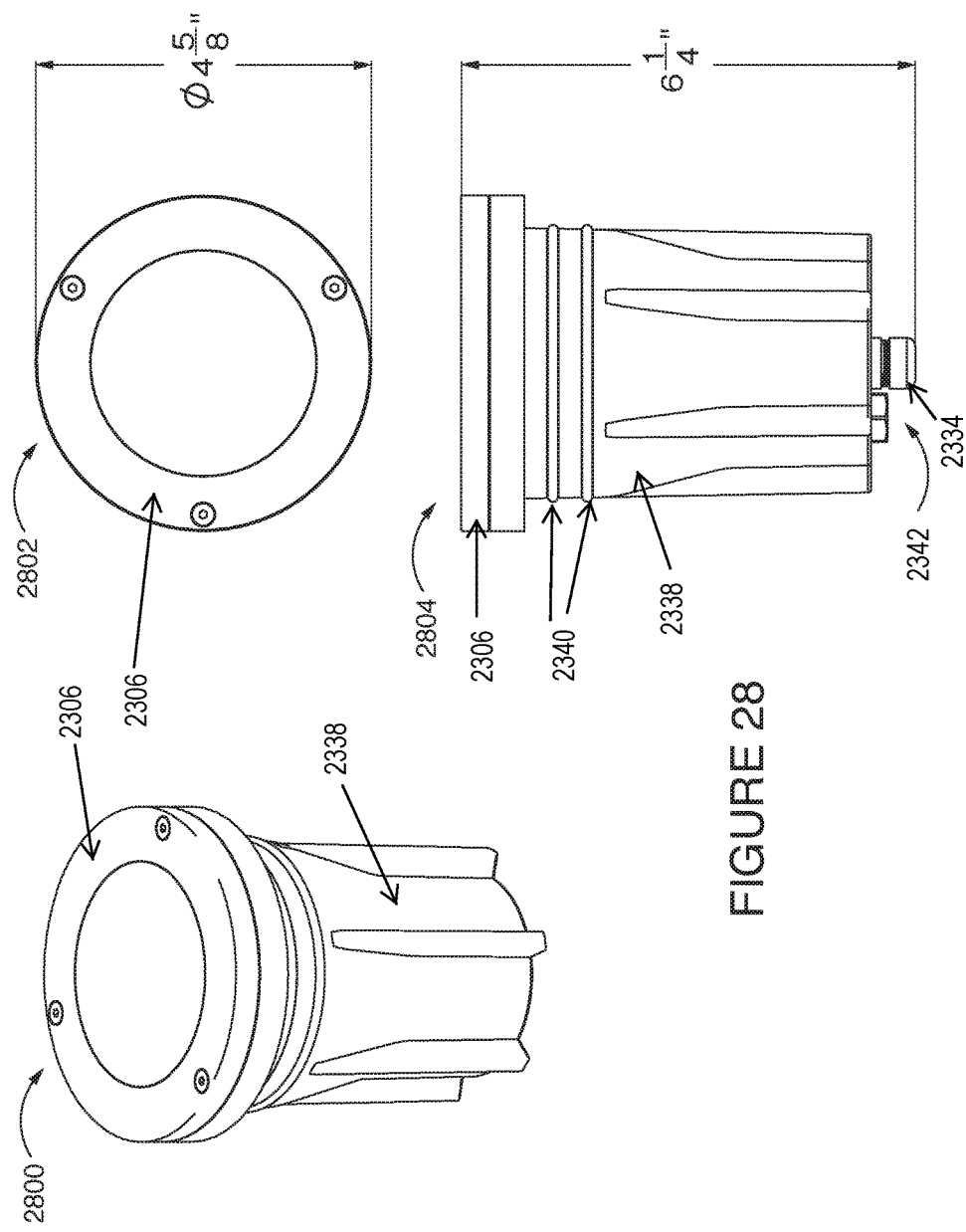
FIG. 28 is a drawing illustrating an exemplary embodiment of a LED landscape inground light fixture including a pressure equalizer diaphragm.

FIG. 28 shows various views of an assembled exemplary in-ground light fixture, such as the fixture 2300 with the cover 2306 secured to the fixture housing 2338. Illustration 2800 is a perspective view showing the cover and a portion of the fixture housing 2338. Illustration 2802 is a top view of the in-ground light fixture in which the cover 2306 can be seen. Illustration 2804 is a side view of the light fixture 2300 in which the cover 2306 and fixture housing 2338 can be seen. In this view O rings 2340, electrical connector 2334 and pressure equalizing plug 2342 can be seen. Exemplary dimensions, in inches, are also shown in FIG. 28. Such dimensions are exemplary and not intended to be limiting.

Figure 29:
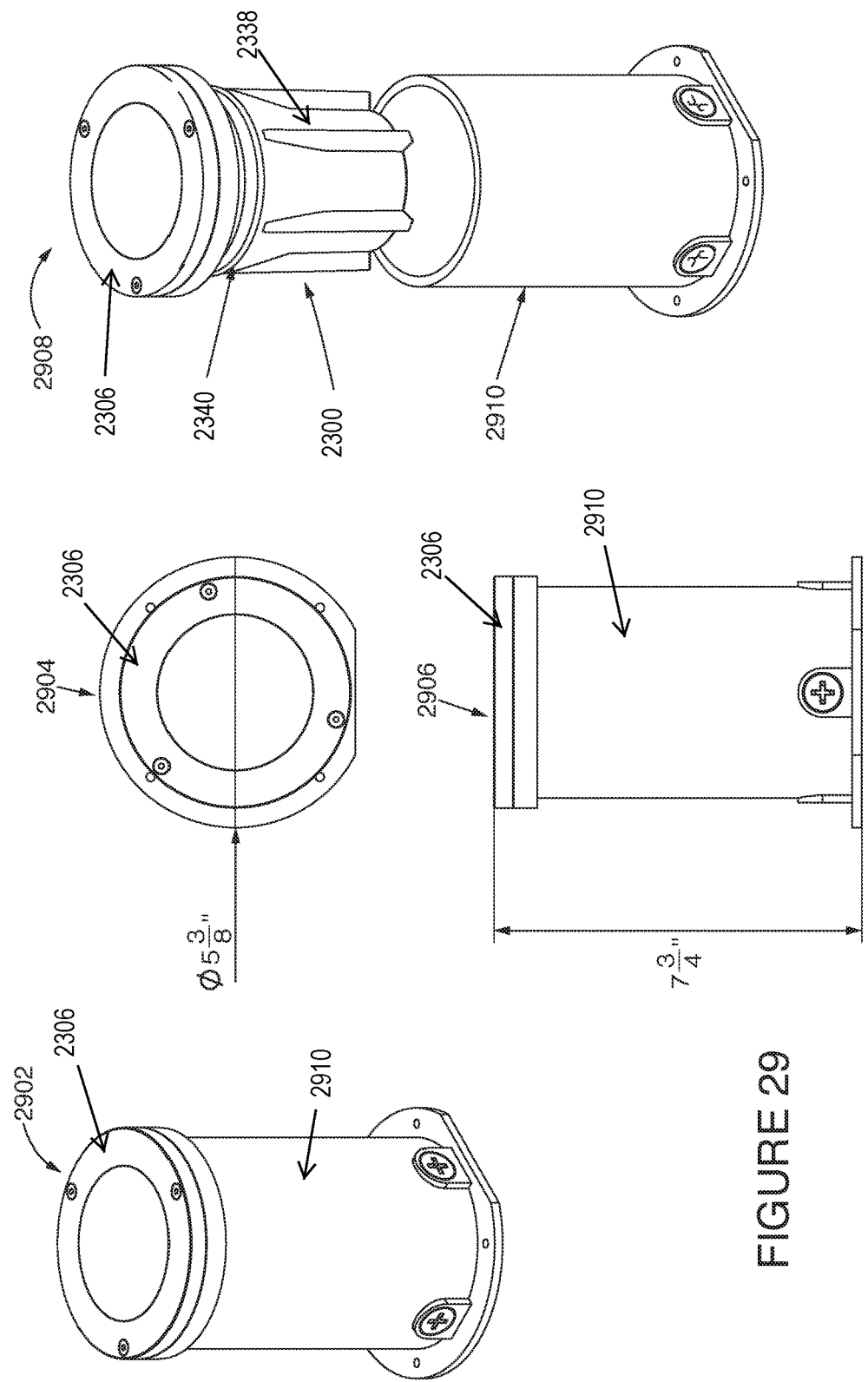
FIG. 29 is a drawing illustrating an exemplary embodiment of a landscape inground light fixture with a concrete pour canister.

FIG. 29 is a drawing illustrating an exemplary embodiment of a landscape inground light fixture such as the one shown in FIG. 23, when used in combination with a concrete pour canister 2910. Use of the concrete pour canister is optional but is well suited for applications where the inground light fixture is to be set into concrete. The concrete pour canister 2910 may be set in place with electrical conduit and power lines run to one or more of the electrical connector openings which are shown at the bottom of the canister 2910 and plugged. Concrete can be poured around the canister 2910 and the light fixture 2300 subsequently inserted into the canister from above. Concrete walkways around pools are an example of one location where the canister 2910 and lighting fixture 2300 may be used in combination. Illustration 2902 shows the light fixture 2300 inserted in to the canister 2910 with the face plate 2306 showing while illustration 2904 shows a top view of the canister 2910 with the in-ground light fixture inserted in the canister. Illustration 2908 shows the exemplary light fixture 2300 being placed into canister 2910. O rings 2340 near the top of the fixture housing of the light fixture 2300 will seal against the sidewall of the canister 2910 into which the light fixture 2300 is inserted thereby providing protection against water and dirt entry into the canister 2910 while also helping to secure the light fixture in the canister 2910 in a manner that still allows for easy removal and access to the wires at the bottom of the canister 2910 which are used to supply power to the light fixture 2300. Illustration 2906 is a side view of the inground lighting fixture 2300 and canister 2910 assembled as a unit.

Figure 32:
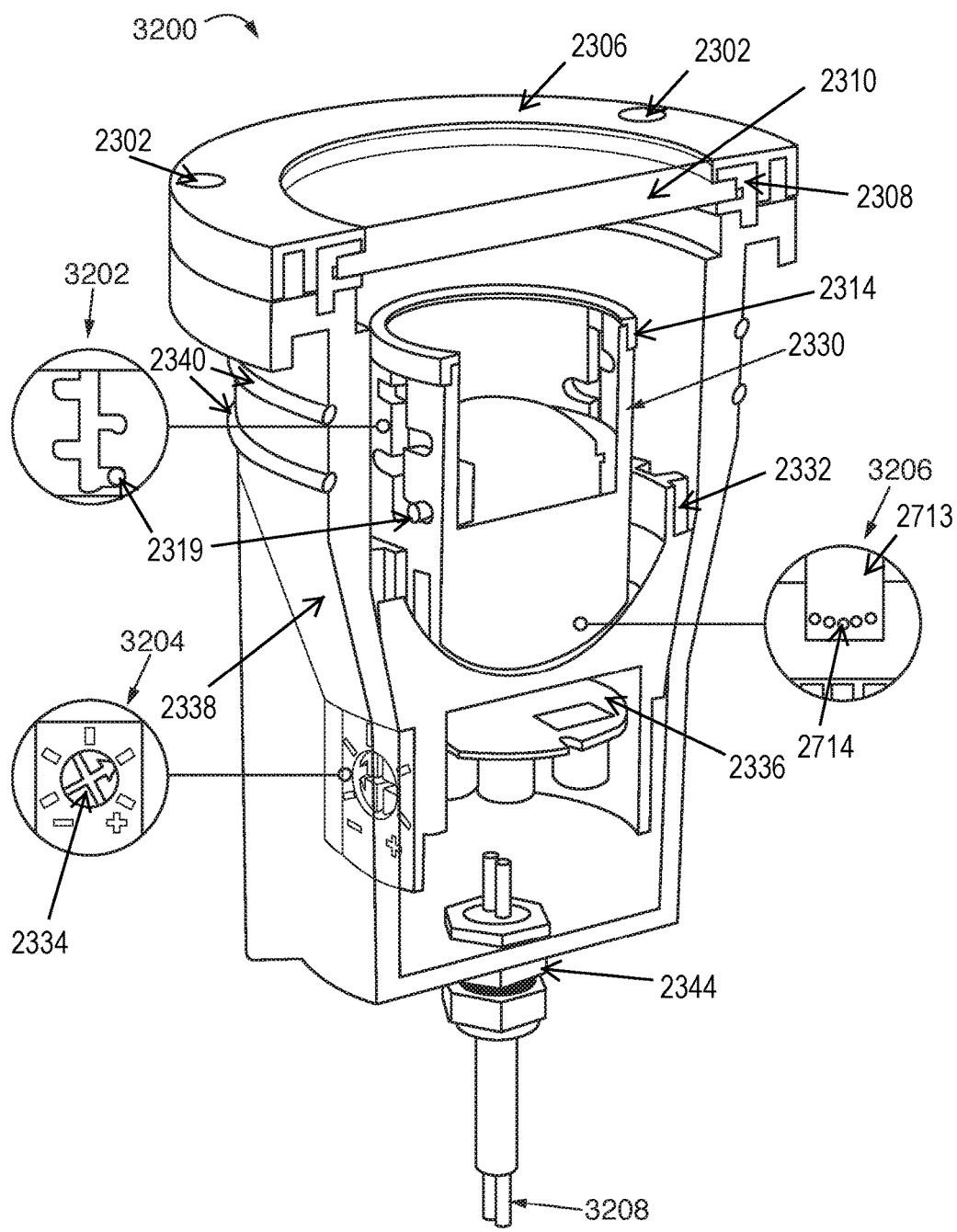
FIG. 32 illustrates a cross sectional view and various features of an exemplary embodiment of an LED landscape inground light fixture.

FIG. 32 illustrates a cross sectional view 3200 and various features of an exemplary embodiment of an LED landscape inground light fixture such as the fixture 2300 of FIG. 23 with blowups 3202, 3204, 3206 being used to show particular features in greater detail. Blow up 3202 shows the vertical and horizontal slots used to allow for beam angle adjustment by changing the horizontal slots in which the support pins 2319 of the beam angle changing dial 2318 are positioned. Slots of the type shown in illustration 3202 are found on each side of the upper fixture main body 2330. Illustration 3206 shows the tilting angle holes which would be present on the side of the upper fixture main body at the location to which illustration 3206 corresponds. Illustration 3204 shows the illumination control knob as viewed from the exterior of the inground light fixture 2300 and the arrow indicating the current position setting can be seen. By turning the knob and thus the arrow indicator to the right, light output of the fixture can be increased as indicated by the + symbol and by turning the knob to the left the light output can be decreased as indicated by the − symbol. Wires 3208 are shown entering the light fixture at the bottom and extending through connector 2344. While the full upper portion of wires 3208 are not shown in FIG. 32, the wires extend to input terminals on the lower portion of the driver assembly 2336 which in turn has wires which extend up through the lower and upper main fixture body portions 2332, 2330 to the light emitting element 2324 to supply power thereto.

Electrical circuits for LED light fixtures will now be described in connection with FIGS. 30, 30A, 30B, 30C, 30D, 30E, 30F, 30G, and 31. These electrical circuits provide on-board dimming capabilities and allow the LED light fixtures to operate over a range of DC and AC input volts such as for example 9V to 12V without compromising the LED light output. The circuits also can operate equally well from 12 V AC or 12 V DC input supplied from either a magnetic transformer or an electronic transformer.

The LED driver assembly of the spotlight, flood light and inground light fixtures previously described may be, and in some embodiments is, one or more of the circuits described in connection with FIGS. 30, 30A, 30B, 30C, 30D, 30E, 30F, 30G and 31. The LED in such circuits being the LED light sources in each of those fixtures with the circuits being connected via wires to the LED. In such embodiments, the potentiometer 555 is the potentiometer described in the dimming control circuit and the dimming control knob 548 fits into the potentiometer control 555A so that when the dimming control knob 548 is rotated, the potentiometer control 555A is also rotated thereby changing a portion of the resistance of the circuit in which the potentiometer is included which results in a change in the current and power supplied to the LED of the light fixture.

Figure 30:
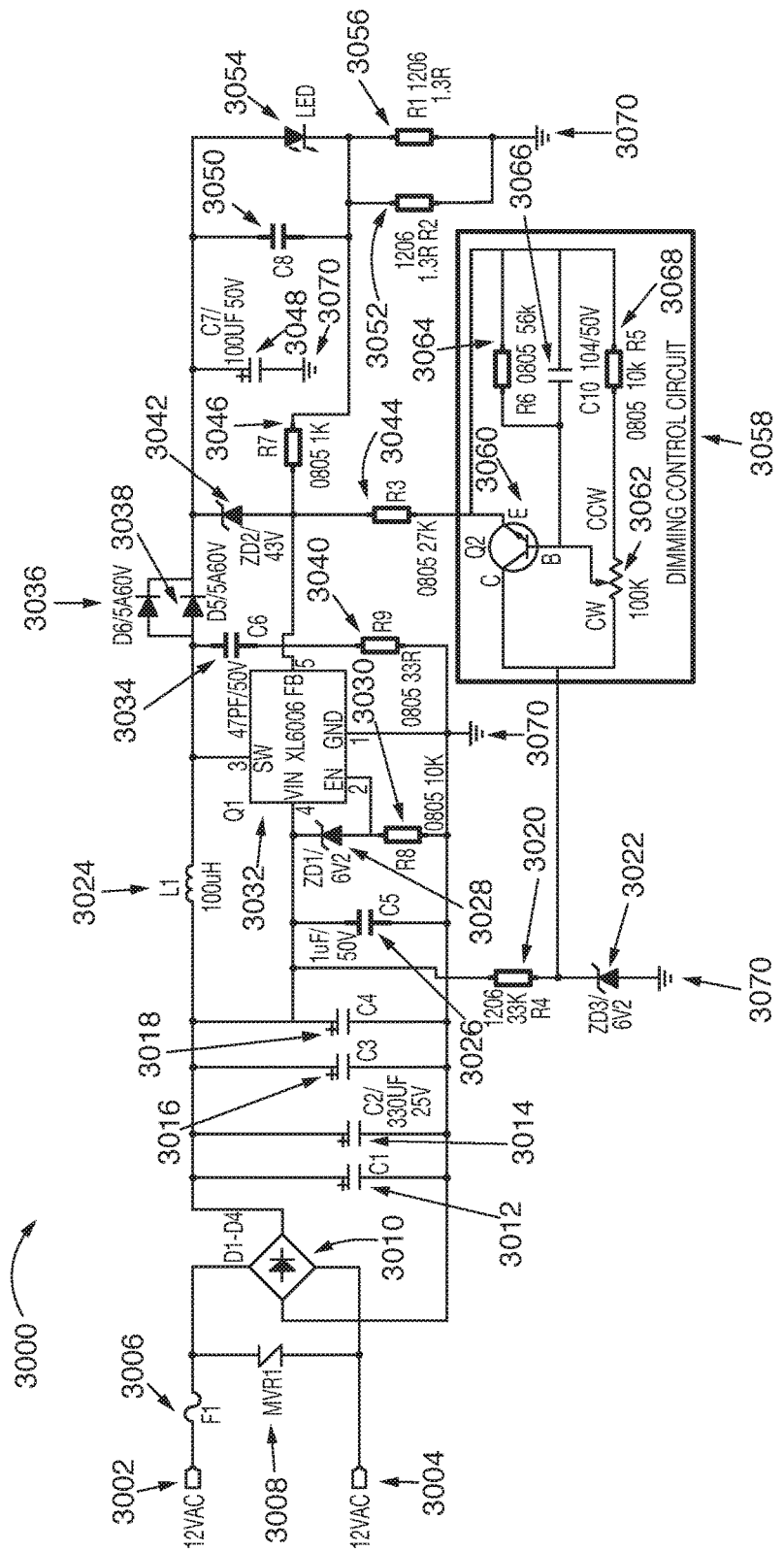
FIG. 30 is a drawing illustrating a circuit diagram of an exemplary embodiment of an adjustable dimmable LED light fixture circuit.

FIG. 30 is a schematic drawing of an exemplary LED circuit 3000 in accordance with an exemplary embodiment. Exemplary LED circuit 3000 includes first and second AC input power source terminals (3002, 3004), fuse F1 3006, metal varistor MVR1 3008, diode bridge (D1-D4) 3010 including four individual diodes (D1, D2, D3, D4) coupled together to form a full wave rectifier bridge, capacitors (C1 3012, C2 3014, C3 1016, C4 3018), inductor L1 3024, capacitor C5 3026, Zener diode ZD1 3028, resistor R8 3030, resistor R4 3020, Zener diode ZD3 3022, IC Q1 3032, capacitor C6 3034, diode D5 3038, diode D6 3036, resistor R9 3040, Zener diode ZD2 3042, resistor R7 3046, capacitor C7 3048, capacitor C8 3050, resistor R3 3044, resistor R2 3052, resistor R1 3056, dimming control circuit 3058, LED 3054 and ground 3070, coupled together as shown in FIG. 30. The dimming control circuit 3058 includes a transistor Q2 3060, a resistor R5 3068, a resistor R6 3064, a capacitor C10 3066, and a potentiometer 3062 coupled together as shown in FIG. 30.

First AC input power source terminal 3002 is coupled to a first lead of fuse F1 3006. A second lead of fuse F1 3006, a first lead of metal varistor MVR1 3008, and a first input lead of diode bridge 3010 are coupled together. Second AC input power source terminal 3004, a second lead of metal varistor MVR1 3008 and a second input of diode bridge 3010 are coupled together. The high output lead (cathode side) of diode bridge 3010, the + lead of capacitor C1 3012, the + lead of capacitor C2 3014, the + lead of capacitor C3 3016, the + lead of capacitor C4 3018, a first lead of inductor L1 3024, a first lead of capacitor C5 3026, a first lead of resistor R4 3020, the cathode lead of Zener diode ZD1 3028, and lead 4 (VIN) of IC Q1 3032 are coupled together. The low output lead (anode side) of diode bridge 3010, the − lead of capacitor C1 3012, the − lead of capacitor C2 3014, the − lead of capacitor C3 3016, the − lead of capacitor C4 3018, a second lead of capacitor C5 3026, a first lead of resistor R8 3030, lead 1 (GND) of IC Q1 3032, and a first lead of resistor R9 3040 are coupled together and are coupled to circuit ground 3070. The anode lead of Zener diode ZD1 3028, second lead of resistor R8 3030 and lead 2 (EN) of IC Q1 3032 are coupled together.

A second lead of inductor L1 3024, lead 3 (SW) of IC Q1 3032, a first lead of capacitor C6 3034, the anode lead of diode D6 3036, and the anode lead of diode D5 3038 are coupled together. The second lead of capacitor C6 3034 is coupled to the second lead of resistor R9 3040. The cathode side of diode D6 3036, the cathode side of diode D5 3038, the cathode side of Zener diode ZD2 3042, the + lead of capacitor C7 3048, a first lead of capacitor C8 3050, and the anode lead of LED 3054 are coupled together. Lead 5 (FB) of IC Q1 3032, the anode side of Zener diode ZD2 3042, a first lead of resistor R7 3046, and a first lead of resistor R3 3044 are coupled together. A second lead of resistor R7 3046, the second lead of capacitor C8 3050, a first lead of resistor R2 3052, a first lead of resistor R1 3056, and the cathode lead of LED 3054 are coupled together.

The second lead of resistor R4 3020, the cathode lead of Zener diode ZD3 3022, the collector (C) lead of transistor Q2 3060, and the CW lead of potentiometer 3062 are coupled together. The second lead of resistor R3 3044, the emitter (E) lead of transistor Q2 3060, a first lead of resistor R6 3064, a first lead of capacitor C10 3068, and a first lead of resistor R5 3068 are coupled together. The wiper arm lead of potentiometer 3062, the base (B) lead of transistor 3060, a second lead of resistor R6 3064, and a second lead of capacitor C10 3066 are coupled together. The CCW lead of potentiometer 3062 is coupled to a second lead of resistor R5 3068.

The anode lead of Zener diode ZD3 3022 is coupled to circuit ground 3070. The − lead of capacitor C7 3048 is coupled to circuit ground 3070. The second lead of resistor R2 3052 is coupled to the second lead of resistor R1 3056 and to circuit ground 3070.

Fuse F1 3006 protects the circuit, e.g., from excessive input current which may damage the circuit. Metal varistor MVR1 3008 protects the circuit from any voltage surge occurring across the input terminals (3002, 3004).

Diode Bridge (D1-D4) 3010 converts an input AC sine wave signal received across its input terminals into AC full wave rectified output signal which is output across its output terminals.

Capacitors C1 3012, C2 3014, C3 3016, C4 3018, which are in parallel across the output of the diode bridge (D1-D4) 3010, serves as a DC filter and converts the AC full wave rectified signal into to DC.

Capacitor C5 3026 serves as a high frequency filter and is in parallel with the DC filter.

Zener diode ZD1 3028 and resistor R8 3030 form an enable control circuit supplying the voltage Vin-Vzd1 to enable the IC Q1 3032 to operate, e.g., when the voltage on the enable pin is at least 1.4 v. Thus IC Q1 3032 is enabled when the input voltage is on.

IC Q1 3032 is a current regulator. Inductor L1 3024, IC Q1 3032, diode D5 3038, and diode D6 3036 form a boost converter circuit which allows an output voltage, measured between the cathode leads of the D5/D6 pair and ground, to be higher than in input voltage, measured between the first lead of inductor L1 3024 and ground. In various embodiments, diodes D5 3038 and D6 3036 are Schottky diodes.

Capacitor C6 3034 and resistor R9 3040 form an RC snubber which reduces the ringing on the output voltage during MOSFET switching which occurs within the IC Q2 3032.

Resistor R4 3020 and Zener diode ZD3 3022 form a precise voltage supply for the dimming control circuit 3058, from the filtered DC voltage which was generated.

Dimming control circuit 3058 receives as an input voltage $V_{ZD3}$, from Zener diode ZD3 which is used as an accurate reference voltage. The dimming control circuit 3058 outputs an output voltage, which can be adjusted by changing the setting of the potentiometer 3062. By changing the output voltage of dimming control circuit 3058 the voltage applied on the feedback (FB) lead (5) of IC Q1 3032 from the dimming control circuit is changed. Different settings of the potentiometer 3062 correspond to different voltages at the emitter lead of transistor Q2 3060, and different feedback voltage contributions at the feedback lead (5) of IC Q1 3032 from the dimming control circuit, based on the voltage divider including resistors R1, R2, R7, and R3.

Zener diode ZD2 3042 is used for output voltage protection, e.g., it prevents the voltage across the LED 3054 from exceeding its Zener breakdown voltage of 43 volts.

Capacitors (C7 3048, C8 3050) are used for holding charge to supply the current to the LED 3054.

Resistor R1 3056 in parallel with resistor R2 3052, serve as a current sense resistor, and are used to convert the LED current to a voltage sense signal that is supplied back to the feedback (FB) pin 5 of IC Q1 3032 via resistor R7 3046 to regulate the current control through MOSFET switching. Note that resistor R7 is >> than R1 in parallel with R2.

Note that in this exemplary design there are two sources of feedback to FB pin 5 of IC Q1 3032, a dimming control feedback signal based on potentiometer 3062 setting and a current sense feedback signal based on a measurement of the current through LED 3054. Note that since the dimming control circuit 3058 controls dimming via the FB input of IC Q1 3032 the dimming is performed without wasting energy, e.g., dimming is not performed using power dissipation in resistors.

Figure 31:
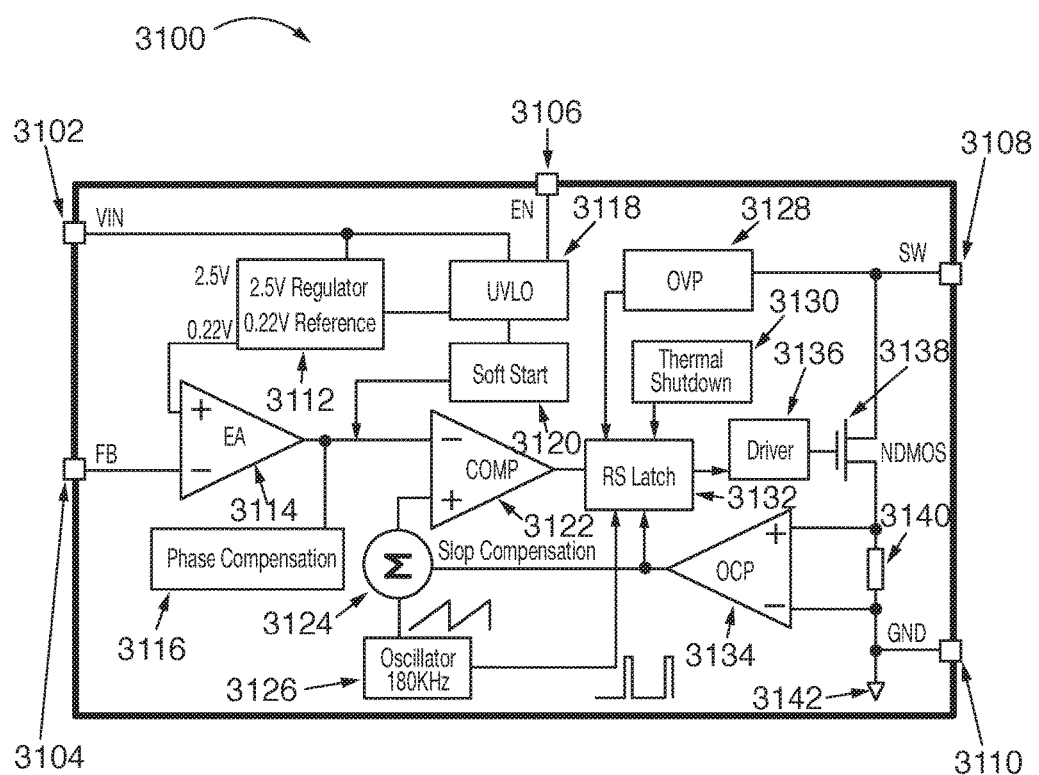
FIG. 31 illustrates a functional block diagram of the exemplary IC XL6006 shown in the circuit diagram shown in FIG. 30.

FIG. 31 is a function block drawing of an exemplary IC 3100 in accordance with an exemplary embodiment. Exemplary IC 3100 is, e.g., IC Q1 3032 of exemplary LED circuit 3000 of FIG. 30. IC 3100 is a fixed frequency PWM Boost constant current driver including internal frequency compensation and a fixed frequency oscillator. The PCM control circuit is able to adjust the duty ratio linearly from 0 to 90%, and has a 5 A switching current capability. IC 3100 includes voltage input pin (VIN) 3102, a feedback pin (FB) 3104, an enable pin (EN) 3106, a power Switch output pin (SW) 3108, and a ground pin (GND) 3110. VIN pin 3102 is, e.g. VIN pin 4 of Q1 3032 of FIG. 30; FB pin 3104 is, e.g. FB pin 5 of Q1 3032 of FIG. 30; EN pin 3106 is, e.g. EN pin 2 of Q1 3032 of FIG. 30; and GND pin 3110 is, e.g. GND pin 1 of IC Q1 3032 of FIG. 30.

When the EN pin 3106 is driven to low the device 3100 is turned off; when the EN pin 3106 is driven to high the device 3100 is turned on. The supply voltage for IC 3100 is received on VIN pin 3102, and device 3100 may operate on an input voltage, e.g., in accordance with the IC specification. The feedback pin (FB) 3104 receives a feedback voltage signal which is compared to a feedback threshold voltage of 0.22V. Power switch output pin (SW) 3108 is the output for device 3100.

IC 3100 includes a voltage regulator 3112, an operation amplifier with voltage output EA 3114, a phase compensation circuit 3116, an undervoltage lockout (UVLO) 3118, a soft start circuit 3120, a comparator (COMP) 3122, a summer 3124, an oscillator 3126, an overvoltage protection (OVP) circuit 3128, a thermal shutdown protection circuit 3130, an RS latch 3132, an overcurrent protection (OCP) amplifier 3134, a driver 3136, a power NDMOS FET 3138, a current sense resistor 3140 and an IC ground 3142.

Regulator 3112 receives an input voltage from VIN 3102 and generates a 2.5 v regulated voltage and a reference voltage of 0.22 v; the 0.22V reference voltage is fed as input to the + terminal of operational amplifier 3114. Operational amplifier 3114 receives a feedback control voltage on its − terminal, which is coupled to FB pin 3104. Operational amplifier 3114 generates output voltage EA as a function of the difference between the reference voltage on its input + terminal and the feedback voltage on its input − terminal.

Undervoltage lockout (UVLO) 3118, which receives VIN from terminal 3102, monitors the input voltage VIN and prevents the IC 3100 from operating to output current when the input voltage VIN is below a minimum acceptable value. Soft start circuit 3120 prevents a high in-rush of current during start up.

Oscillator 3126 is a 180 KHz oscillator circuit which outputs a sawtooth signal to summer 3124 and a square wave signal to RS latch 3132. A signal is generated by amplifier 3134 based on the current through resistor 3140, and the generated signal is summed by summer 3134 with the sawtooth signal from oscillator 3124. The output of the summer 3124 is fed to the + input terminal of comparator 3122, which compares the summer output signal to the output of amplifier 3114, which is received at the − input terminal of comparator 3122. The output of the comparator 3122 is fed to the input of RS latch 3132. The output of RS latch 3132 is the input to driver 3136 which controls the NDMOS 3138. Driver 3136 drives the switching NDMOS 3138 based on the signal received from the RS latch 3132.

Various protection circuits can shut down the output of the IC 3100. Overvoltage protection (OVP) circuit 3128 monitors the voltage on output SW pin 3108 and protects the IC 3100 from excessive voltage on SW terminal 3108, controlling the IC 3100 output to shut down in response to a detected overvoltage via a signal sent to RS latch 3132. Thermal shutdown circuit 3120 determines if an overheating condition is occurring and controls the IC 3100 output to shutdown to prevent thermal damage, via a signal sent to RS latch 3132. Overcurrent protection comparator 3134 determines if the output current through the NDMOS transistor 3138 and through sense resistor 3140 is excessive and controls the chip 3100 output to shut down, via a control signal sent to RS latch 3132, in response to a detected overcurrent condition, e.g., a detected voltage across current sense resistor 3140 exceeding an overcurrent threshold value.

In the example of FIG. 30, IC Q1 3032 is a XLSEMI XL6006 switching constant current driver. In some embodiments, IC Q1 3032 is replaced by a different current regulator including a feedback input. A different current regulator may have a different acceptable input voltage range, a different max boost output, a different feedback threshold value, a different switching frequency, and a different maximum current output. In various embodiments, a particular current regulator IC is selected to match the available expected input voltage range and desired maximum current to be driven through the LED light.

Figure 30A:
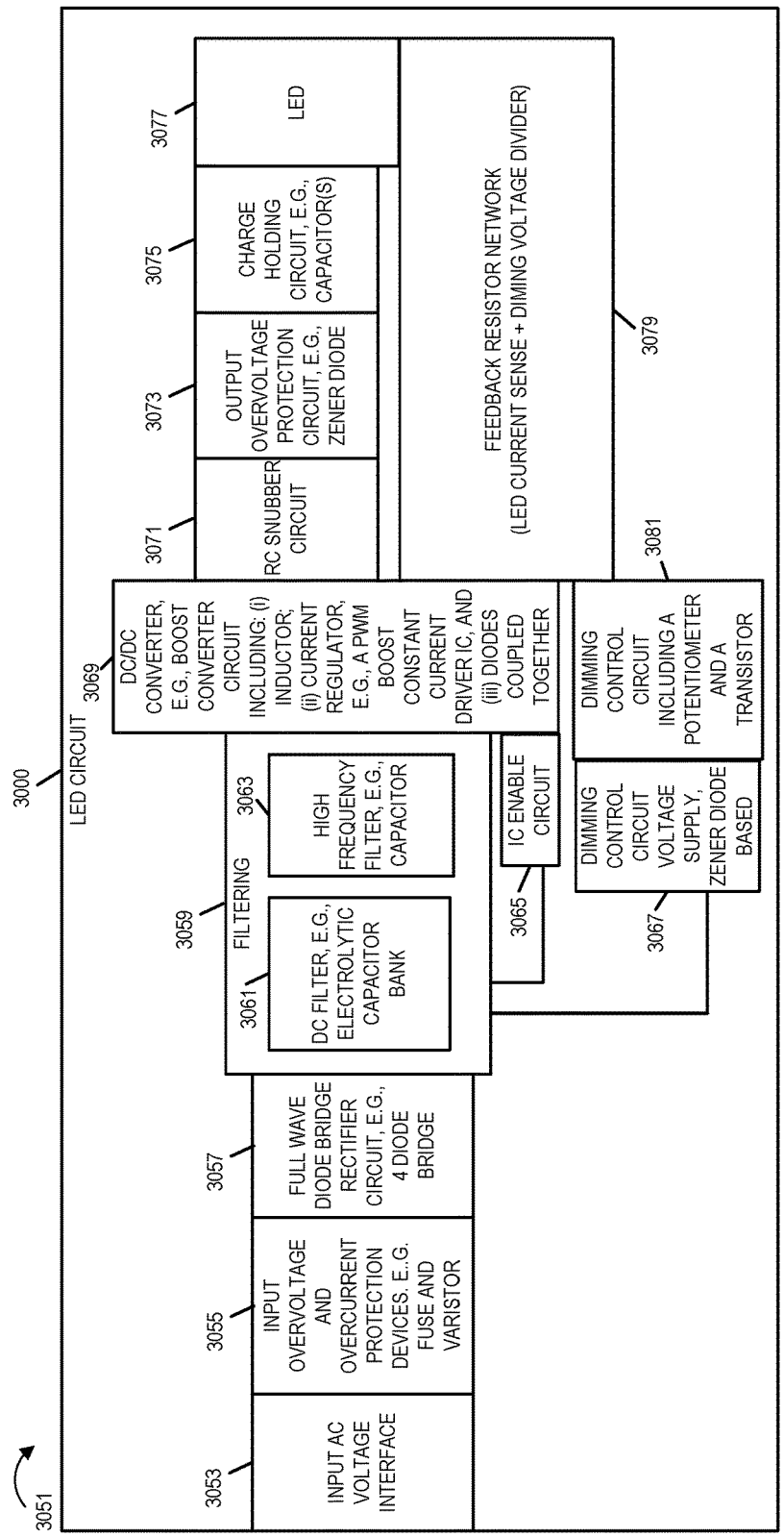
FIG. 30A is a drawing illustrating portions of the LED circuit of FIG. 30.

FIG. 30A is a drawing 3051 illustrating circuit portions of the LED circuit 3000 of FIG. 30. LED circuit 3000 includes an input AC voltage interface 3053, input overvoltage and overcurrent protection devices 3055, e.g., a fuse and a varistor, a full wave rectifier circuit 3057, e.g., a 4 diode bridge circuit, input filtering 3059 including a DC filter 3061, e.g., an electrolytic capacitor bank, and a high frequency filter 3063, e.g., a capacitor for filtering out high frequency signals, an IC enable circuit 3065, a dimmer control voltage supply 3067, e.g., a Zener diode based voltage supply circuit, a DC/DC converter circuit 3069, e.g., a boost converter circuit including an inductor, a current regulator, e.g., a PWM boost constant current driver IC, and diodes coupled together, an RC snubber circuit 3071, an output overvoltage protection circuit 3073, e.g., a Zener diode, a charge holding circuit 3075, e.g., capacitors, an LED light source 3077, i.e. a light emitting semiconductor diode, a feedback resistor network 3079 including resistors used for LED current sensing and resistors used in a dimming voltage divider, and a dimming control circuit 3081 including a potentiometer and a transistor.

Figure 30B:
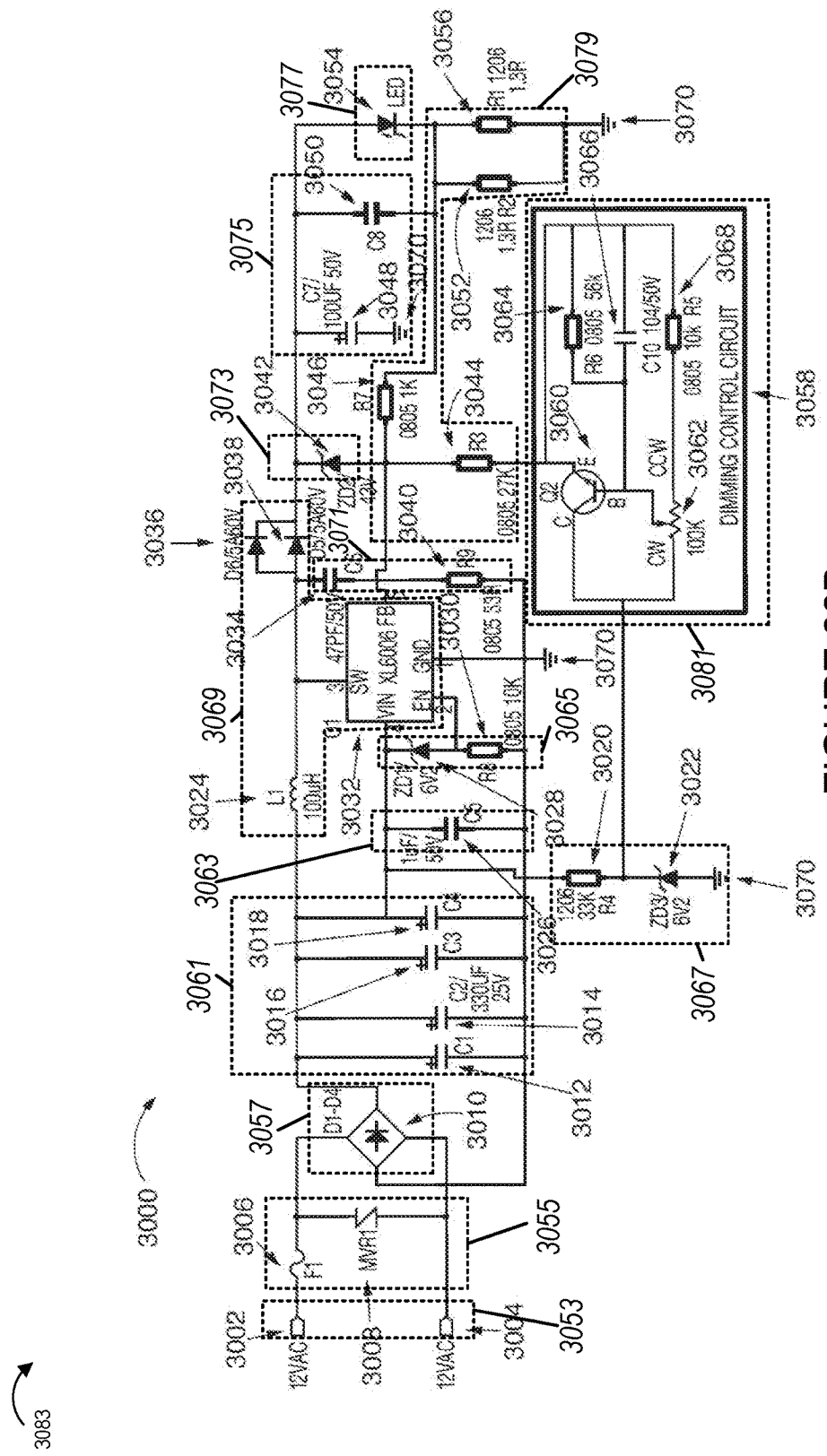
FIG. 30B is a drawing illustrating portions shown in FIG. 30A overlayed on the LED circuit of FIG. 30 so as it identify elements included in each of the portions for one exemplary embodiment.

FIG. 30B is a drawing 3083 illustrating circuit portions shown in FIG. 30A overlayed on the LED circuit of FIG. 30 so as it identify elements included in each of the circuit portions for one exemplary embodiment. The AC voltage interface 3053 includes a pair of AC voltage input terminals (3002, 3004) for receiving an AC signal, e.g., a 12 VAC signal used to power the LED circuit 3000. Input and overvoltage protection devices 3055 includes fuse F1 3006 to protect the circuit 3000 from excessive input current and a metal varistor MVR1 3008 to protect the circuit 3000 from an input voltage surge. Full wave rectifier circuit 3057 includes a four diode (D1, D2, D3, D4) bridge 3010 used to convert the received input sine wave to a full wave rectified signal. DC filter 3061 includes 4 electrolytic capacitors (C1 3012, C2 3014, C3 3016, C4 3108) used to convert the full wave rectified signal to DC. High frequency filter 3063 includes capacitor C5 to perform high frequency filtering. IC enable circuit 3065 includes Zener diode ZD1 3028 and resistor R8 3030 and supplies the voltage (VIN-VZD1) to the EN pin of IC Q1 3032 to enable the IC to operate. Dimmer control voltage supply 3067 includes resistor R4 3020 and Zener diode ZD3 3022, which form a voltage supply for the dimming control circuit 3058. Boost converter circuit 3069 includes inductor L1 3024, PWM boost constant current driver IC 3032, and diode pair (D5 3038, D6 3036), which allows the output voltage to be greater than an input voltage. RC snubber circuit 3071 includes resistor R9 3040 in series with capacitor C6 3034, and reduces ringing during the MOSFET switching within IC 3032. Output overprotection circuit 3073 includes Zener diode ZD2 3042 for output voltage protection, e.g., the output voltage cannot exceed the Zener breakdown voltage of 43 volts thus protecting the LED 3054 for damage due to overvoltage. In some embodiments, the output overvoltage protection circuit 3073 is external to the DC/DC converter circuit 3069. In some such embodiments, the overvoltage protection value selected for the overvoltage protection circuit 3073 is below the overvoltage protection value of the current regulator 3032 of the DC/DC converter 3069. Charge holding circuit 3075 includes capacitors C7 3048 and C8 3050, which are used for holding charge to supply the current to the LED 3054. Feedback resistor network 3079 includes resistors R1 3056, R2 3052, R7 3046, and R3 3044. Resistors R1 and R2 are low value resistors, connected together in parallel, and the parallel combination is connected in series between the LED 3054 and ground 3070.

The current through the parallel resistor pair (R1 in parallel with R2) is substantially the same current going through the LED, and the current produces a voltage across the resistor pair (R1 in parallel with R2) which can be used to indicate the LED current. Thus R1 in parallel with R2 is an equivalent current sense resistor for the LED, and the voltage across the sense resistor is fed back to feedback FB pin 5 of IC 3032 via resister R7. Note that resister R3 is 27K, while R3 is 1K resulting in the feedback voltage contribution due to current sensing which reaches FB pin 5 of IC 3032 is substantially the same as the measured value across the equivalent sense resistor (R1 in parallel with R2).

The feedback due to the dimming control circuit produces a second feedback voltage contribution at the FB pin 5 of IC 3032. The setting of the potentiometer 3062 determines the voltage at the Emitter of Q2 3060. A fraction of the emitter voltage of Q2 3060 is a feedback contribution input at pin 5 of IC 3032 based on the voltage divider including R3, R7 and R1 in parallel with R2. The fraction is approximately 0.036. With a dimming control voltage supply of 6.2 v, and a feedback setpoint in IC Q1 of 0.22 v, the dimming can drive the LED to off or a near off condition.

The two feedback voltage contributions (one from the current sensing and one from the dimming control) are combined at FB pin 5 of IC 3032. The contribution of voltage feedback from the dimming circuit has the effect of lowering the current through the LED and causing dimming.

Figure 30C:
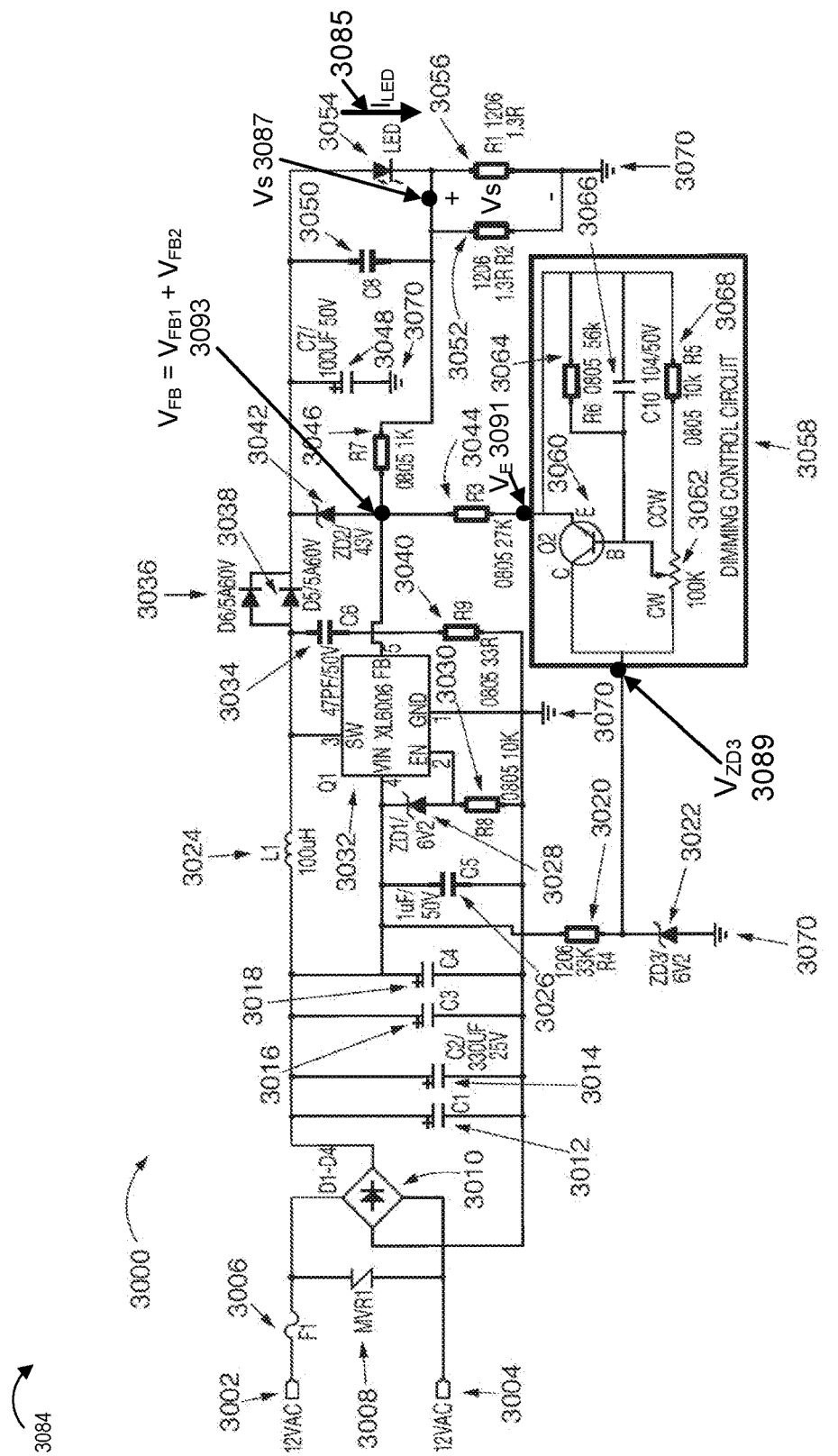
FIG. 30C is a drawing which illustrates the two sources of feedback which are used to control the current regulator of the LED circuit.
Figure 30D:
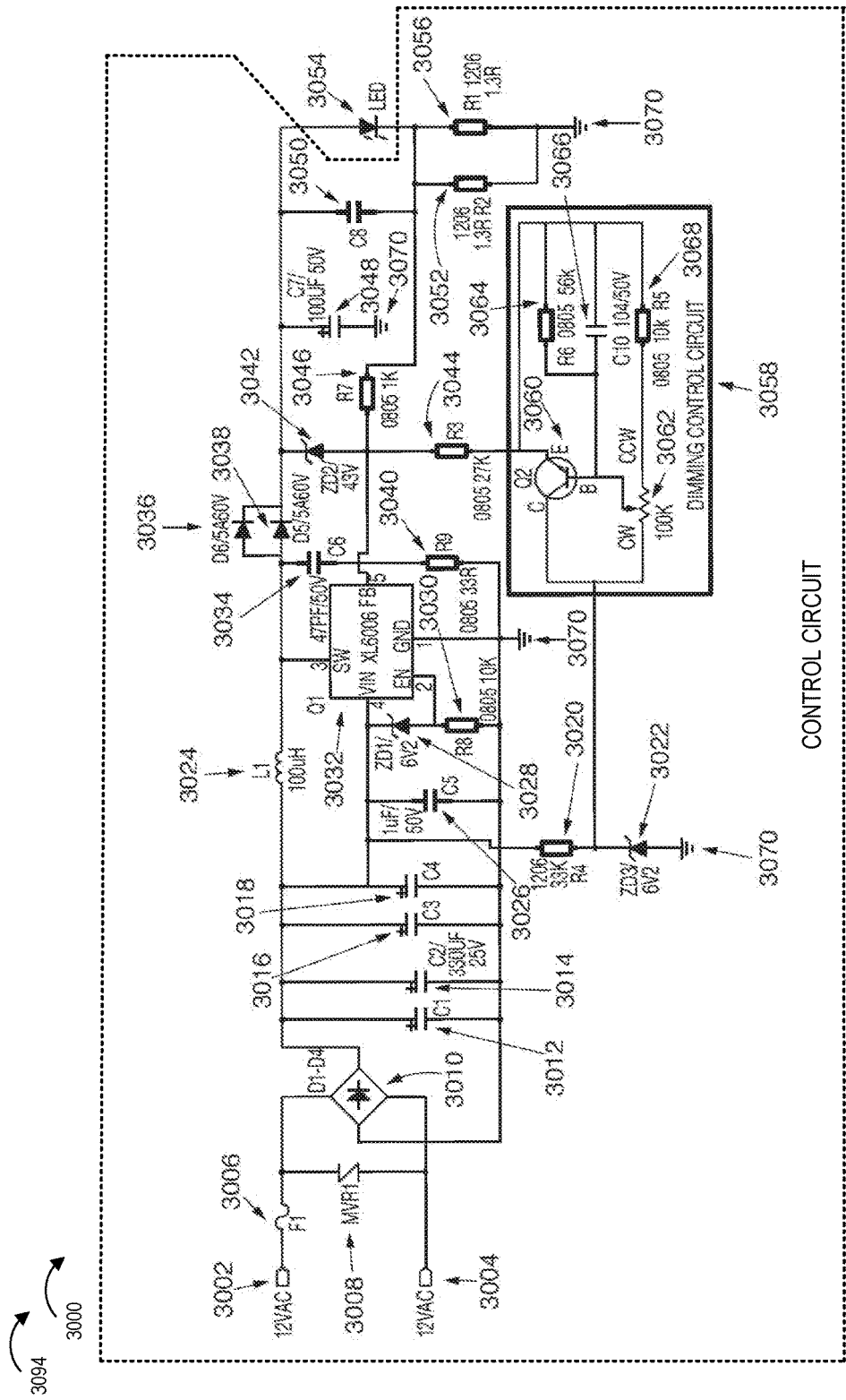
FIG. 30D is a drawing which illustrates that exemplary the LED circuit includes a control circuit configured to control a LED light source.

FIG. 30C is a drawing 3084 which illustrates the two sources of feedback which are used to control the IC 3032 of LED circuit 3000. A first feedback source will now be discussed. The current $I_{LED}$ 3085 through LED 3054 flows through the sense resistor pair of R1 3056 in parallel with R2 3052, producing voltage $V_S$ 3087. The value of resistor R3>>the value of (resistor R1 in parallel with resistor R2), and the value of resistor R3 is 27× the value of Resistor R7; therefore the feedback component voltage $V_{FB1}$ is approximately the value of Vs 3087.

A second feedback source will now be discussed. Dimming control circuit supply voltage $V_{ZD3}$ 3089, e.g., 6.2 VDC, is received as an input to the dimming control circuit 3058. The dimming control circuit 3058 outputs voltage $V_E$ 3091, which is less than $V_{ZD3}$ and which is a function of the setting of the potentiometer 3062. A second feedback component voltage $V_{FB2}$ is a fraction of $V_E$, and the fraction is approximately the value of R7/(the value of R7+the value of R3). In this example, $V_{FB2}=(1/28)V_E$. Higher voltages of $V_E$ result in higher feedback voltages $V_{FB2}$, and more dimming.

The feedback value seen at FB pin 5 of IC 3032 is $V_{FB}$ 3093, where $V_{FB}=V_{FB1}+V_{FB2}$. Since the feedback threshold voltage in IC Q1 3032 is set at a fixed value of 0.22 v, increased feedback voltage due to the dimmer circuit will result in a lower LED current level and a lower feedback voltage contribution from the current sense source.

The exemplary LED circuit 3000 of FIG. 30 is shown for an exemplary embodiment in which the input power is within the range of 9 VAC to 15 VAC. In other embodiments, different component values may be selected to accommodate different acceptable input voltage ranges. In some embodiments, the components are selected such that the minimum acceptable input voltage is 3 VAC or 3 VDC. In some other embodiments, the components are selected such that the maximum acceptable input voltage is 24 VAC or 24 VDC.

Circuit 3000 may also be operated with a DC input voltage source replacing the AC input voltage source, e.g., circuit 3000 may be operated on DC power, e.g., battery power, where AC power is not available, where the implementation includes a DC power source, or where the AC power fails and a backup DC power source is available to be switched in to replace the AC power source.

FIG. 30D illustrates drawing 3094 which illustrates that exemplary LED circuit 3000 includes a control circuit 3001 configured to control LED light source 3054.

Table 1 3095 of FIG. 30E illustrates exemplary components used in the exemplary LED circuit 3000 shown in FIG. 30.

Table 2 3097 of FIG. 30F illustrates exemplary components for another exemplary embodiment, which is a variation of the LED circuit of FIG. 30. In this exemplary embodiment, capacitor C4 3018 is omitted, resistor R2 3052 is omitted, and capacitor C8 3050 is omitted.

Figure 30G:
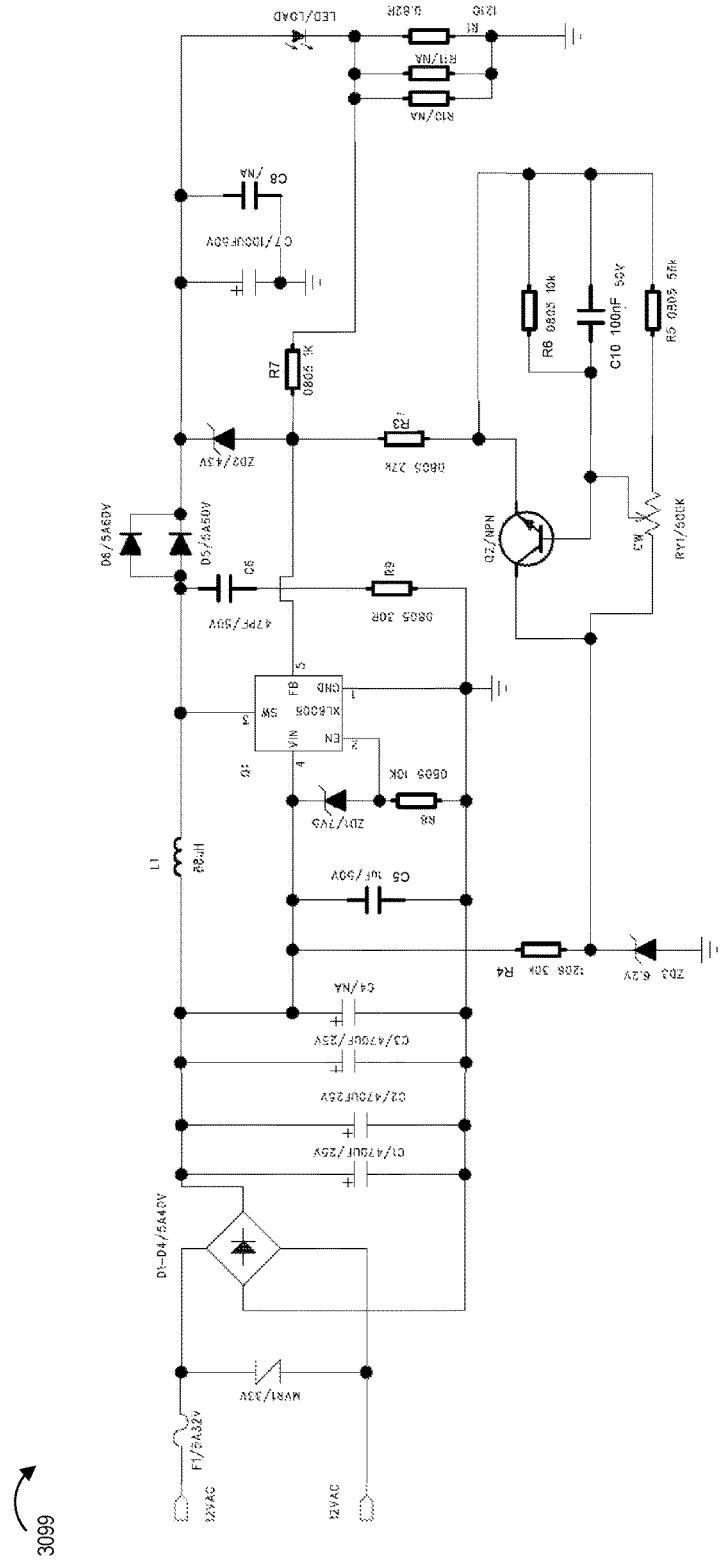
FIG. 30G is a drawing illustrating an exemplary LED circuit, in accordance with an exemplary embodiment, which may use the components listed in Table 2 of FIG. 30F.

FIG. 30G is a drawing illustrating an exemplary LED circuit 3099, in accordance with an exemplary embodiment, which may use the components listed in Table 2 of FIG. 30F. Note that components C4, C8, R10 and R11 are designated on the drawing as N/A, which implies that a slot for the component exists on the circuit board however the component slot is not populated.

In the example of FIG. 30G one resistor R1 is used for the current detector, while in the example of FIG. 30, two resistors in parallel (R1 in parallel with R2) are used for the current detector. In some embodiments, three resistors are populated and used in parallel for the current detector.

In various embodiments, the values of the sense resistor, e.g., R1 3056, or the sense resistor pair, e.g., R1/R2 (3056/3052), are selected to match the desired LED current with no dimming such that the feedback voltage from the current sensing is matched to the FB voltage threshold of the current regulator, e.g., IC 3032.

In some embodiments, the dimming control circuit, e.g., circuit 3058, provides a small feedback contribution to the feedback pin of the current regulator, e.g., pin 5 of IC Q1 3032, under the no dimming condition. In some such embodiments, the value of the resistance for the current detector, e.g., sense resistor pair (R1 in parallel with R2) is selected in the design to take into account that the current sense detector voltage contribution under a no dimming condition will be slightly below the feedback threshold voltage of the current regulator. In some such embodiments, this results in a slightly lower value for the current sense resistor than would be the case if the dimming control circuit provided 0 voltage feedback contribution at the current regulator feedback input under a no dimming condition. This lower sense resistor value has the added benefit of less energy wastage, e.g., less energy dissipation in the sense resistor for the same current going through the LED diode.

The LED circuit 3000 of FIG. 30 and LED circuit 3099 of FIG. 30G have been illustrated for exemplary embodiments using a DC/DC converter which is a boost converter. In some other embodiments, the DC/DC converter implemented in the LED circuit 3000 and/or LED circuit 3099 of FIG. 30G uses a different DC/DC converter topology. For example, the boost converter is replaced with one of a: SEPIC converter, a synchronous Buck-Boost Converter, a synchronous boost converter, a flyback converter, or an inverter converter. In some such embodiments, a transformer is included in the circuit.

An exemplary control apparatus for controlling current to an LED light source, e.g., LED 3054, in a landscape lighting device, in accordance with some embodiments, comprises: a user selectable control (knob), e.g., knob 548; and a control circuit, e.g., control circuit 3001, configured to control the LED light source, e.g., LED 3054, to output light in an amount depending on a user selectable setting on the user selectable control, said control circuit, e.g., circuit 3001, including: i) a current regulator, e.g., IC Q1 3032, for controlling the amount of current passing through the LED light source, e.g., LED 3054; and ii) a dimming control circuit, e.g., dimming control circuit 3058.

In some such embodiments, said control circuit, e.g., circuit 3001, is an LED driver circuit for generating and controlling the flow of current through said LED light source, e.g., LED 3054. In some such embodiments, said control circuit, e.g., circuit 3001, includes a current detector, e.g., R1 3056 in parallel R2 3052, for producing a sense signal, e.g., $V_S$ 3087 proportional to the amplitude of said controlled current, e.g., $I_{LED}$ 3085, passing through said LED light source.

In some embodiments, said current detector, e.g., R1 3056 in parallel with R2 3052, includes a current sense resistor, e.g., R1 3056, through which at least a portion of the current passing through said LED light source also passes. In some such embodiments, said sense signal is a voltage signal.

In various embodiments, said dimming control circuit, e.g., circuit 3058, is configured to produce a signal in an amount depending on the user selectable setting of the user selectable control. In some embodiments, said dimming control circuit, e.g., circuit 3058, includes: a transistor, e.g., Q2 3060, for producing an output signal, e.g., $V_E$ 3091; and a potentiometer, e.g., potentiometer 3062, electrically coupled to said transistor, e.g., Q2 3060, for controlling the amount of signal which the transistor will output, said potentiometer, e.g., potentiometer 3062, including a movable portion, e.g., moveable portion 555A, said movable portion being connected to said user selectable control, e.g., knob 548, said moveable portion changing resistance in a portion of said dimming control circuit, e.g., circuit 3058, when moved. In some embodiments, said control circuit, e.g., circuit 3001, includes a feedback network, e.g., network 3079, and wherein said feedback network includes said current detector, e.g., R1 3056 in parallel with R2 3052.

In some embodiments, said feedback network, e.g., resistor network 3079, couples said dimming circuit, e.g., circuit 3058, to said current regulator, e.g., IC Q1 3032. In some embodiments, said feedback network, e.g., network 3079, includes a resistor, e.g., R7 3046, for coupling said current detector, e.g. the circuit of R1 3056 in parallel with R2 3052, to said current regulator, e.g., IC Q1 3032. In various embodiments, said feedback network, e.g., network 3079, includes a voltage divider, e.g., voltage divider with ratio of (R7+(R1*R2)/(R1+R2))/(R3+R7+(R1*R2)/(R1+R2)), which is approximately R7/(R7+R3). In some embodiments, said feedback network, e.g., network 3079, is configured to provide a feedback signal, e.g., $V_F$ 3093 to said current regulator, e.g., IC Q1 3032, said feedback signal, e.g., $V_{FB}$, being generated from said sense signal, e.g., Vs, and a dimming control output signal, e.g., $V_E$. For example, $V_{FB}=V_{FB1}+V_{FB2}$, where $V_{FB1}$ is approximately $V_S$ and $V_{FB2}$ is approximately $(R7/(R7+R3))*V_E$. In some embodiments, said transistor output signal is a voltage signal, and said dimming output signal is a voltage signal based on said transistor output signal. In some embodiments, said feedback network is a resistor network and said feedback signal is a voltage signal.

In various embodiments, said current regulator, e.g., IC Q1 3032, is configured to compare a voltage reference signal, e.g., 0.22 v, to said feedback signal, e.g., $V_{FB}$, and based on difference to adjust the amount of current passing through the LED light source, e.g., LED 3054. In some such embodiments, said current regulator, e.g., IC Q1 3032, is a pulse width modulation boost current circuit, e.g., XLSEMI XL6006 chip.

In some embodiments, said control circuit, e.g., control circuit 3001, includes a DC to DC converter circuit, e.g., circuit 3069, said DC to DC converter circuit, e.g., circuit 3069, including said current regulator, e.g., IC Q1 3032. In some such embodiments, said DC to DC converter circuit, e.g., circuit 3069, further includes an inductor, e.g., L1 3024, and at least one diode, e.g., diode D5 3038. In some embodiments, said DC to DC converter circuit, e.g., circuit 3069 includes at least two diodes in parallel, e.g., diode D5 3038 in parallel with diode D6 3036.

In various embodiments, said DC to DC converter circuit, e.g., circuit 3069 is one of a single-ended primary-inductor converter (SEPIC) converter, a step-up or boost converter, a synchronous step-up or boost converter, a flyback converter, a buck-boost converter, or a synchronous buck-boost converter.

In some embodiments, said control circuit, e.g., control circuit 3001, includes an over voltage protection circuit, e.g., circuit 3073, coupled to said DC to DC converter, e.g., circuit 3069, for protecting the LED light source, e.g., LED 3054, from an over voltage condition. In some such embodiments, said overvoltage protection circuit, e.g., circuit 3073, includes a Zener diode, e.g., $Z_{D2}$ 3042, for limiting said voltage applied to said LED light source, e.g., LED 3054, to a voltage value, e.g., 43V, below a value at which said LED light source, e.g., LED 3054, would be damaged.

In various embodiments, said control apparatus is configured to operate over 9V to 15 V AC or DC voltage range. In some embodiments, the control apparatus is configured to operate at a minimum input voltage of 3V AC or DC. In some embodiments, the control apparatus is configured to operate at a maximum input voltage of 24V AC or DC. It should be appreciated that the components and/or component values to be used in the control circuit are selected to be matched to a particular desired operating range and/or a particular LED light source.

In some embodiments, the control apparatus includes a Zener diode voltage regulator circuit, e.g., circuit 3067, for providing power to said dimming control circuit, e.g., circuit 3058.

In some embodiments, said landscape lighting device is one of a spotlight, a landscape light or an inground light.

In some embodiments, said user selectable control is a dimming control knob, e.g., knob 548, in contact with a movable portion, e.g., movable portion 555A, of said potentiometer, e.g., potentiometer 3062, said moveable portion changing resistance of a portion of a dimming control circuit, e.g., circuit 3058, when moved.

In some embodiments, said control knob, e.g., knob 548, includes a setting indicator which moves with said knob, e.g., knob 548, and which when rotated to be aligned with a power or illumination level indicator on a housing in which said control circuit is housed sets the control circuit to operate at the wattage or illumination level to which the setting indicator is aligned. In some embodiments, the electrical circuits are defined such that the user selectable control has settings with light outputs comparable to the light output of 10 W, 25 W, 35 W, 50 W and 75 W MR16 halogen lights.

Some features are directed to a control apparatus for controlling current to an LED light source in a landscape lighting device. In one embodiment the control apparatus includes an LED driver (554); a user control (548) with a control setting indicator (3302); and a driver housing (540) including setting indicators (594, 598), alignment of the control setting indicator on the user control (548) with one of the setting indicators (594, 598) indicating which of a plurality of user selectable settings the LED driver (554) is set. In some embodiments the LED driver (554) includes a control circuit (3000) configured to control an LED light source to output light in an amount depending on a user selectable setting on the user selectable control, with the control circuit (3000) including, i) a current regulator which is part of a boost or other module 3069 for controlling the amount of current passing through the LED light source; and ii) a dimming control circuit (3081) including a potentiometer (3062). In some embodiment the user control (548) is a dimming control knob (548) that is in contact with a movable portion of the potentiometer (3062). Moving, e.g., rotating, the moveable portion of the potentiometer (3062) changes resistance in a portion of the dimming control circuit (3081). In some implementations the driver housing (540) includes visible wattage markings (596, 599) adjacent corresponding setting indicators (594, 598). In some but not all embodiments driver housing (540) further includes one or more visible apparent power markings, e.g., marking (608), in close proximity to a corresponding wattage marking (599) with the markings being adjacent the setting indicator, e.g., dimple, (598) to which the apparent power marking (608) and associated wattage marking (599) correspond. Instead of, or in addition to, the wattage and/or apparent power markings, the driver housing (540) may and sometimes does include visible MR16 equivalent wattage markings. For example, marking (620) is shown in FIG. 6D in close proximity to the wattage marking (599) and adjacent the setting indicator (598) to which the apparent power marking (608) and associated wattage marking (599) correspond. In at least some embodiments a user can select between marked settings with light outputs comparable to the light output of 10 W, 25 W, 35 W, 50 W and 75 W MR16 halogen lights by rotating the user control to align the control setting indicator (302) with the one of the setting indicators on the driver housing (540) corresponding to a desired MR16 equivalent wattage. The control circuit can, in some embodiments, operate on either a 12V AC or a 12V DC input. The 12V AC or 12V DC input can be from a magnetic transformer or an electronic transformer.

In some embodiments the control knob (548) includes a shaft (549) with the shaft being in contact with the movable portion of the potentiometer of the control circuit. A seal (546) such as that shown in FIG. 35, in some embodiments, surrounds a portion of said shaft (549) where said shaft enters the driver housing (540) with the seal protecting the driver housing (540) against water and dirt entry while still allowing the shaft (549) to rotate. The seal (546), in the embodiment shown in FIG. 35, includes a flat collar in contact with a rear portion of said control knob (548) and a tapered shaft portion which surrounds a portion of said shaft (549). In some but not necessarily all embodiment the seal (546) is made of a flexible silicone material. In the embodiment shown in FIG. 35 the shaft (549) includes a ridge (549A) for engaging a slot in the movable portion of the potentiometer (3062).

In some embodiments such as the one shown in FIG. 6C, the driver housing (540) includes a stop (574) positioned to engage a stop 3509 on the control knob (548) to prevent said control knob (548) from rotating the movable portion of the potentiometer (3062) beyond the range of user selectable settings.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:
1. An LED light fixture comprising:
an upper fixture main body;
an LED light source secured in the upper fixture main body;
a lower fixture main body including support arms between which said upper fixture main body is mounted by pivots;
a first tilt position stop for holding said upper fixture main body at one of a plurality of user selectable tilt positions;
wherein said lower fixture main body includes a housing with a hollow cavity in which said upper fixture main body is tiltably mounted;
wherein a lower portion of said upper fixture main body extends into said hollow cavity of said lower fixture main body housing, said hollow cavity including room to allow said upper fixture main body to tilt; and
a waterproof housing in which said upper fixture main body, said LED light source, said lower fixture main body and said first tilt position stop are sealed after said upper fixture main body is set to one of the user selectable tilt positions.

2. The LED light fixture of claim 1, wherein said plurality of user selectable tilt positions are tilt positions within said housing of said lower fixture main body.

3. The LED light fixture of claim 1, wherein said upper fixture main body is flat along side portions which fit between the support arms and make thermal contact with said support arms which transfer and dissipate heat generated by the LED light source secured in the upper fixture main body.

4. The LED light fixture of claim 1, further comprising:
a plurality of tilt position holes in a lower portion of one of said support arms, each of said tilt position holes corresponding to a different tilt position, said first tilt position stop being secured into one of the tilt position holes corresponding to a user selectable tilt position at which the upper fixture main body is set, said plurality of tilt position holes including holes corresponding to a 0 degree tilt position, a 10 degree tilt position, a 20 degree tilt position, a −10 degree tilt position and a −20 degree tilt position.

5. The LED light fixture of claim 1, further comprising:
a pressure equalizing vent including a hole covered by a water vapor permeable material which blocks water droplets from passing through the water vapor permeable material.

6. The LED light fixture of claim 1, further comprising:
a protective glass;
a flexible seal; and
a cover which seals a top of said waterproof housing from water and dirt.

7. An LED light fixture comprising:
an upper fixture main body;
an LED light source secured in the upper fixture main body;
a lower fixture main body including support arms between which said upper fixture main body is mounted by pivots;
a first tilt position stop for holding said upper fixture main body at one of a plurality of user selectable tilt positions;

wherein said lower fixture main body includes a housing with a hollow cavity in which said upper fixture main body is tiltably mounted;

wherein a lower portion of said upper fixture main body extends into said hollow cavity of said lower fixture main body housing, said hollow cavity including room to allow said upper fixture main body to tilt; and a first stopper bracket secured to a first bottom portion of a first side of the upper fixture main body; and wherein said first tilt position stop is a stop button with a rounded head.

8. The LED light fixture of claim 7, further comprising:

a waterproof housing in which said upper fixture main body, said LED light source, said lower fixture main body and said first tilt position stop are sealed after said upper fixture main body is set to one of the user selectable tilt positions.

9. An LED light fixture comprising:

an upper fixture main body;

an LED light source secured in the upper fixture main body;

a lower fixture main body including support arms between which said upper fixture main body is mounted by pivots;

a first tilt position stop for holding said upper fixture main body at one of a plurality of user selectable tilt positions; and wherein said pivots are pivot screws, each pivot screw having a threaded tip that screws into the upper fixture main body and a smooth shaft portion which extends through one of the support arms.

10. The LED light fixture of claim 9, further comprising:

a plurality of tilt position holes in a lower portion of one of said support arms, each of said tilt position holes corresponding to a different tilt position, said first tilt position stop being secured into one of the tilt position holes corresponding to a user selectable tilt position at which the upper fixture main body is set.

11. The LED light fixture of claim 9 further including a power control module with a user controllable selector which can be used to select one of a plurality of different user selectable power settings, said LED light fixture being an inground landscape lighting fixture.

12. An LED light fixture comprising:

an upper fixture main body;

an LED light source secured in the upper fixture main body;

a lower fixture main body including support arms between which said upper fixture main body is mounted by pivots;

a first tilt position stop for holding said upper fixture main body at one of a plurality of user selectable tilt positions; and wherein said lower fixture main body includes a power control module with a user controllable control knob which can be turned to one of a plurality of different user selectable power settings.

13. The LED light fixture of claim 12 wherein said power control module further includes an LED driver circuit configured to control the LED light source output in an amount depending on which one of the plurality of different user selectable power settings the user controllable control knob is set, said LED driver circuit including:

i) a current regulator for controlling the amount of current passing through the LED light source; and ii) a dimming control circuit configured to produce a signal in an amount depending on the user selectable setting of the user controllable control knob, said dimming control circuit including a transistor for producing an output signal and a potentiometer electrically coupled to said transistor for controlling the amount of signal which the transistor will output, said potentiometer including a movable portion, said movable portion changing resistance in a portion of said dimming control circuit when moved.

14. The LED light fixture of claim 12, further comprising:

a plurality of tilt position holes in a lower portion of one of said support arms, each of said tilt position holes corresponding to a different tilt position, said first tilt position stop being secured into one of the tilt position holes corresponding to a user selectable tilt position at which the upper fixture main body is set.

15. An LED light fixture comprising:

an upper fixture main body;

an LED light source secured in the upper fixture main body;

a lower fixture main body including support arms between which said upper fixture main body is mounted by pivots;

a first tilt position stop for holding said upper fixture main body at one of a plurality of user selectable tilt positions;

wherein said lower fixture main body includes a housing with a hollow cavity in which said upper fixture main body is tiltably mounted;

wherein a lower portion of said upper fixture main body extends into said hollow cavity of said lower fixture main body housing, said hollow cavity including room to allow said upper fixture main body to tilt; and a plurality of tilt position holes in a lower portion of one of said support arms, each of said tilt position holes corresponding to a different tilt position, said first tilt position stop being secured into one of the tilt position holes corresponding to a user selectable tilt position at which the upper fixture main body is set.

16. An LED light fixture comprising:

an upper fixture main body;

an LED light source secured in the upper fixture main body;

a lower fixture main body including support arms between which said upper fixture main body is mounted by pivots;

a first tilt position stop for holding said upper fixture main body at one of a plurality of user selectable tilt positions;

wherein said lower fixture main body includes a housing with a hollow cavity in which said upper fixture main body is tiltably mounted;

wherein a lower portion of said upper fixture main body extends into said hollow cavity of said lower fixture main body housing, said hollow cavity including room to allow said upper fixture main body to tilt; and a power control module with a user controllable selector which can be used to select one of a plurality of different user selectable power settings, said LED light fixture being an inground landscape lighting fixture.

17. An LED light fixture comprising:

an upper fixture main body;

an LED light source located in the upper fixture main body;

a light beam angle adjustment control mechanism for adjusting the light beam angle to be one of a plurality of different predetermined settings, said light beam angle adjustment control mechanism being located in the upper fixture main body and including a beam angle changing lens for directing light;
a lower fixture main body including support arms between which said upper fixture main body is mounted by pivots;
a first tilt position stop for holding said upper fixture main body at one of a plurality of user selectable tilt positions;
wherein said lower fixture main body includes a housing with a hollow cavity in which said upper fixture main body is tiltably mounted; and
wherein a lower portion of said upper fixture main body extends into said hollow cavity of said lower fixture main body housing, said hollow cavity including room to allow said upper fixture main body to tilt.

18. The LED light fixture of claim 17 further comprising:
a plurality of tilt position holes in a lower portion of one of said support arms, each of said tilt position holes corresponding to a different tilt position, said first tilt position stop being secured into one of the tilt position holes corresponding to a user selectable tilt position at which the upper fixture main body is set.

19. The LED light fixture of claim 17,
wherein said upper fixture main body includes beam angle setting markings.

20. The LED light fixture of claim 17, further comprising:
a waterproof housing in which said upper fixture main body, said LED light source, said light beam angle adjustment control mechanism, said lower fixture main body, and said first tilt position stop are sealed after said upper fixture main body is set to one of the user selectable tilt positions.

21. The LED light fixture of claim 20, further comprising:
a pressure equalizing vent including a hole covered by a water vapor permeable material which blocks water droplets from passing through the water vapor permeable material.

22. The LED light fixture of claim 20, further comprising:
a protective glass;
a flexible seal;
and a cover which seals a top of said waterproof housing from water and dirt.

* * * * *